US010055441B2

(12) United States Patent
Gladwin

(10) Patent No.: US 10,055,441 B2
(45) Date of Patent: Aug. 21, 2018

(54) UPDATING SHARED GROUP INFORMATION IN A DISPERSED STORAGE NETWORK

(71) Applicant: CLEVERSAFE, INC., Chicago, IL (US)

(72) Inventor: S. Christopher Gladwin, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 111 days.

(21) Appl. No.: 14/102,987

(22) Filed: Dec. 11, 2013

(65) Prior Publication Data

US 2014/0222753 A1    Aug. 7, 2014

Related U.S. Application Data

(60) Provisional application No. 61/760,962, filed on Feb. 5, 2013.

(51) Int. Cl.
*G06F 7/02*        (2006.01)
*G06F 17/30*        (2006.01)
(Continued)

(52) U.S. Cl.
CPC .. *G06F 17/30345* (2013.01); *G06F 17/30115* (2013.01); *G06F 17/30365* (2013.01); *G06Q 10/101* (2013.01); *G06Q 50/01* (2013.01)

(58) Field of Classification Search
CPC ......... G06F 17/30345; G06F 17/30312; G06F 3/0629; G06F 17/30194; G06F 17/30283;
(Continued)

(56) References Cited

U.S. PATENT DOCUMENTS 4,092,732 A    5/1978    Ouchi
5,454,101 A    9/1995    Mackay et al.
(Continued)

OTHER PUBLICATIONS

Shamir; How to Share a Secret; Communications of the ACM; vol. 22, No. 11; Nov. 1979; pp. 612-613.
(Continued)

*Primary Examiner* — Bruce M Moser
(74) *Attorney, Agent, or Firm* — Garlick & Markison; Timothy W. Markison; Randy W. Lacasse

(57) ABSTRACT

A method begins by a device of an affiliated group of devices establishing a desired change to shared group information and requesting a current version of the shared group information from devices in the affiliated group of devices. The method continues with the device interpreting the current version of the shared group information to determine whether the desired change to the shared group information is permissible. When the desired change to the shared group information is permissible, the method continues with the device sending to devices, a request to update the shared group information to include the desired change. Upon receipt of successfully updating the shared group information from the devices, the method continues with the device performing an operation corresponding to the desired change.

18 Claims, 62 Drawing Sheets

(51) Int. Cl.
*G06Q 10/10* (2012.01)
*G06Q 50/00* (2012.01)

(58) Field of Classification Search
CPC . G06F 3/0631; G06F 15/177; H04L 67/1097; H04L 2209/34
USPC ......... 707/999.01, 999.2, 999.202, 609, 741, 707/806, 812, 966
See application file for complete search history.

(56) References Cited

U.S. PATENT DOCUMENTS

| | | | |
|---|---|---|---|
| 5,485,474 | A | 1/1996 | Rabin |
| 5,774,643 | A | 6/1998 | Lubbers et al. |
| 5,802,364 | A | 9/1998 | Senator et al. |
| 5,809,285 | A | 9/1998 | Hilland |
| 5,890,156 | A | 3/1999 | Rekieta et al. |
| 5,987,622 | A | 11/1999 | Lo Verso et al. |
| 5,991,414 | A | 11/1999 | Garay et al. |
| 6,012,159 | A | 1/2000 | Fischer et al. |
| 6,058,454 | A | 5/2000 | Gerlach et al. |
| 6,128,277 | A | 10/2000 | Bruck et al. |
| 6,175,571 | B1 | 1/2001 | Haddock et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,301,604 | B1 | 10/2001 | Nojima |
| 6,356,949 | B1 | 3/2002 | Katsandres et al. |
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,567,948 | B2 | 5/2003 | Steele et al. |
| 6,571,282 | B1 | 5/2003 | Bowman-Amuah |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,636,724 | B2 | 12/2009 | de la Torre et al. |
| 2002/0062422 | A1 | 5/2002 | Butterworth et al. |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0084020 | A1 | 5/2003 | Shu |
| 2004/0024963 | A1 | 2/2004 | Talagala et al. |
| 2004/0122917 | A1 | 6/2004 | Menon et al. |
| 2004/0215998 | A1 | 10/2004 | Buxton et al. |
| 2004/0228493 | A1 | 11/2004 | Ma et al. |
| 2005/0015471 | A1* | 1/2005 | Zhang ................ H04L 63/0442 709/221 |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula, Jr. |
| 2005/0132070 | A1 | 6/2005 | Redlich et al. |
| 2005/0144382 | A1 | 6/2005 | Schmisseur |
| 2005/0229069 | A1 | 10/2005 | Hassner |
| 2006/0047907 | A1 | 3/2006 | Shiga et al. |
| 2006/0136448 | A1 | 6/2006 | Cialini et al. |
| 2006/0156059 | A1 | 7/2006 | Kitamura |
| 2006/0224603 | A1 | 10/2006 | Correll, Jr. |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0174192 | A1 | 7/2007 | Gladwin et al. |
| 2007/0214285 | A1 | 9/2007 | Au et al. |
| 2007/0234110 | A1 | 10/2007 | Soran et al. |
| 2007/0283167 | A1 | 12/2007 | Venters, III et al. |
| 2009/0094251 | A1 | 4/2009 | Gladwin et al. |
| 2009/0094318 | A1 | 4/2009 | Gladwin et al. |
| 2010/0023524 | A1 | 1/2010 | Gladwin et al. |
| 2011/0107026 | A1* | 5/2011 | Quigley .............. G06F 11/1092 711/114 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.
Chung; An Automatic Data Segmentation Method for 3D Measured Data Points; National Taiwan University; pp. 1-8; 1998.
Plank, T1: Erasure Codes for Storage Applications; FAST2005, 4th Usenix Conference on File Storage Technologies; Dec. 13-16, 2005; pp. 1-74.
Wildi; Java iSCSi Initiator; Master Thesis; Department of Computer and Information Science, University of Konstanz; Feb. 2007; 60 pgs.
Legg; Lightweight Directory Access Protocol (LDAP): Syntaxes and Matching Rules; IETF Network Working Group; RFC 4517; Jun. 2006; pp. 1-50.
Zeilenga; Lightweight Directory Access Protocol (LDAP): Internationalized String Preparation; IETF Network Working Group; RFC 4518; Jun. 2006; pp. 1-14.
Smith; Lightweight Directory Access Protocol (LDAP): Uniform Resource Locator; IETF Network Working Group; RFC 4516; Jun. 2006; pp. 1-15.
Smith; Lightweight Directory Access Protocol (LDAP): String Representation of Search Filters; IETF Network Working Group; RFC 4515; Jun. 2006; pp. 1-12.
Zeilenga; Lightweight Directory Access Protocol (LDAP): Directory Information Models; IETF Network Working Group; RFC 4512; Jun. 2006; pp. 1-49.
Sciberras; Lightweight Directory Access Protocol (LDAP): Schema for User Applications; IETF Network Working Group; RFC 4519; Jun. 2006; pp. 1-33.
Harrison; Lightweight Directory Access Protocol (LDAP): Authentication Methods and Security Mechanisms; IETF Network Working Group; RFC 4513; Jun. 2006; pp. 1-32.
Zeilenga; Lightweight Directory Access Protocol (LDAP): Technical Specification Road Map; IETF Network Working Group; RFC 4510; Jun. 2006; pp. 1-8.
Zeilenga; Lightweight Directory Access Protocol (LDAP): String Representation of Distinguished Names; IETF Network Working Group; RFC 4514; Jun. 2006; pp. 1-15.
Sermersheim; Lightweight Directory Access Protocol (LDAP): The Protocol; IETF Network Working Group; RFC 4511; Jun. 2006; pp. 1-68.
Satran, et al.; Internet Small Computer Systems Interface (iSCSI); IETF Network Working Group; RFC 3720; Apr. 2004; pp. 1-257.
Xin, et al.; Evaluation of Distributed Recovery in Large-Scale Storage Systems; 13th IEEE International Symposium on High Performance Distributed Computing; Jun. 2004; pp. 172-181.
Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner

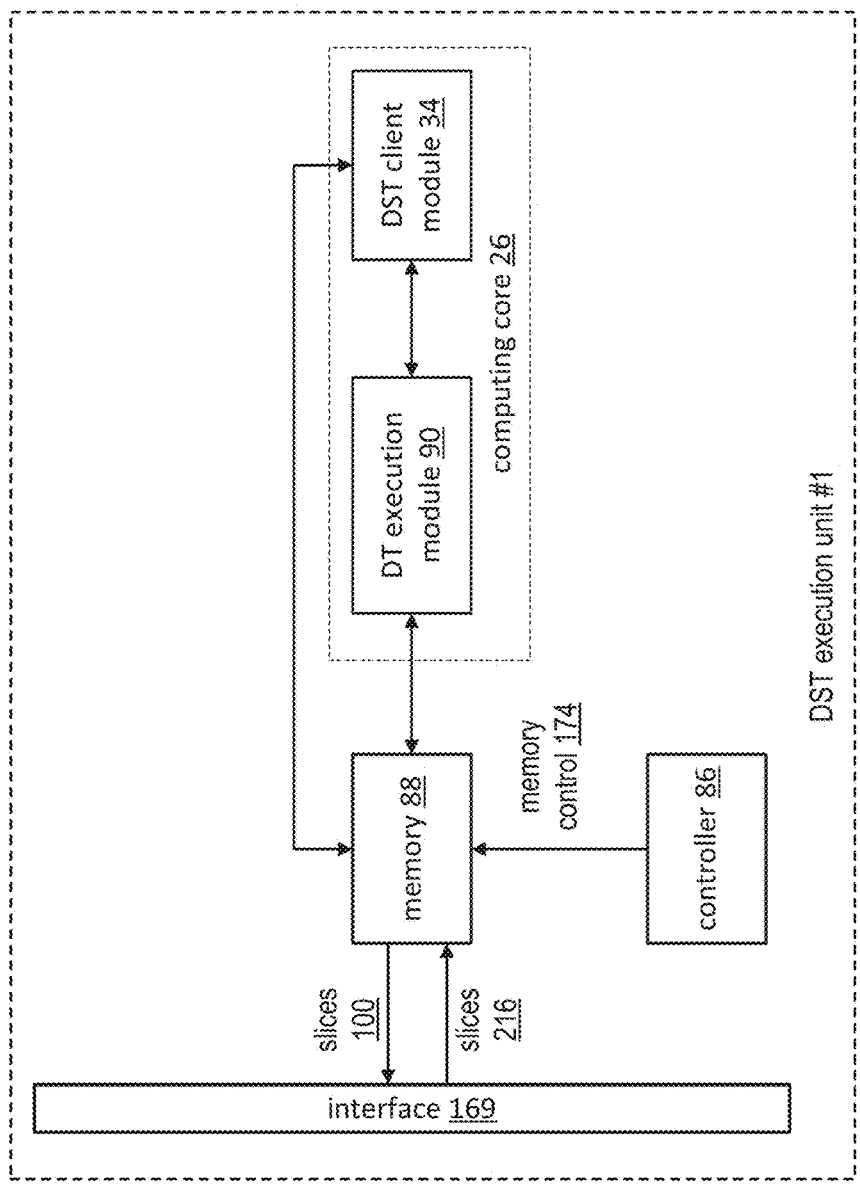
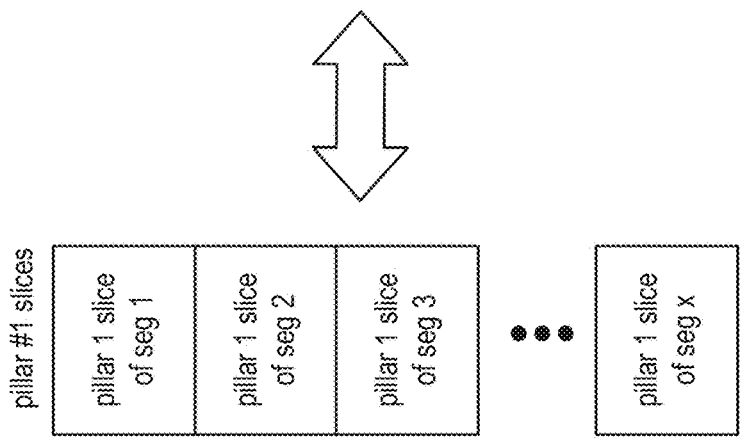
FIG. 24

FIG. 32

DST allocation info 242 | data partition info 320: data ID; No. of partitions; Addr. info for each partition; format conversion indication task execution info 322

| task 326 | task ordering 328 | data partition 330 | set of DT EX mods 332 | Name 334 | interm. result processing 336 | scratch pad storage 338 | intermediate result storage 340 |
|---|---|---|---|---|---|---|---|
| 1_1 | none | 2_1 - 2_z | 1_1, 2_1, 3_1, 4_1, & 5_1 | R1-1 | DST unit 1 | DST unit 1 | DST units 1-5 |
| 1_2 | none | 2_1 - 2_4 | 1_1, 2_1, 3_1, 4_1, & 5_1 | R1-2 | DST unit 1 | DST unit 1 | DST units 1-5 |
| 1_3 | none | 2_1 - 2_4<br>2_5 - 2_z | 1_1, 2_1, 3_1, 4_1, & 5_1<br>1_2, 2_2, 3_2, 4_2, & 5_2 | R1-3 | DST unit 2 | DST unit 2 | DST units 2-6 |
| 1_4 | after 1_3 | R1-3_1 - R1-3_4<br>R1-3_5 - R1-3_z | 1_1, 2_1, 3_1, 4_1, & 5_1<br>1_2, 2_2, 3_2, 4_2, & 5_2 | R1_4 | DST unit 3 | DST unit 3 | DST units 3-7 |
| 1_5 | after 1_4 | R1-4_1 - R1-4_z &<br>2_1 - 2_z | 1_1, 2_1, 3_1, 4_1, & 5_1<br>1_2, 2_2, 6_1, 7_1, & 7_2 | R1-5 | DST unit 1 | DST unit 1 | DST units 1-5 |
| 1_6 | after 1_1 & 1_5 | R1-1_1 - R1-1_z &<br>R1-5_1 - R1-5_z | 1_1, 2_1, 3_1, 4_1, & 5_1 | R1-6 | DST unit 2 | DST unit 2 | DST units 2-6 |
| 1_7 | after 1_2 & 1_5 | R1-2_1 - R1-2_z &<br>R1-5_1 - R1-5_z | 1_2, 2_2, 2_3, 2_4, 4_2, & 5_2 | R1-7 | DST unit 3 | DST unit 3 | DST units 3-7 |
| 2 | none | 2_1 - 2_z | 3_1, 4_1, 5_1, 6_1, & 7_1 | R2 | DST unit 7 | DST unit 7 | DST units 7, 1-4 |
| 3_1 | none (same as 1_3) | use R1_3 | | R1-1 | | | |
| 3_2 | after 3_1 | R1-3_1 - R1-3_z | 1_2, 2_2, 2_3, 2_4, 4_2, & 5_2 | R3-2 | DST unit 5 | DST unit 5 | DST units 5,6, 1-3 |

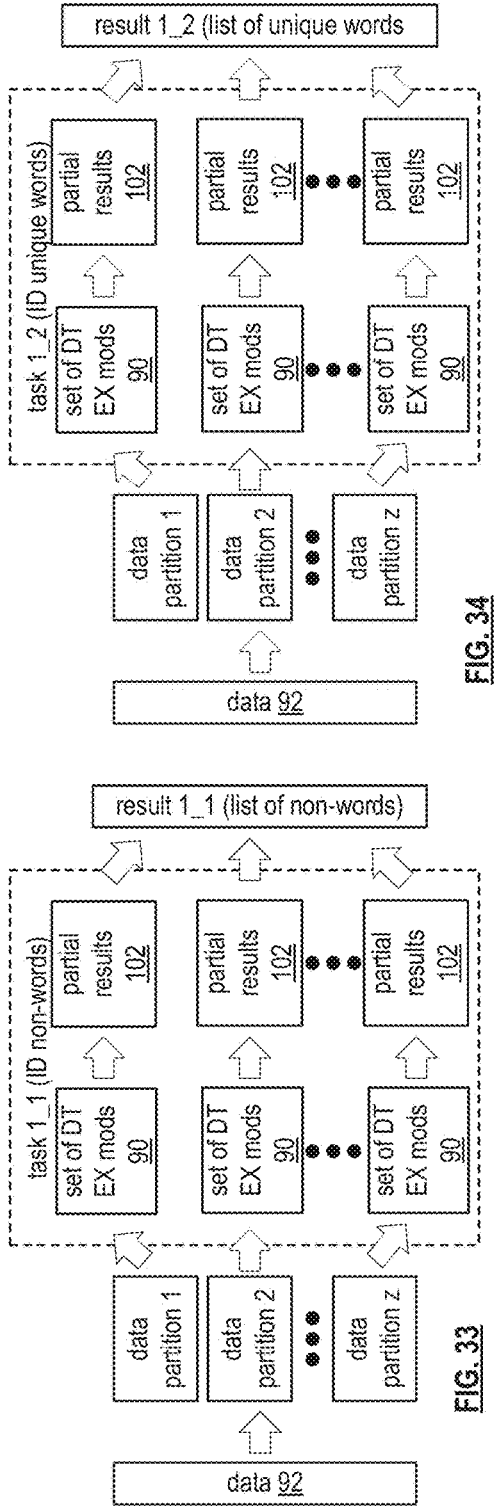
FIG. 33
FIG. 34
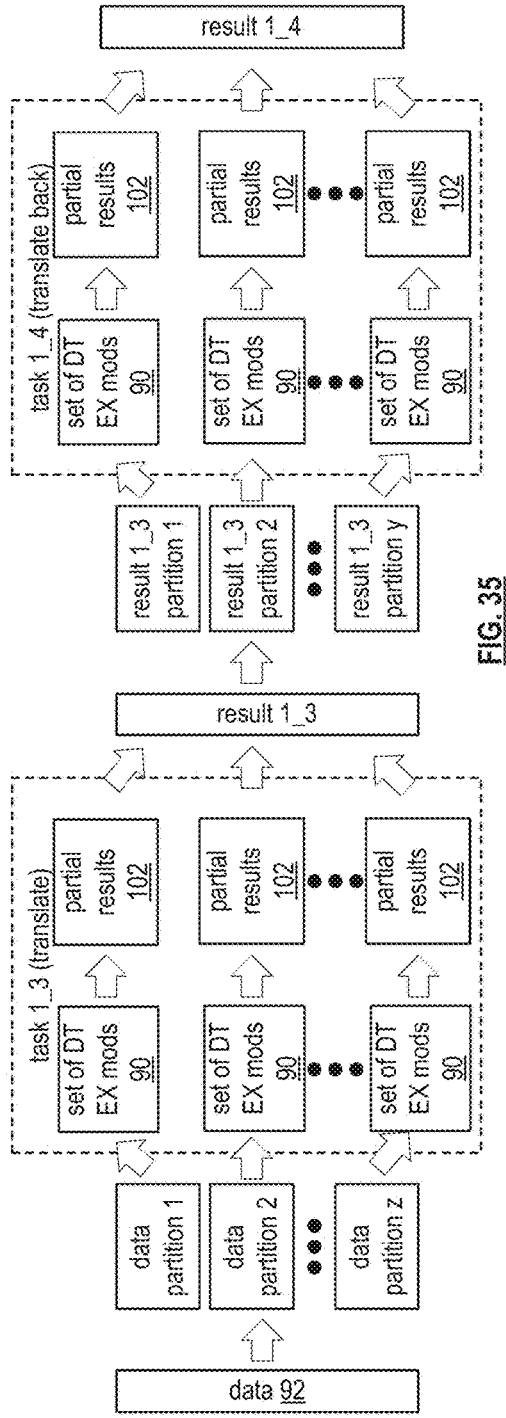
FIG. 35

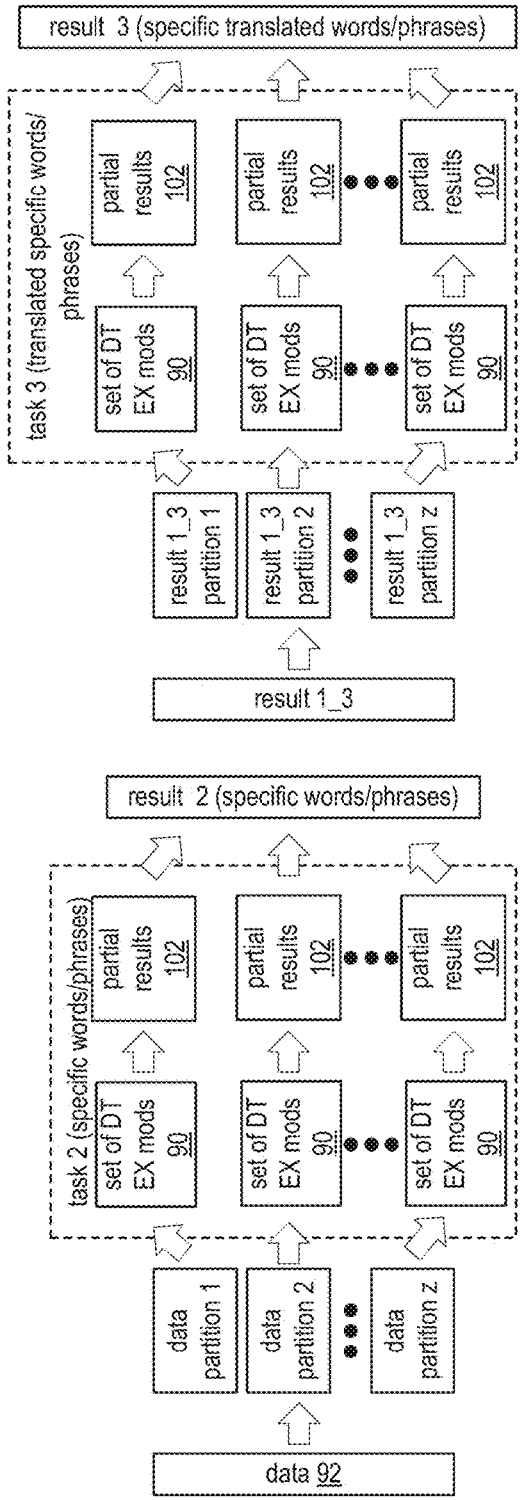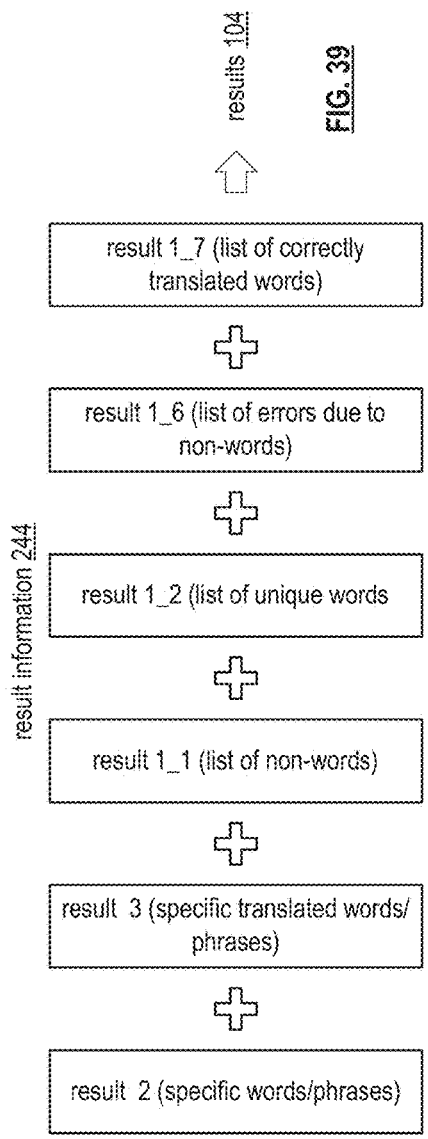

UPDATING SHARED GROUP INFORMATION IN A DISPERSED STORAGE NETWORK

CROSS REFERENCE TO RELATED PATENTS

The present U.S. Utility Patent Application claims priority pursuant to 35 U.S.C. § 119(e) to the following U.S. Provisional Patent Application which is hereby incorporated herein by reference in its entirety and made part of the present U.S. Utility patent application for all purposes:

1. U.S. Provisional Application Ser. No. 61/760,962, entitled "MANAGING A DISPERSED STORAGE NETWORK POWER CONSUMPTION," filed Feb. 5, 2013, pending.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Technical Field of the Invention

This invention relates generally to computer networks and more particularly to dispersed storage of data and distributed task processing of data.

Description of Related Art

Computing devices are known to communicate data, process data, and/or store data. Such computing devices range from wireless smart phones, laptops, tablets, personal computers (PC), work stations, video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc., on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 24 is a diagram of an example of a storage operation of a DST execution unit in accordance with the present invention;

FIG. 32 is a diagram of an example of DST allocation information for the example of FIG. 30 in accordance with the present invention;

FIGS. 33-38 are schematic block diagrams of the DSTN module performing the example of FIG. 30 in accordance with the present invention;

FIG. 39 is a diagram of an example of combining result information into final results for the example of FIG. 30 in accordance with the present invention;

DETAILED DESCRIPTION OF THE INVENTION

Figure 1:
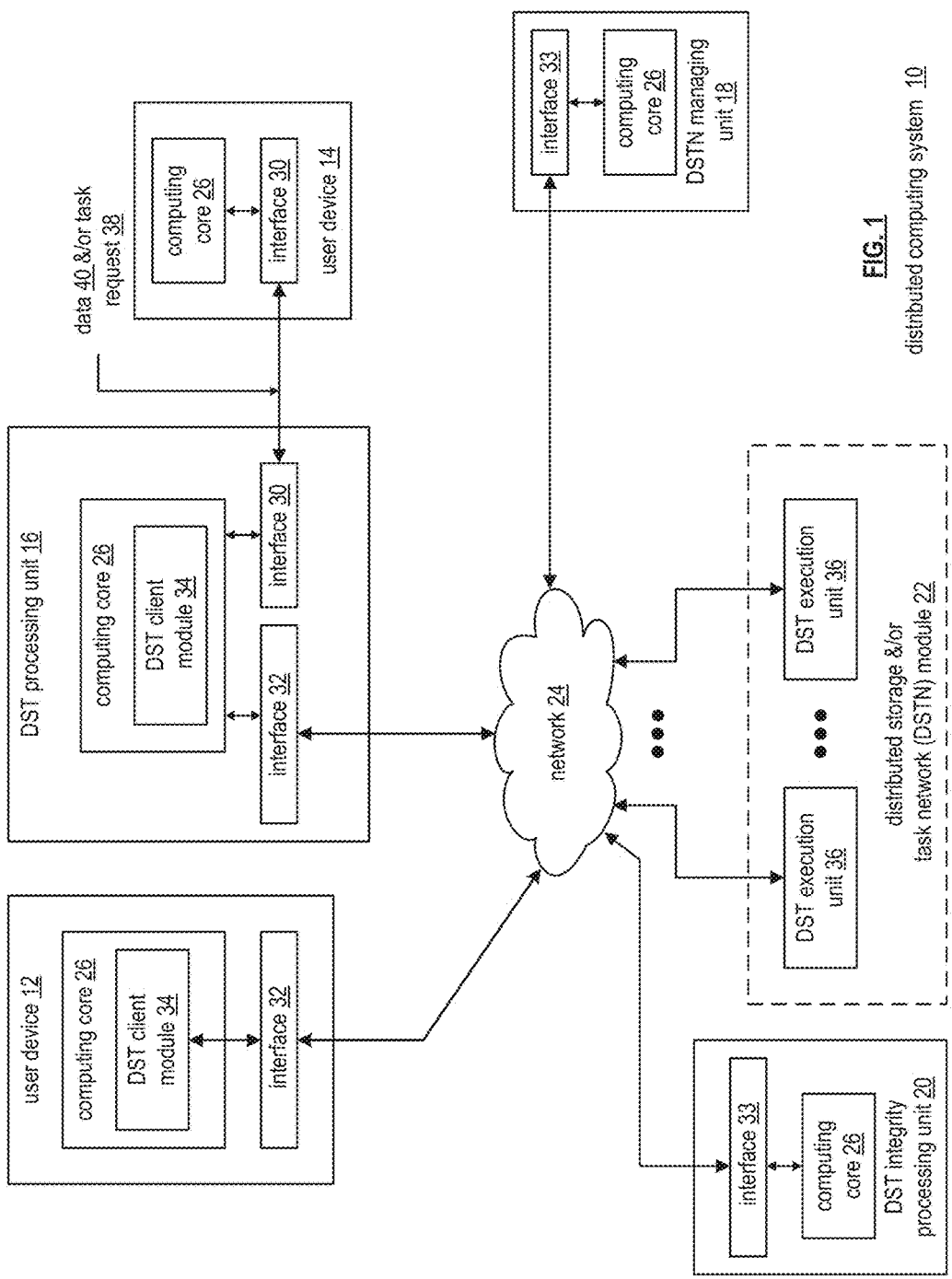
FIG. 1 is a schematic block diagram of an embodiment of a distributed computing system in accordance with the present invention.

FIG. 1 is a schematic block diagram of an embodiment of a distributed computing system 10 that includes a user device 12 and/or a user device 14, a distributed storage and/or task (DST) processing unit 16, a distributed storage and/or task network (DSTN) managing unit 18, a DST integrity processing unit 20, and a distributed storage and/or task network (DSTN) module 22. The components of the distributed computing system 10 are coupled via a network 24, which may include one or more wireless and/or wire lined communication systems; one or more private intranet systems and/or public internet systems; and/or one or more local area networks (LAN) and/or wide area networks (WAN).

The DSTN module 22 includes a plurality of distributed storage and/or task (DST) execution units 36 that may be located at geographically different sites (e.g., one in Chicago, one in Milwaukee, etc.). Each of the DST execution units is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc.

Each of the user devices 12-14, the DST processing unit 16, the DSTN managing unit 18, and the DST integrity processing unit 20 include a computing core 26 and may be a portable computing device and/or a fixed computing device. A portable computing device may be a social networking device, a gaming device, a cell phone, a smart phone, a personal digital assistant, a digital music player, a digital video player, a laptop computer, a handheld computer, a tablet, a video game controller, and/or any other portable device that includes a computing core. A fixed computing device may be a personal computer (PC), a computer server, a cable set-top box, a satellite receiver, a television set, a printer, a fax machine, home entertainment equipment, a video game console, and/or any type of home or office computing equipment. User device 12 and DST processing unit 16 are configured to include a DST client module 34.

With respect to interfaces, each interface 30, 32, and 33 includes software and/or hardware to support one or more communication links via the network 24 indirectly and/or directly. For example, interfaces 30 support a communication link (e.g., wired, wireless, direct, via a LAN, via the network 24, etc.) between user device 14 and the DST processing unit 16. As another example, interface 32 supports communication links (e.g., a wired connection, a wireless connection, a LAN connection, and/or any other type of connection to/from the network 24) between user device 12 and the DSTN module 22 and between the DST processing unit 16 and the DSTN module 22. As yet another example, interface 33 supports a communication link for each of the DSTN managing unit 18 and DST integrity processing unit 20 to the network 24.

The distributed computing system 10 is operable to support dispersed storage (DS) error encoded data storage and retrieval, to support distributed task processing on received data, and/or to support distributed task processing on stored data. In general and with respect to DS error encoded data storage and retrieval, the distributed computing system 10 supports three primary operations: storage management, data storage and retrieval (an example of which will be discussed with reference to FIGS. 20-26), and data storage integrity verification. In accordance with these three primary functions, data can be encoded, distributedly stored in physically different locations, and subsequently retrieved in a reliable and secure manner. Such a system is tolerant of a significant number of failures (e.g., up to a failure level, which may be greater than or equal to a pillar width minus a decode threshold minus one) that may result from individual storage device failures and/or network equipment failures without loss of data and without the need for a redundant or backup copy. Further, the system allows the data to be stored for an indefinite period of time without data loss and does so in a secure manner (e.g., the system is very resistant to attempts at hacking the data).

The second primary function (i.e., distributed data storage and retrieval) begins and ends with a user device 12-14. For instance, if a second type of user device 14 has data 40 to store in the DSTN module 22, it sends the data 40 to the DST processing unit 16 via its interface 30. The interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data 40.

To support storage management, the DSTN managing unit 18 performs DS management services. One such DS management service includes the DSTN managing unit 18 establishing distributed data storage parameters (e.g., vault creation, distributed storage parameters, security parameters, billing information, user profile information, etc.) for a user device 12-14 individually or as part of a group of user devices. For example, the DSTN managing unit 18 coordinates creation of a vault (e.g., a virtual memory block) within memory of the DSTN module 22 for a user device, a group of devices, or for public access and establishes per vault dispersed storage (DS) error encoding parameters for a vault. The DSTN managing unit 18 may facilitate storage of DS error encoding parameters for each vault of a plurality of vaults by updating registry information for the distributed computing system 10. The facilitating includes storing updated registry information in one or more of the DSTN module 22, the user device 12, the DST processing unit 16, and the DST integrity processing unit 20.

The DS error encoding parameters (e.g., or dispersed storage error coding parameters) include data segmenting information (e.g., how many segments data (e.g., a file, a group of files, a data block, etc.) is divided into), segment security information (e.g., per segment encryption, compression, integrity checksum, etc.), error coding information (e.g., pillar width, decode threshold, read threshold, write threshold, etc.), slicing information (e.g., the number of encoded data slices that will be created for each data segment); and slice security information (e.g., per encoded data slice encryption, compression, integrity checksum, etc.).

The DSTN managing unit 18 creates and stores user profile information (e.g., an access control list (ACL)) in local memory and/or within memory of the DSTN module 22. The user profile information includes authentication information, permissions, and/or the security parameters. The security parameters may include encryption/decryption scheme, one or more encryption keys, key generation scheme, and/or data encoding/decoding scheme.

The DSTN managing unit 18 creates billing information for a particular user, a user group, a vault access, public vault access, etc. For instance, the DSTN managing unit 18 tracks the number of times a user accesses a private vault and/or public vaults, which can be used to generate a per-access billing information. In another instance, the DSTN managing unit 18 tracks the amount of data stored and/or retrieved by a user device and/or a user group, which can be used to generate a per-data-amount billing information.

Another DS management service includes the DSTN managing unit 18 performing network operations, network administration, and/or network maintenance. Network operations includes authenticating user data allocation requests (e.g., read and/or write requests), managing creation of vaults, establishing authentication credentials for user devices, adding/deleting components (e.g., user devices, DST execution units, and/or DST processing units) from the distributed computing system 10, and/or establishing authentication credentials for DST execution units 36. Network administration includes monitoring devices and/or units for failures, maintaining vault information, determining device and/or unit activation status, determining device and/or unit loading, and/or determining any other system level operation that affects the performance level of the system 10. Network maintenance includes facilitating replacing, upgrading, repairing, and/or expanding a device and/or unit of the system 10.

To support data storage integrity verification within the distributed computing system 10, the DST integrity processing unit 20 performs rebuilding of 'bad' or missing encoded data slices. At a high level, the DST integrity processing unit 20 performs rebuilding by periodically attempting to retrieve/list encoded data slices, and/or slice names of the encoded data slices, from the DSTN module 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in memory of the DSTN module 22. Note that the DST integrity processing unit 20 may be a separate unit as shown, it may be included in the DSTN module 22, it may be included in the DST processing unit 16, and/or distributed among the DST execution units 36.

To support distributed task processing on received data, the distributed computing system 10 has two primary operations: DST (distributed storage and/or task processing) management and DST execution on received data (an example of which will be discussed with reference to FIGS. 3-19). With respect to the storage portion of the DST management, the DSTN managing unit 18 functions as previously described. With respect to the tasking processing of the DST management, the DSTN managing unit 18 performs distributed task processing (DTP) management services. One such DTP management service includes the DSTN managing unit 18 establishing DTP parameters (e.g., user-vault affiliation information, billing information, user-task information, etc.) for a user device 12-14 individually or as part of a group of user devices.

Another DTP management service includes the DSTN managing unit 18 performing DTP network operations, network administration (which is essentially the same as described above), and/or network maintenance (which is essentially the same as described above). Network operations include, but are not limited to, authenticating user task processing requests (e.g., valid request, valid user, etc.), authenticating results and/or partial results, establishing DTP authentication credentials for user devices, adding/deleting components (e.g., user devices, DST execution units, and/or DST processing units) from the distributed computing system, and/or establishing DTP authentication credentials for DST execution units.

To support distributed task processing on stored data, the distributed computing system 10 has two primary operations: DST (distributed storage and/or task) management and DST execution on stored data. With respect to the DST execution on stored data, if the second type of user device 14 has a task request 38 for execution by the DSTN module 22, it sends the task request 38 to the DST processing unit 16 via its interface 30. An example of DST execution on stored data will be discussed in greater detail with reference to FIGS. 27-39. With respect to the DST management, it is substantially similar to the DST management to support distributed task processing on received data.

Figure 2:
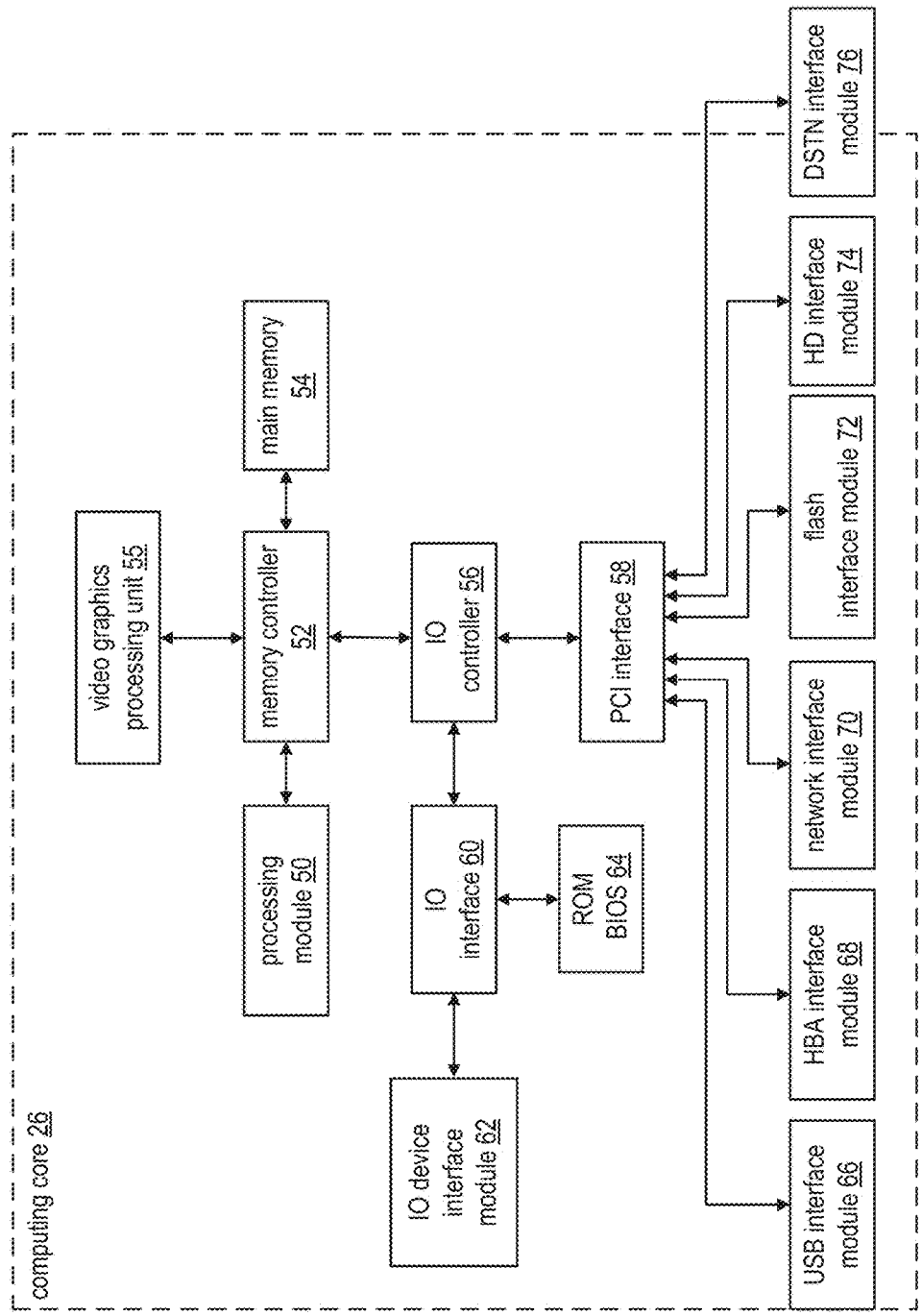
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (TO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSTN interface module 76.

The DSTN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSTN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
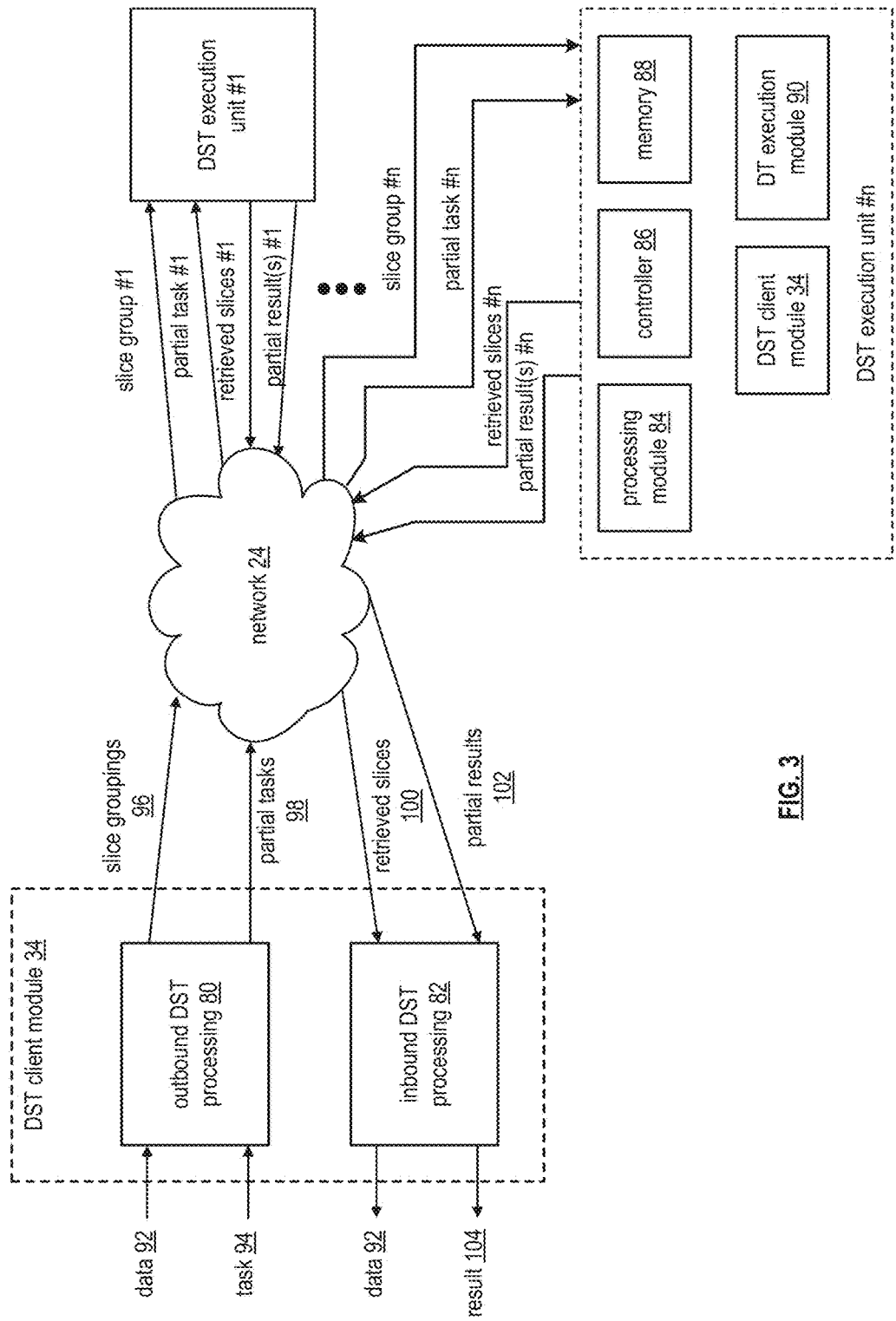
FIG. 3 is a diagram of an example of a distributed storage and task processing in accordance with the present invention.

FIG. 3 is a diagram of an example of the distributed computing system performing a distributed storage and task processing operation. The distributed computing system includes a DST (distributed storage and/or task) client module 34 (which may be in user device 14 and/or in DST processing unit 16 of FIG. 1), a network 24, a plurality of DST execution units 1-n that includes two or more DST execution units 36 of FIG. 1 (which form at least a portion of DSTN module 22 of FIG. 1), a DST managing module (not shown), and a DST integrity verification module (not shown). The DST client module 34 includes an outbound DST processing section 80 and an inbound DST processing section 82. Each of the DST execution units 1-n includes a controller 86, a processing module 84, memory 88, a DT (distributed task) execution module 90, and a DST client module 34.

In an example of operation, the DST client module 34 receives data 92 and one or more tasks 94 to be performed upon the data 92. The data 92 may be of any size and of any content, where, due to the size (e.g., greater than a few Terabytes), the content (e.g., secure data, etc.), and/or task(s) (e.g., MIPS intensive), distributed processing of the task(s) on the data is desired. For example, the data 92 may be one or more digital books, a copy of a company's emails, a large-scale Internet search, a video security file, one or more entertainment video files (e.g., television programs, movies, etc.), data files, and/or any other large amount of data (e.g., greater than a few Terabytes).

Within the DST client module 34, the outbound DST processing section 80 receives the data 92 and the task(s) 94. The outbound DST processing section 80 processes the data 92 to produce slice groupings 96. As an example of such processing, the outbound DST processing section 80 partitions the data 92 into a plurality of data partitions. For each data partition, the outbound DST processing section 80 dispersed storage (DS) error encodes the data partition to produce encoded data slices and groups the encoded data slices into a slice grouping 96. In addition, the outbound DST processing section 80 partitions the task 94 into partial tasks 98, where the number of partial tasks 98 may correspond to the number of slice groupings 96.

The outbound DST processing section 80 then sends, via the network 24, the slice groupings 96 and the partial tasks 98 to the DST execution units 1-n of the DSTN module 22 of FIG. 1. For example, the outbound DST processing section 80 sends slice group 1 and partial task 1 to DST execution unit 1. As another example, the outbound DST processing section 80 sends slice group #n and partial task #n to DST execution unit #n.

Each DST execution unit performs its partial task 98 upon its slice group 96 to produce partial results 102. For example, DST execution unit #1 performs partial task #1 on slice group #1 to produce a partial result #1, for results. As a more specific example, slice group #1 corresponds to a data partition of a series of digital books and the partial task #1 corresponds to searching for specific phrases, recording where the phrase is found, and establishing a phrase count. In this more specific example, the partial result #1 includes information as to where the phrase was found and includes the phrase count.

Upon completion of generating their respective partial results 102, the DST execution units send, via the network 24, their partial results 102 to the inbound DST processing section 82 of the DST client module 34. The inbound DST processing section 82 processes the received partial results 102 to produce a result 104. Continuing with the specific example of the preceding paragraph, the inbound DST processing section 82 combines the phrase count from each of the DST execution units 36 to produce a total phrase count. In addition, the inbound DST processing section 82 combines the 'where the phrase was found' information from each of the DST execution units 36 within their respective data partitions to produce 'where the phrase was found' information for the series of digital books.

In another example of operation, the DST client module 34 requests retrieval of stored data within the memory of the DST execution units 36 (e.g., memory of the DSTN module). In this example, the task 94 is retrieve data stored in the memory of the DSTN module. Accordingly, the outbound DST processing section 80 converts the task 94 into a plurality of partial tasks 98 and sends the partial tasks 98 to the respective DST execution units 1-n.

In response to the partial task 98 of retrieving stored data, a DST execution unit 36 identifies the corresponding encoded data slices 100 and retrieves them. For example, DST execution unit #1 receives partial task #1 and retrieves, in response thereto, retrieved slices #1. The DST execution units 36 send their respective retrieved slices 100 to the inbound DST processing section 82 via the network 24.

The inbound DST processing section 82 converts the retrieved slices 100 into data 92. For example, the inbound DST processing section 82 de-groups the retrieved slices 100 to produce encoded slices per data partition. The inbound DST processing section 82 then DS error decodes the encoded slices per data partition to produce data partitions. The inbound DST processing section 82 de-partitions the data partitions to recapture the data 92.

Figure 4:
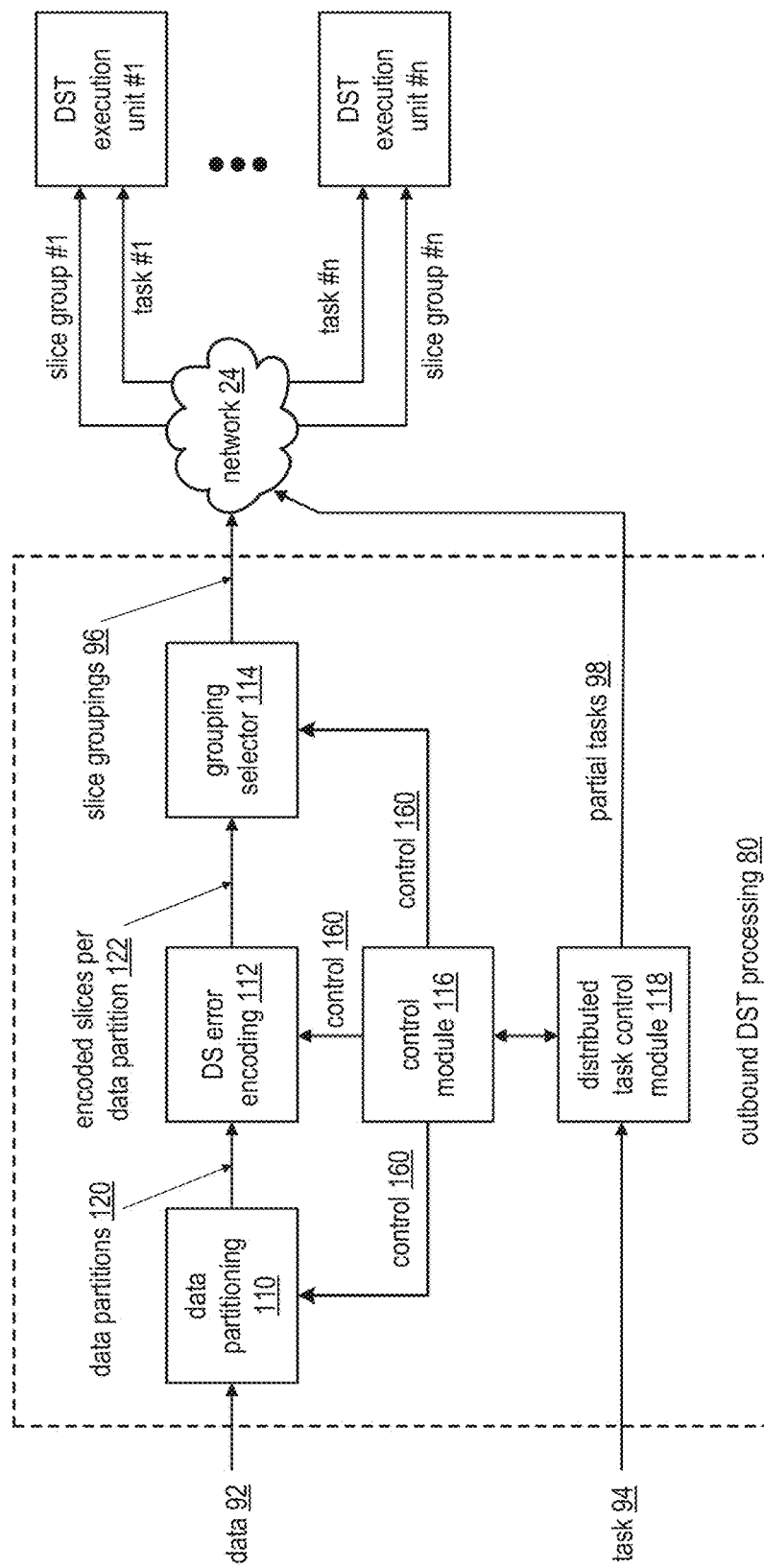
FIG. 4 is a schematic block diagram of an embodiment of an outbound distributed storage and/or task (DST) processing in accordance with the present invention.

FIG. 4 is a schematic block diagram of an embodiment of an outbound distributed storage and/or task (DST) processing section 80 of a DST client module 34 FIG. 1 coupled to a DSTN module 22 of a FIG. 1 (e.g., a plurality of n DST execution units 36) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 partitions data 92 into a plurality of data partitions 120. The number of partitions and the size of the partitions may be selected by the control module 116 via control 160 based on the data 92 (e.g., its size, its content, etc.), a corresponding task 94 to be performed (e.g., simple, complex, single step, multiple steps, etc.), DS encoding parameters (e.g., pillar width, decode threshold, write threshold, segment security parameters, slice security parameters, etc.), capabilities of the DST execution units 36 (e.g., processing resources, availability of processing recourses, etc.), and/or as may be inputted by a user, system administrator, or other operator (human or automated). For example, the data partitioning module 110 partitions the data 92 (e.g., 100 Terabytes) into 100,000 data segments, each being 1 Gigabyte in size. Alternatively, the data partitioning module 110 partitions the data 92 into a plurality of data segments, where some of data segments are of a different size, are of the same size, or a combination thereof.

The DS error encoding module 112 receives the data partitions 120 in a serial manner, a parallel manner, and/or a combination thereof. For each data partition 120, the DS error encoding module 112 DS error encodes the data partition 120 in accordance with control information 160 from the control module 116 to produce encoded data slices 122. The DS error encoding includes segmenting the data partition into data segments, segment security processing (e.g., encryption, compression, watermarking, integrity check (e.g., CRC), etc.), error encoding, slicing, and/or per slice security processing (e.g., encryption, compression, watermarking, integrity check (e.g., CRC), etc.). The control information 160 indicates which steps of the DS error encoding are active for a given data partition and, for active steps, indicates the parameters for the step. For example, control information 160 indicates that the error encoding is active and includes error encoding parameters (e.g., pillar width, decode threshold, write threshold, read threshold, type of error encoding, etc.).

The grouping selector module 114 groups the encoded slices 122 of a data partition into a set of slice groupings 96. The number of slice groupings corresponds to the number of DST execution units 36 identified for a particular task 94. For example, if five DST execution units 36 are identified for the particular task 94, the grouping selectors module groups the encoded slices 122 of a data partition into five slice groupings 96. The grouping selectors module 114 outputs the slice groupings 96 to the corresponding DST execution units 36 via the network 24.

The distributed task control module 118 receives the task 94 and converts the task 94 into a set of partial tasks 98. For example, the distributed task control module 118 receives a task to find where in the data (e.g., a series of books) a phrase occurs and a total count of the phrase usage in the data. In this example, the distributed task control module 118 replicates the task 94 for each DST execution unit 36 to produce the partial tasks 98. In another example, the distributed task control module 118 receives a task to find where in the data a first phrase occurs, where in the data a second phrase occurs, and a total count for each phrase usage in the data. In this example, the distributed task control module 118 generates a first set of partial tasks 98 for finding and counting the first phrase and a second set of partial tasks for finding and counting the second phrase. The distributed task control module 118 sends respective first and/or second partial tasks 98 to each DST execution unit 36.

Figure 5:
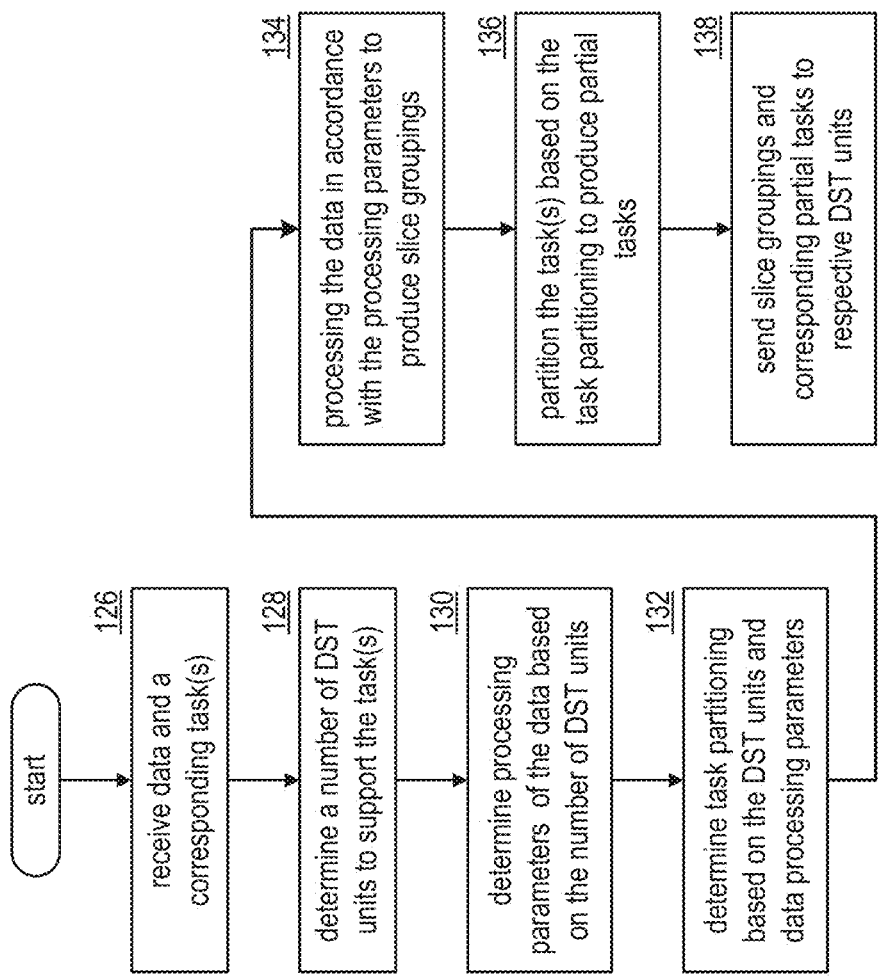
FIG. 5 is a logic diagram of an example of a method for outbound DST processing in accordance with the present invention.

FIG. 5 is a logic diagram of an example of a method for outbound distributed storage and task (DST) processing that begins at step 126 where a DST client module receives data and one or more corresponding tasks. The method continues at step 128 where the DST client module determines a number of DST units to support the task for one or more data partitions. For example, the DST client module may determine the number of DST units to support the task based on the size of the data, the requested task, the content of the data, a predetermined number (e.g., user indicated, system administrator determined, etc.), available DST units, capability of the DST units, and/or any other factor regarding distributed task processing of the data. The DST client module may select the same DST units for each data partition, may select different DST units for the data partitions, or a combination thereof.

The method continues at step 130 where the DST client module determines processing parameters of the data based on the number of DST units selected for distributed task processing. The processing parameters include data partitioning information, DS encoding parameters, and/or slice grouping information. The data partitioning information includes a number of data partitions, size of each data partition, and/or organization of the data partitions (e.g., number of data blocks in a partition, the size of the data blocks, and arrangement of the data blocks). The DS encoding parameters include segmenting information, segment security information, error encoding information (e.g., dispersed storage error encoding function parameters including one or more of pillar width, decode threshold, write threshold, read threshold, generator matrix), slicing information, and/or per slice security information. The slice grouping information includes information regarding how to arrange the encoded data slices into groups for the selected DST units. As a specific example, if the DST client module determines that five DST units are needed to support the task, then it determines that the error encoding parameters include a pillar width of five and a decode threshold of three.

The method continues at step 132 where the DST client module determines task partitioning information (e.g., how to partition the tasks) based on the selected DST units and data processing parameters. The data processing parameters include the processing parameters and DST unit capability information. The DST unit capability information includes the number of DT (distributed task) execution units, execution capabilities of each DT execution unit (e.g., MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.)), and/or any information germane to executing one or more tasks.

The method continues at step 134 where the DST client module processes the data in accordance with the processing parameters to produce slice groupings. The method continues at step 136 where the DST client module partitions the task based on the task partitioning information to produce a set of partial tasks. The method continues at step 138 where the DST client module sends the slice groupings and the corresponding partial tasks to respective DST units.

Figure 6:
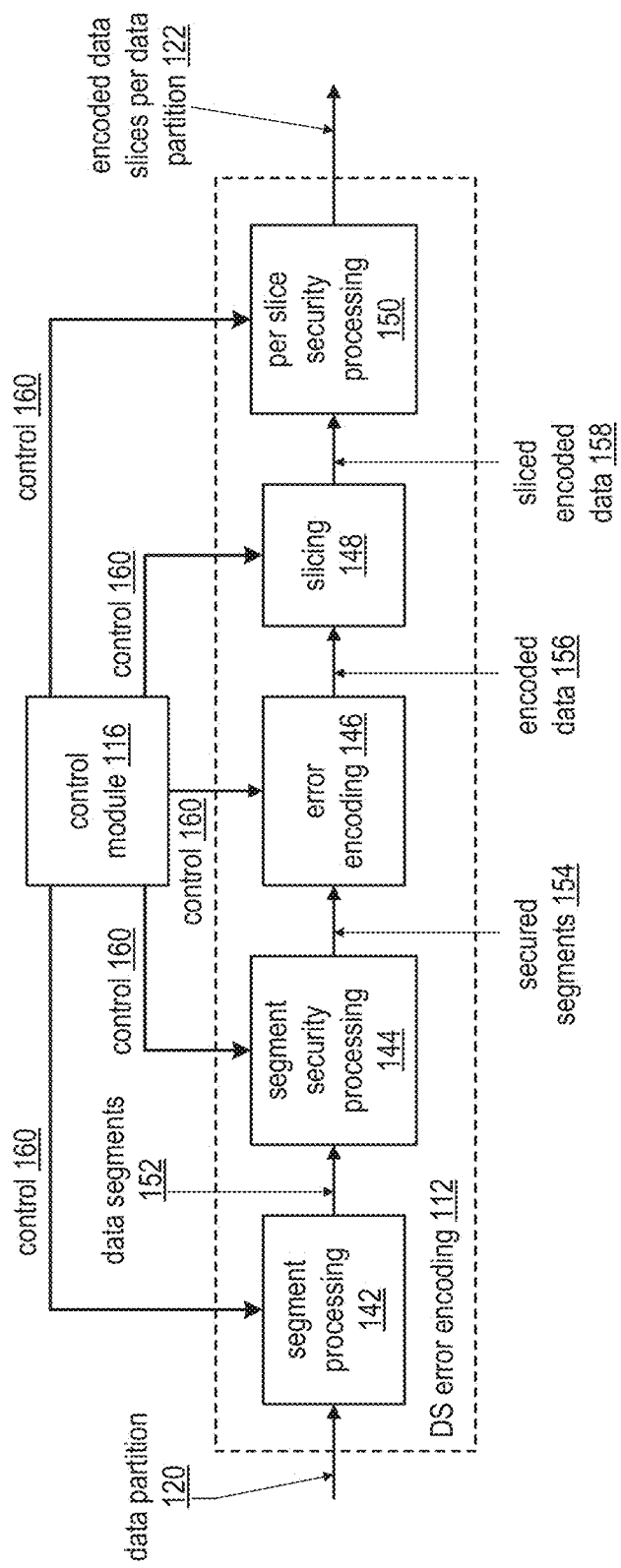
FIG. 6 is a schematic block diagram of an embodiment of a dispersed error encoding in accordance with the present invention.

FIG. 6 is a schematic block diagram of an embodiment of the dispersed storage (DS) error encoding module 112 of an outbound distributed storage and task (DST) processing section. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives a data partition 120 from a data partitioning module and receives segmenting information as the control information 160 from the control module 116. The segmenting information indicates how the segment processing module 142 is to segment the data partition 120. For example, the segmenting information indicates how many rows to segment the data based on a decode threshold of an error encoding scheme, indicates how many columns to segment the data into based on a number and size of data blocks within the data partition 120, and indicates how many columns to include in a data segment 152. The segment processing module 142 segments the data 120 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., cyclic redundancy check (CRC), etc.), and/or any other type of digital security. For example, when the segment security processing module 144 is enabled, it may compress a data segment 152, encrypt the compressed data segment, and generate a CRC value for the encrypted data segment to produce a secure data segment 154. When the segment security processing module 144 is not enabled, it passes the data segments 152 to the error encoding module 146 or is bypassed such that the data segments 152 are provided to the error encoding module 146.

The error encoding module 146 encodes the secure data segments 154 in accordance with error correction encoding parameters received as control information 160 from the control module 116. The error correction encoding parameters (e.g., also referred to as dispersed storage error coding parameters) include identifying an error correction encoding scheme (e.g., forward error correction algorithm, a Reed-Solomon based algorithm, an online coding algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment 154 to produce an encoded data segment 156.

The slicing module 148 slices the encoded data segment 156 in accordance with the pillar width of the error correction encoding parameters received as control information 160. For example, if the pillar width is five, the slicing module 148 slices an encoded data segment 156 into a set of five encoded data slices. As such, for a plurality of encoded data segments 156 for a given data partition, the slicing module outputs a plurality of sets of encoded data slices 158.

The per slice security processing module 150, when enabled by the control module 116, secures each encoded data slice 158 based on slice security information received as control information 160 from the control module 116. The slice security information includes data compression, encryption, watermarking, integrity check (e.g., CRC, etc.), and/or any other type of digital security. For example, when the per slice security processing module 150 is enabled, it compresses an encoded data slice 158, encrypts the compressed encoded data slice, and generates a CRC value for the encrypted encoded data slice to produce a secure encoded data slice 122. When the per slice security processing module 150 is not enabled, it passes the encoded data slices 158 or is bypassed such that the encoded data slices 158 are the output of the DS error encoding module 112. Note that the control module 116 may be omitted and each module stores its own parameters.

Figure 7:
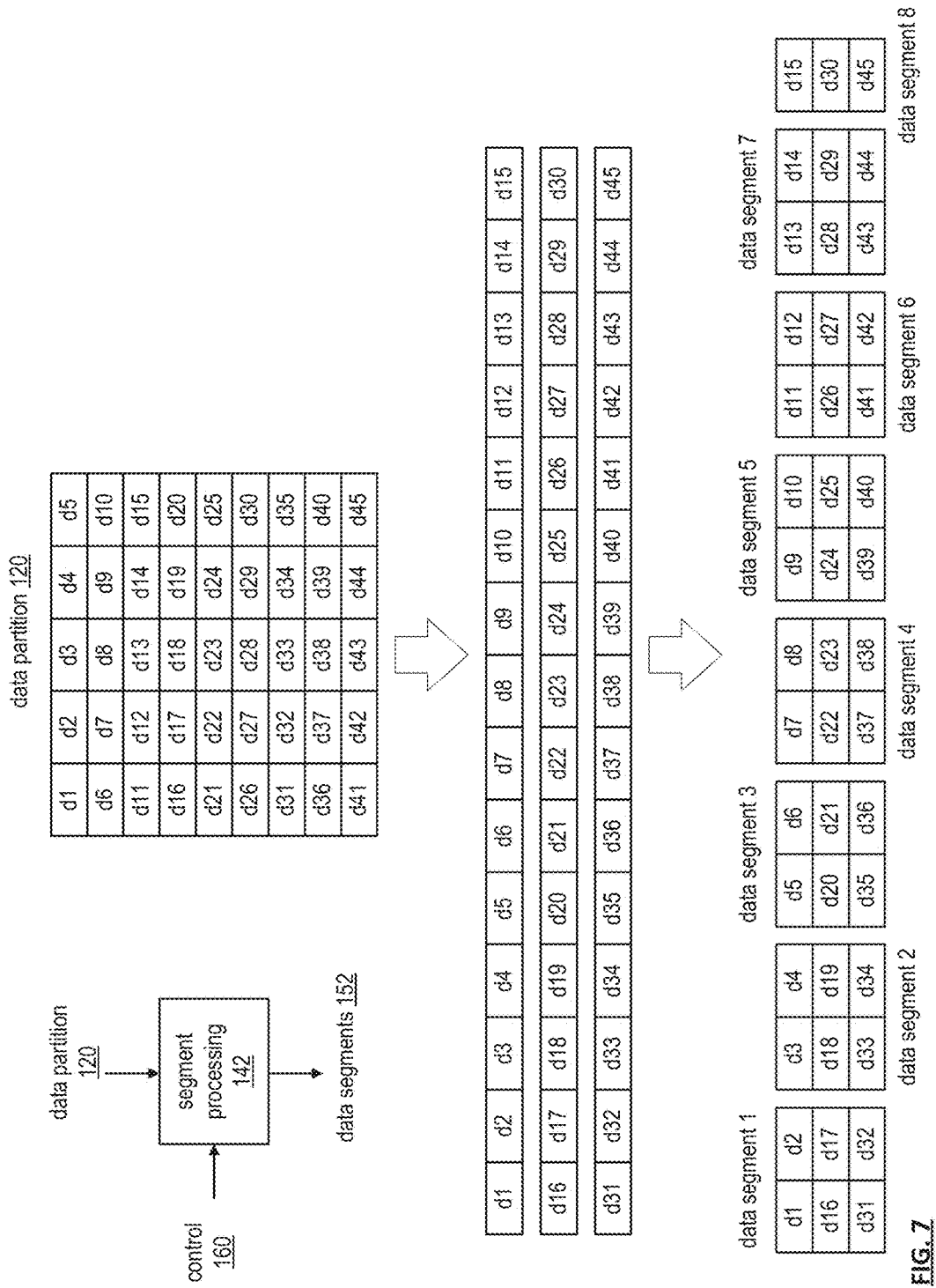
FIG. 7 is a diagram of an example of a segment processing of the dispersed error encoding in accordance with the present invention.

FIG. 7 is a diagram of an example of a segment processing of a dispersed storage (DS) error encoding module. In this example, a segment processing module 142 receives a data partition 120 that includes 45 data blocks (e.g., d1-d45), receives segmenting information (i.e., control information 160) from a control module, and segments the data partition 120 in accordance with the control information 160 to produce data segments 152. Each data block may be of the same size as other data blocks or of a different size. In addition, the size of each data block may be a few bytes to megabytes of data. As previously mentioned, the segmenting information indicates how many rows to segment the data partition into, indicates how many columns to segment the data partition into, and indicates how many columns to include in a data segment.

In this example, the decode threshold of the error encoding scheme is three; as such the number of rows to divide the data partition into is three. The number of columns for each row is set to 15, which is based on the number and size of data blocks. The data blocks of the data partition are arranged in rows and columns in a sequential order (i.e., the first row includes the first 15 data blocks; the second row includes the second 15 data blocks; and the third row includes the last 15 data blocks).

With the data blocks arranged into the desired sequential order, they are divided into data segments based on the segmenting information. In this example, the data partition is divided into 8 data segments; the first 7 include 2 columns of three rows and the last includes 1 column of three rows. Note that the first row of the 8 data segments is in sequential order of the first 15 data blocks; the second row of the 8 data segments in sequential order of the second 15 data blocks; and the third row of the 8 data segments in sequential order of the last 15 data blocks. Note that the number of data blocks, the grouping of the data blocks into segments, and size of the data blocks may vary to accommodate the desired distributed task processing function.

Figure 8:
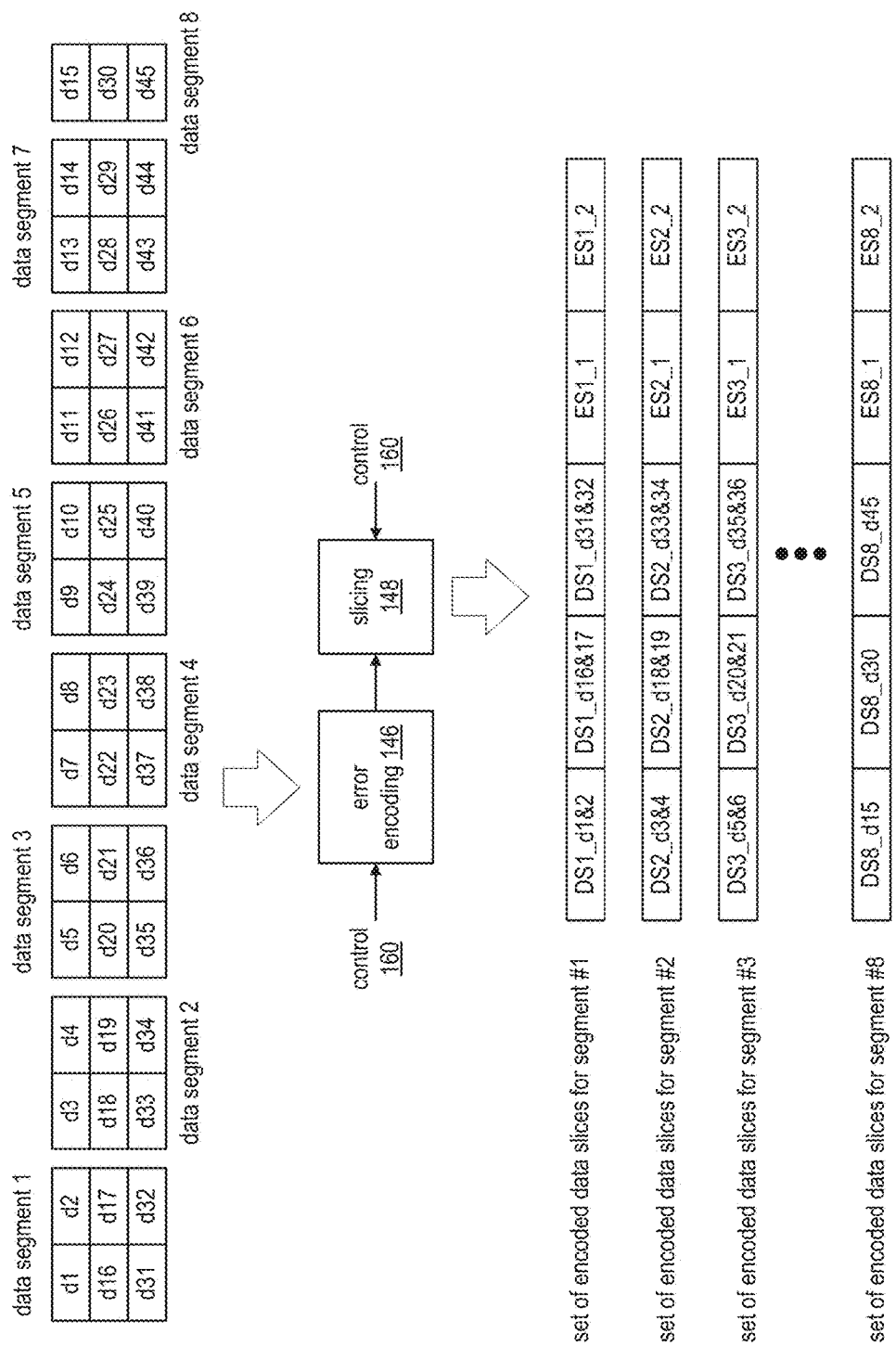
FIG. 8 is a diagram of an example of error encoding and slicing processing of the dispersed error encoding in accordance with the present invention.

FIG. 8 is a diagram of an example of error encoding and slicing processing of the dispersed error encoding processing the data segments of FIG. 7. In this example, data segment 1 includes 3 rows with each row being treated as one word for encoding. As such, data segment 1 includes three words for encoding: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

In operation, an error encoding module 146 and a slicing module 148 convert each data segment into a set of encoded data slices in accordance with error correction encoding parameters as control information 160. More specifically, when the error correction encoding parameters indicate a unity matrix Reed-Solomon based encoding algorithm, 5 pillars, and decode threshold of 3, the first three encoded data slices of the set of encoded data slices for a data segment are substantially similar to the corresponding word of the data segment. For instance, when the unity matrix Reed-Solomon based encoding algorithm is applied to data segment 1, the content of the first encoded data slice (DS1_d1&2) of the first set of encoded data slices (e.g., corresponding to data segment 1) is substantially similar to content of the first word (e.g., d1 & d2); the content of the second encoded data slice (DS1_d16&17) of the first set of encoded data slices is substantially similar to content of the second word (e.g., d16 & d17); and the content of the third encoded data slice (DS 1_d31&32) of the first set of encoded data slices is substantially similar to content of the third word (e.g., d31 & d32).

The content of the fourth and fifth encoded data slices (e.g., ES1_1 and ES1_2) of the first set of encoded data slices include error correction data based on the first-third words of the first data segment. With such an encoding and slicing scheme, retrieving any three of the five encoded data slices allows the data segment to be accurately reconstructed.

The encoding and slicing of data segments 2-7 yield sets of encoded data slices similar to the set of encoded data slices of data segment 1. For instance, the content of the first encoded data slice (DS2_d3&4) of the second set of encoded data slices (e.g., corresponding to data segment 2) is substantially similar to content of the first word (e.g., d3 & d4); the content of the second encoded data slice (DS2_d18&19) of the second set of encoded data slices is substantially similar to content of the second word (e.g., d18 & d19); and the content of the third encoded data slice (DS2_d33&34) of the second set of encoded data slices is substantially similar to content of the third word (e.g., d33 & d34). The content of the fourth and fifth encoded data slices (e.g., ES1_1 and ES1_2) of the second set of encoded data slices includes error correction data based on the first-third words of the second data segment.

Figure 9:
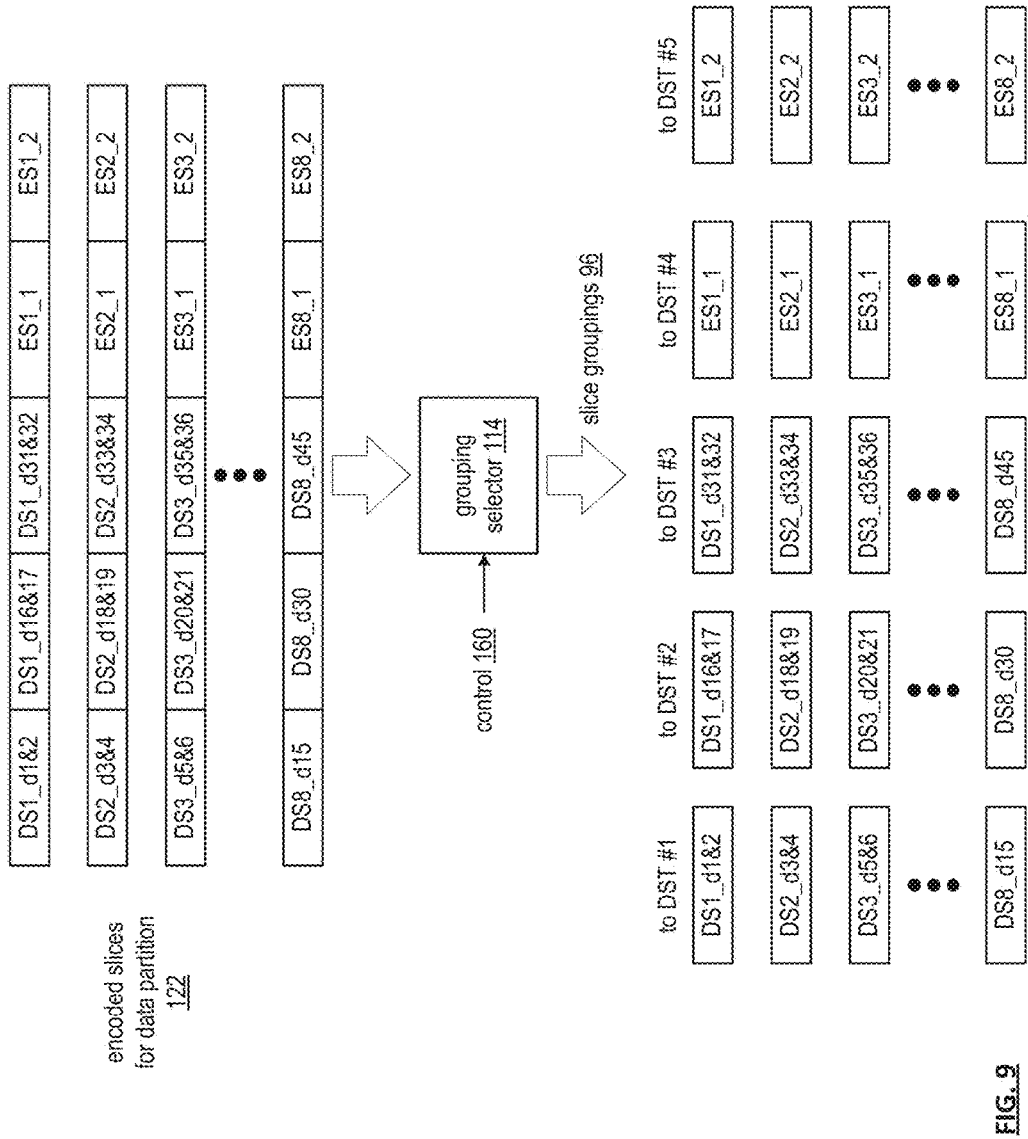
FIG. 9 is a diagram of an example of grouping selection processing of the outbound DST processing in accordance with the present invention.

FIG. 9 is a diagram of an example of grouping selection processing of an outbound distributed storage and task (DST) processing in accordance with group selection information as control information 160 from a control module. Encoded slices for data partition 122 are grouped in accordance with the control information 160 to produce slice groupings 96. In this example, a grouping selector module 114 organizes the encoded data slices into five slice groupings (e.g., one for each DST execution unit of a distributed storage and task network (DSTN) module). As a specific example, the grouping selector module 114 creates a first slice grouping for a DST execution unit #1, which includes first encoded slices of each of the sets of encoded slices. As such, the first DST execution unit receives encoded data slices corresponding to data blocks 1-15 (e.g., encoded data slices of contiguous data).

The grouping selector module 114 also creates a second slice grouping for a DST execution unit #2, which includes second encoded slices of each of the sets of encoded slices. As such, the second DST execution unit receives encoded data slices corresponding to data blocks 16-30. The grouping selector module 114 further creates a third slice grouping for DST execution unit #3, which includes third encoded slices of each of the sets of encoded slices. As such, the third DST execution unit receives encoded data slices corresponding to data blocks 31-45.

The grouping selector module 114 creates a fourth slice grouping for DST execution unit #4, which includes fourth encoded slices of each of the sets of encoded slices. As such, the fourth DST execution unit receives encoded data slices corresponding to first error encoding information (e.g., encoded data slices of error coding (EC) data). The grouping selector module 114 further creates a fifth slice grouping for DST execution unit #5, which includes fifth encoded slices of each of the sets of encoded slices. As such, the fifth DST execution unit receives encoded data slices corresponding to second error encoding information.

Figure 10:
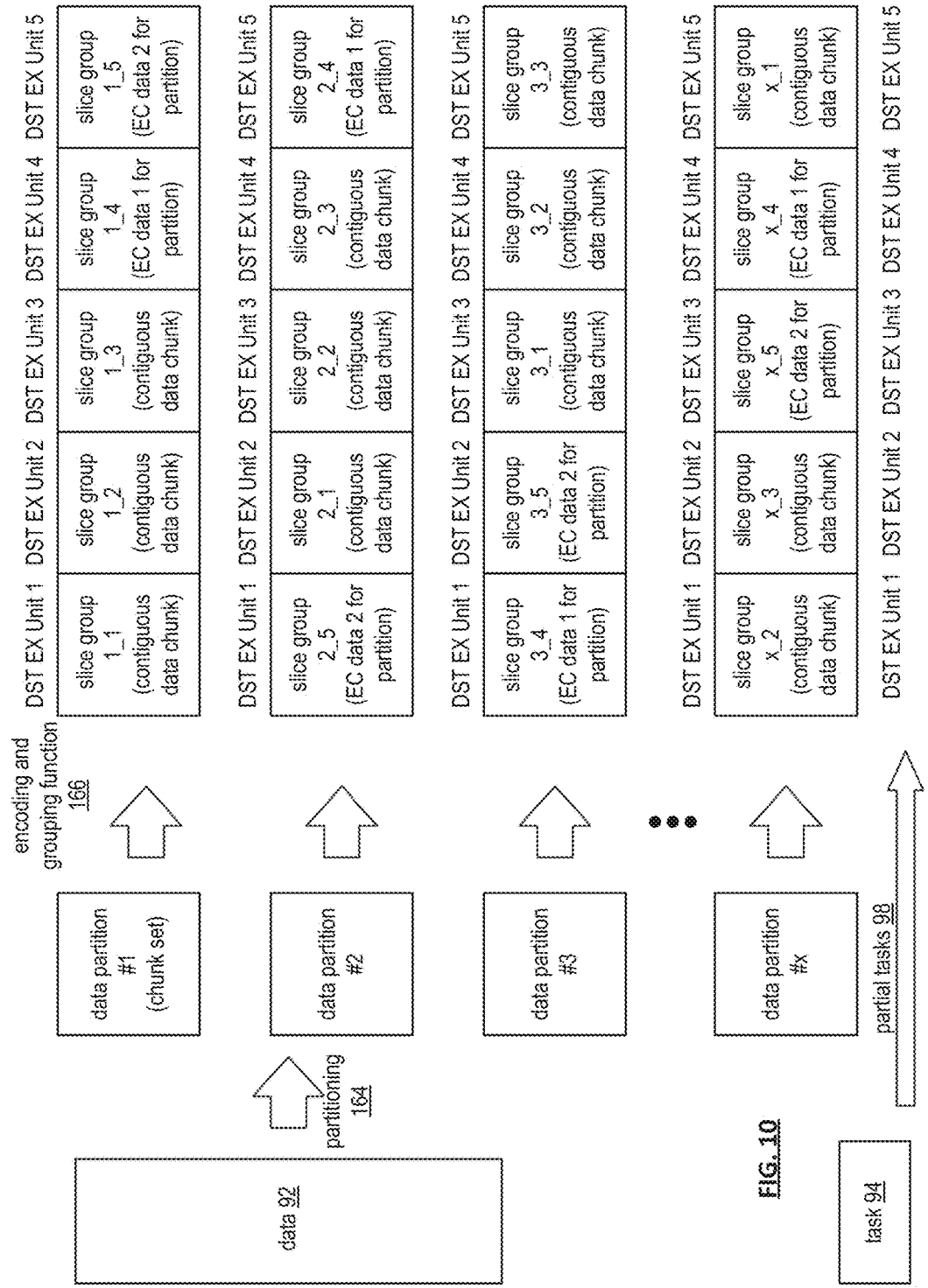
FIG. 10 is a diagram of an example of converting data into slice groups in accordance with the present invention.

FIG. 10 is a diagram of an example of converting data 92 into slice groups that expands on the preceding figures. As shown, the data 92 is partitioned in accordance with a partitioning function 164 into a plurality of data partitions (1-x, where x is an integer greater than 4). Each data partition (or chunkset of data) is encoded and grouped into slice groupings as previously discussed by an encoding and grouping function 166. For a given data partition, the slice groupings are sent to distributed storage and task (DST)

execution units. From data partition to data partition, the ordering of the slice groupings to the DST execution units may vary.

For example, the slice groupings of data partition #1 is sent to the DST execution units such that the first DST execution receives first encoded data slices of each of the sets of encoded data slices, which corresponds to a first continuous data chunk of the first data partition (e.g., refer to FIG. 9), a second DST execution receives second encoded data slices of each of the sets of encoded data slices, which corresponds to a second continuous data chunk of the first data partition, etc.

For the second data partition, the slice groupings may be sent to the DST execution units in a different order than it was done for the first data partition. For instance, the first slice grouping of the second data partition (e.g., slice group 2_1) is sent to the second DST execution unit; the second slice grouping of the second data partition (e.g., slice group 2_2) is sent to the third DST execution unit; the third slice grouping of the second data partition (e.g., slice group 2_3) is sent to the fourth DST execution unit; the fourth slice grouping of the second data partition (e.g., slice group 2_4, which includes first error coding information) is sent to the fifth DST execution unit; and the fifth slice grouping of the second data partition (e.g., slice group 2_5, which includes second error coding information) is sent to the first DST execution unit.

The pattern of sending the slice groupings to the set of DST execution units may vary in a predicted pattern, a random pattern, and/or a combination thereof from data partition to data partition. In addition, from data partition to data partition, the set of DST execution units may change. For example, for the first data partition, DST execution units 1-5 may be used; for the second data partition, DST execution units 6-10 may be used; for the third data partition, DST execution units 3-7 may be used; etc. As is also shown, the task is divided into partial tasks that are sent to the DST execution units in conjunction with the slice groupings of the data partitions.

Figure 11:
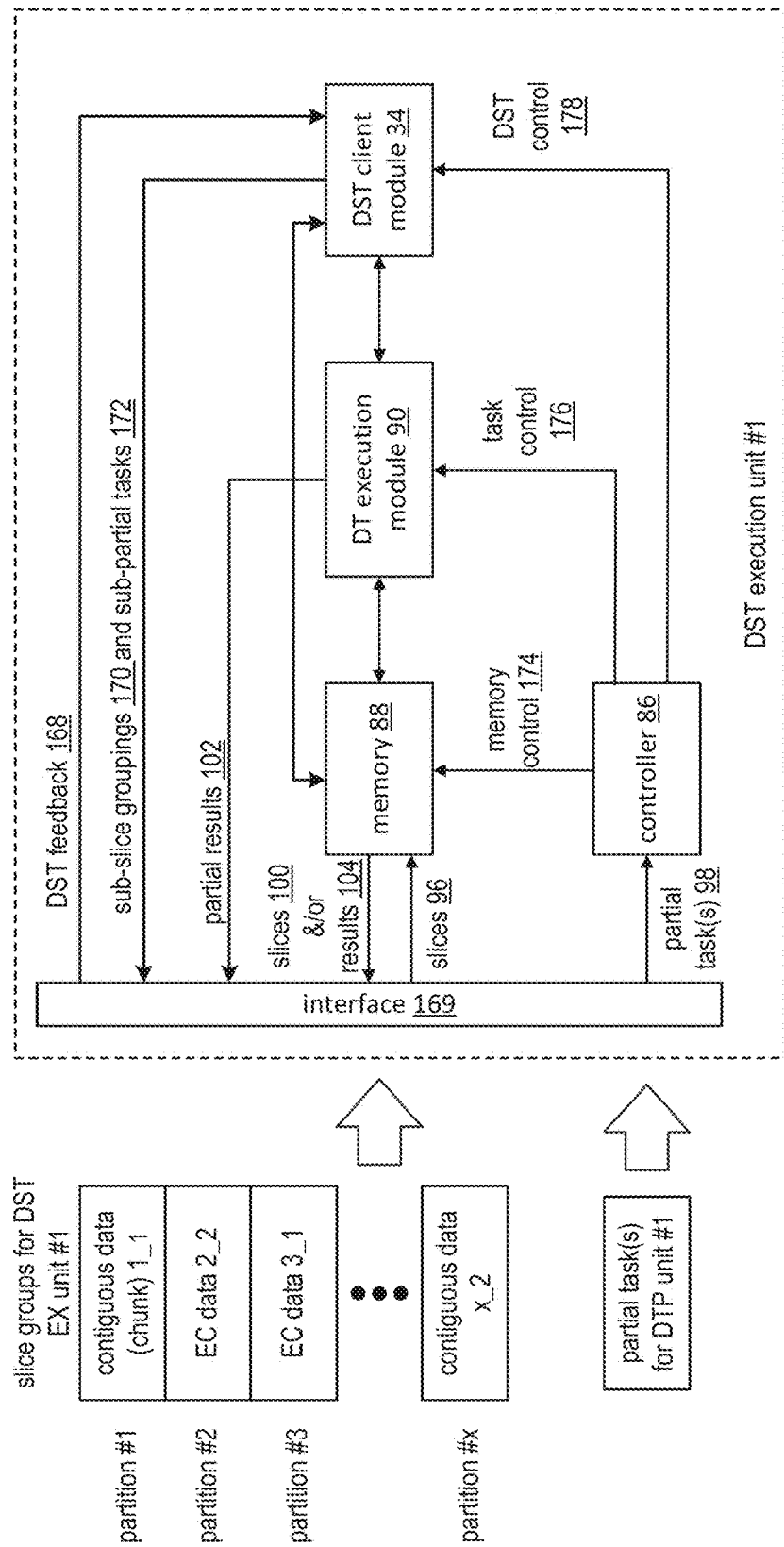
FIG. 11 is a schematic block diagram of an embodiment of a DST execution unit in accordance with the present invention.

FIG. 11 is a schematic block diagram of an embodiment of a DST (distributed storage and/or task) execution unit that includes an interface 169, a controller 86, memory 88, one or more DT (distributed task) execution modules 90, and a DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a slice group, the DST execution module receives a slice grouping 96 (e.g., slice group #1) via interface 169. The slice grouping 96 includes, per partition, encoded data slices of contiguous data or encoded data slices of error coding (EC) data. For slice group #1, the DST execution module receives encoded data slices of contiguous data for partitions #1 and #x (and potentially others between 3 and x) and receives encoded data slices of EC data for partitions #2 and #3 (and potentially others between 3 and x). Examples of encoded data slices of contiguous data and encoded data slices of error coding (EC) data are discussed with reference to FIG. 9. The memory 88 stores the encoded data slices of slice groupings 96 in accordance with memory control information 174 it receives from the controller 86.

The controller 86 (e.g., a processing module, a CPU, etc.) generates the memory control information 174 based on a partial task(s) 98 and distributed computing information (e.g., user information (e.g., user ID, distributed computing permissions, data access permission, etc.), vault information (e.g., virtual memory assigned to user, user group, temporary storage for task processing, etc.), task validation information, etc.). For example, the controller 86 interprets the partial task(s) 98 in light of the distributed computing information to determine whether a requestor is authorized to perform the task 98, is authorized to access the data, and/or is authorized to perform the task on this particular data. When the requestor is authorized, the controller 86 determines, based on the task 98 and/or another input, whether the encoded data slices of the slice grouping 96 are to be temporarily stored or permanently stored. Based on the foregoing, the controller 86 generates the memory control information 174 to write the encoded data slices of the slice grouping 96 into the memory 88 and to indicate whether the slice grouping 96 is permanently stored or temporarily stored.

With the slice grouping 96 stored in the memory 88, the controller 86 facilitates execution of the partial task(s) 98. In an example, the controller 86 interprets the partial task 98 in light of the capabilities of the DT execution module(s) 90. The capabilities include one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, etc. If the controller 86 determines that the DT execution module(s) 90 have sufficient capabilities, it generates task control information 176.

The task control information 176 may be a generic instruction (e.g., perform the task on the stored slice grouping) or a series of operational codes. In the former instance, the DT execution module 90 includes a co-processor function specifically configured (fixed or programmed) to perform the desired task 98. In the latter instance, the DT execution module 90 includes a general processor topology where the controller stores an algorithm corresponding to the particular task 98. In this instance, the controller 86 provides the operational codes (e.g., assembly language, source code of a programming language, object code, etc.) of the algorithm to the DT execution module 90 for execution.

Depending on the nature of the task 98, the DT execution module 90 may generate intermediate partial results 102 that are stored in the memory 88 or in a cache memory (not shown) within the DT execution module 90. In either case, when the DT execution module 90 completes execution of the partial task 98, it outputs one or more partial results 102. The partial results 102 may also be stored in memory 88.

If, when the controller 86 is interpreting whether capabilities of the DT execution module(s) 90 can support the partial task 98, the controller 86 determines that the DT execution module(s) 90 cannot adequately support the task 98 (e.g., does not have the right resources, does not have sufficient available resources, available resources would be too slow, etc.), it then determines whether the partial task 98 should be fully offloaded or partially offloaded.

If the controller 86 determines that the partial task 98 should be fully offloaded, it generates DST control information 178 and provides it to the DST client module 34. The DST control information 178 includes the partial task 98, memory storage information regarding the slice grouping 96, and distribution instructions. The distribution instructions instruct the DST client module 34 to divide the partial task 98 into sub-partial tasks 172, to divide the slice grouping 96 into sub-slice groupings 170, and identify of other DST execution units. The DST client module 34 functions in a similar manner as the DST client module 34 of FIGS. 3-10 to produce the sub-partial tasks 172 and the sub-slice groupings 170 in accordance with the distribution instructions.

The DST client module 34 receives DST feedback 168 (e.g., sub-partial results), via the interface 169, from the DST execution units to which the task was offloaded. The DST client module 34 provides the sub-partial results to the DST execution unit, which processes the sub-partial results to produce the partial result(s) 102.

If the controller 86 determines that the partial task 98 should be partially offloaded, it determines what portion of the task 98 and/or slice grouping 96 should be processed locally and what should be offloaded. For the portion that is being locally processed, the controller 86 generates task control information 176 as previously discussed. For the portion that is being offloaded, the controller 86 generates DST control information 178 as previously discussed.

When the DST client module 34 receives DST feedback 168 (e.g., sub-partial results) from the DST executions units to which a portion of the task was offloaded, it provides the sub-partial results to the DT execution module 90. The DT execution module 90 processes the sub-partial results with the sub-partial results it created to produce the partial result(s) 102.

The memory 88 may be further utilized to retrieve one or more of stored slices 100, stored results 104, partial results 102 when the DT execution module 90 stores partial results 102 and/or results 104 and the memory 88. For example, when the partial task 98 includes a retrieval request, the controller 86 outputs the memory control 174 to the memory 88 to facilitate retrieval of slices 100 and/or results 104.

Figure 12:
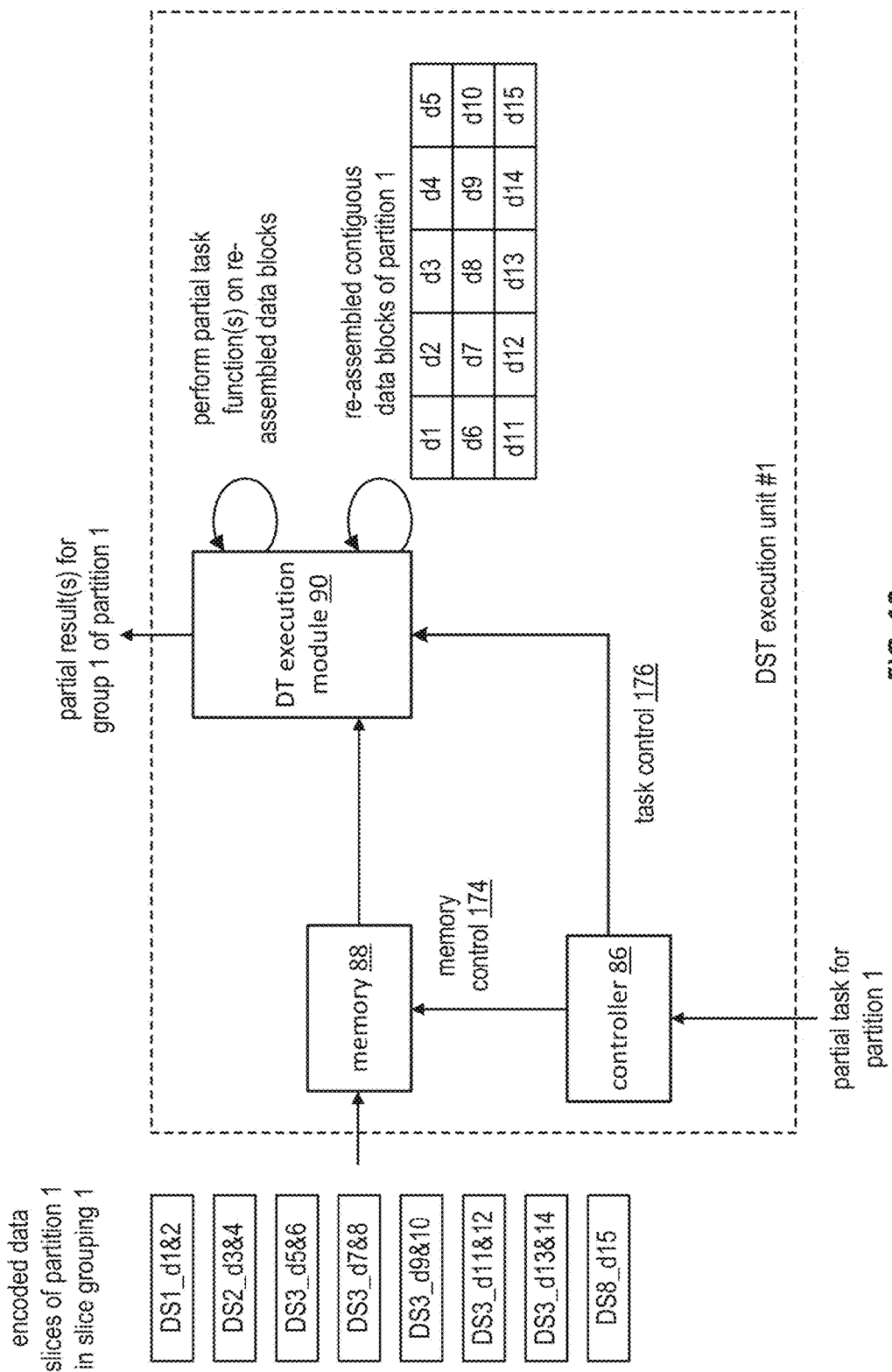
FIG. 12 is a schematic block diagram of an example of operation of a DST execution unit in accordance with the present invention.

FIG. 12 is a schematic block diagram of an example of operation of a distributed storage and task (DST) execution unit storing encoded data slices and executing a task thereon. To store the encoded data slices of a partition 1 of slice grouping 1, a controller 86 generates write commands as memory control information 174 such that the encoded slices are stored in desired locations (e.g., permanent or temporary) within memory 88.

Once the encoded slices are stored, the controller 86 provides task control information 176 to a distributed task (DT) execution module 90. As a first step executing the task in accordance with the task control information 176, the DT execution module 90 retrieves the encoded slices from memory 88. The DT execution module 90 then reconstructs contiguous data blocks of a data partition. As shown for this example, reconstructed contiguous data blocks of data partition 1 include data blocks 1-15 (e.g., d1-d15).

With the contiguous data blocks reconstructed, the DT execution module 90 performs the task on the reconstructed contiguous data blocks. For example, the task may be to search the reconstructed contiguous data blocks for a particular word or phrase, identify where in the reconstructed contiguous data blocks the particular word or phrase occurred, and/or count the occurrences of the particular word or phrase on the reconstructed contiguous data blocks. The DST execution unit continues in a similar manner for the encoded data slices of other partitions in slice grouping 1. Note that with using the unity matrix error encoding scheme previously discussed, if the encoded data slices of contiguous data are uncorrupted, the decoding of them is a relatively straightforward process of extracting the data.

If, however, an encoded data slice of contiguous data is corrupted (or missing), it can be rebuilt by accessing other DST execution units that are storing the other encoded data slices of the set of encoded data slices of the corrupted encoded data slice. In this instance, the DST execution unit having the corrupted encoded data slices retrieves at least three encoded data slices (of contiguous data and of error coding data) in the set from the other DST execution units (recall for this example, the pillar width is 5 and the decode threshold is 3). The DST execution unit decodes the retrieved data slices using the DS error encoding parameters to recapture the corresponding data segment. The DST execution unit then re-encodes the data segment using the DS error encoding parameters to rebuild the corrupted encoded data slice. Once the encoded data slice is rebuilt, the DST execution unit functions as previously described.

Figure 13:
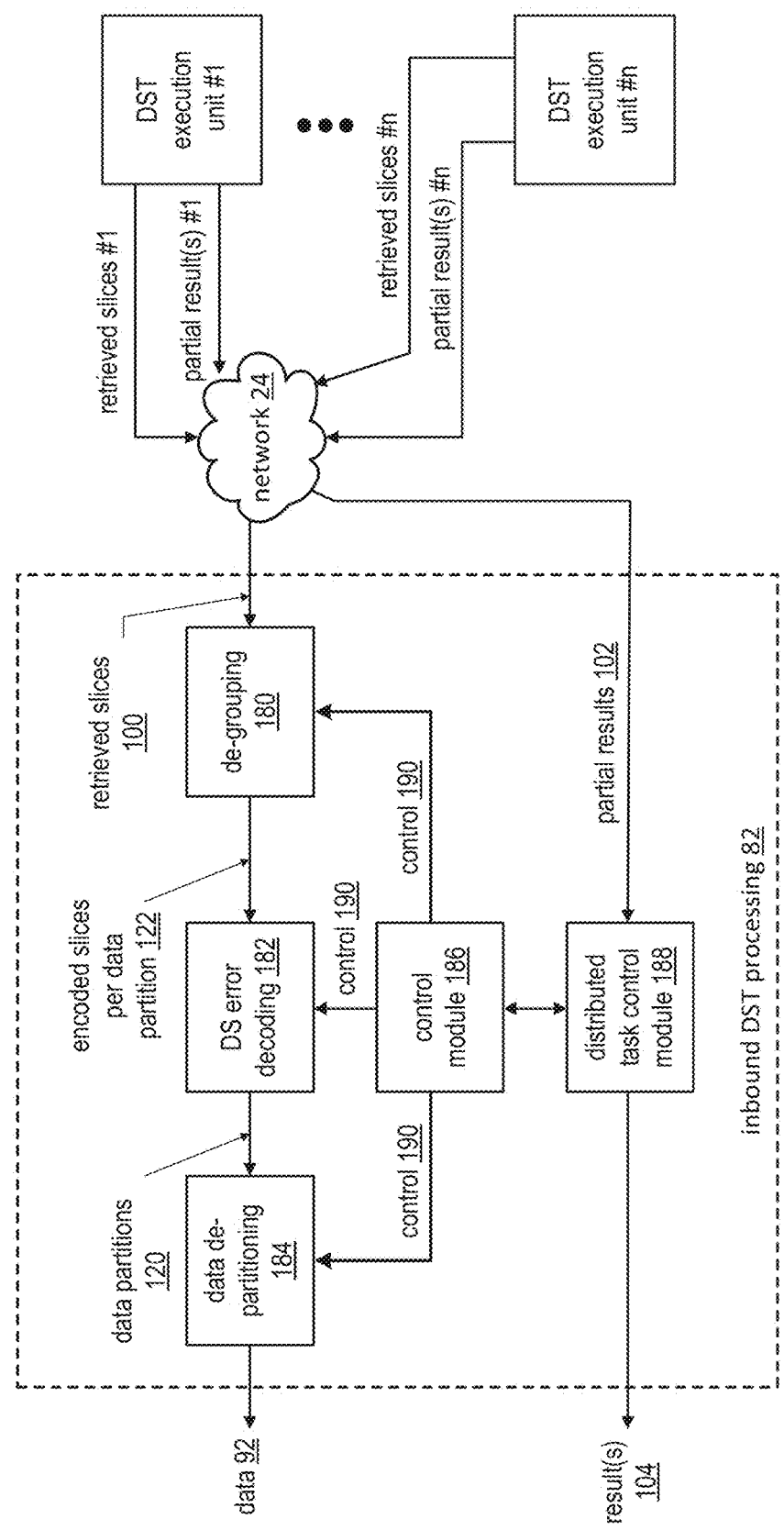
FIG. 13 is a schematic block diagram of an embodiment of an inbound distributed storage and/or task (DST) processing in accordance with the present invention.

FIG. 13 is a schematic block diagram of an embodiment of an inbound distributed storage and/or task (DST) processing section 82 of a DST client module coupled to DST execution units of a distributed storage and task network (DSTN) module via a network 24. The inbound DST processing section 82 includes a de-grouping module 180, a DS (dispersed storage) error decoding module 182, a data de-partitioning module 184, a control module 186, and a distributed task control module 188. Note that the control module 186 and/or the distributed task control module 188 may be separate modules from corresponding ones of outbound DST processing section or may be the same modules.

In an example of operation, the DST execution units have completed execution of corresponding partial tasks on the corresponding slice groupings to produce partial results 102. The inbound DST processing section 82 receives the partial results 102 via the distributed task control module 188. The inbound DST processing section 82 then processes the partial results 102 to produce a final result, or results 104. For example, if the task was to find a specific word or phrase within data, the partial results 102 indicate where in each of the prescribed portions of the data the corresponding DST execution units found the specific word or phrase. The distributed task control module 188 combines the individual partial results 102 for the corresponding portions of the data into a final result 104 for the data as a whole.

In another example of operation, the inbound DST processing section 82 is retrieving stored data from the DST execution units (i.e., the DSTN module). In this example, the DST execution units output encoded data slices 100 corresponding to the data retrieval requests. The de-grouping module 180 receives retrieved slices 100 and de-groups them to produce encoded data slices per data partition 122. The DS error decoding module 182 decodes, in accordance with DS error encoding parameters, the encoded data slices per data partition 122 to produce data partitions 120.

The data de-partitioning module 184 combines the data partitions 120 into the data 92. The control module 186 controls the conversion of retrieved slices 100 into the data 92 using control signals 190 to each of the modules. For instance, the control module 186 provides de-grouping information to the de-grouping module 180, provides the DS error encoding parameters to the DS error decoding module 182, and provides de-partitioning information to the data de-partitioning module 184.

Figure 14:
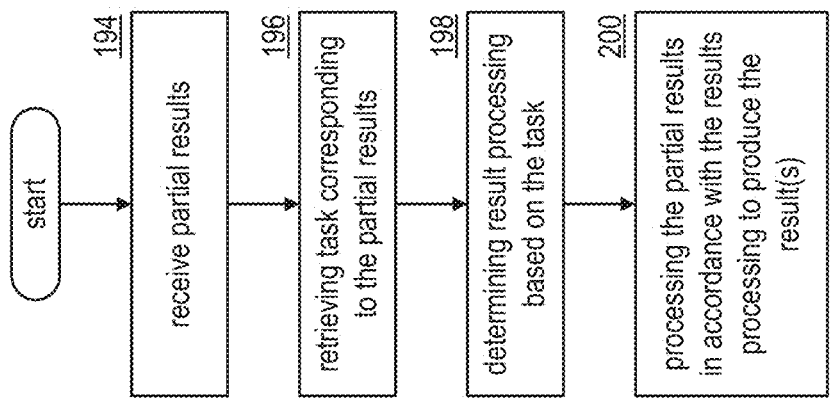
FIG. 14 is a logic diagram of an example of a method for inbound DST processing in accordance with the present invention.

FIG. 14 is a logic diagram of an example of a method that is executable by distributed storage and task (DST) client module regarding inbound DST processing. The method begins at step 194 where the DST client module receives partial results. The method continues at step 196 where the DST client module retrieves the task corresponding to the partial results. For example, the partial results include header information that identifies the requesting entity, which correlates to the requested task.

The method continues at step 198 where the DST client module determines result processing information based on the task. For example, if the task were to identify a particular word or phrase within the data, the result processing information would indicate to aggregate the partial results for the corresponding portions of the data to produce the final result. As another example, if the task were to count the occurrences of a particular word or phrase within the data, results of processing the information would indicate to add the partial results to produce the final results. The method continues at step 200 where the DST client module processes the partial results in accordance with the result processing information to produce the final result or results.

Figure 15:
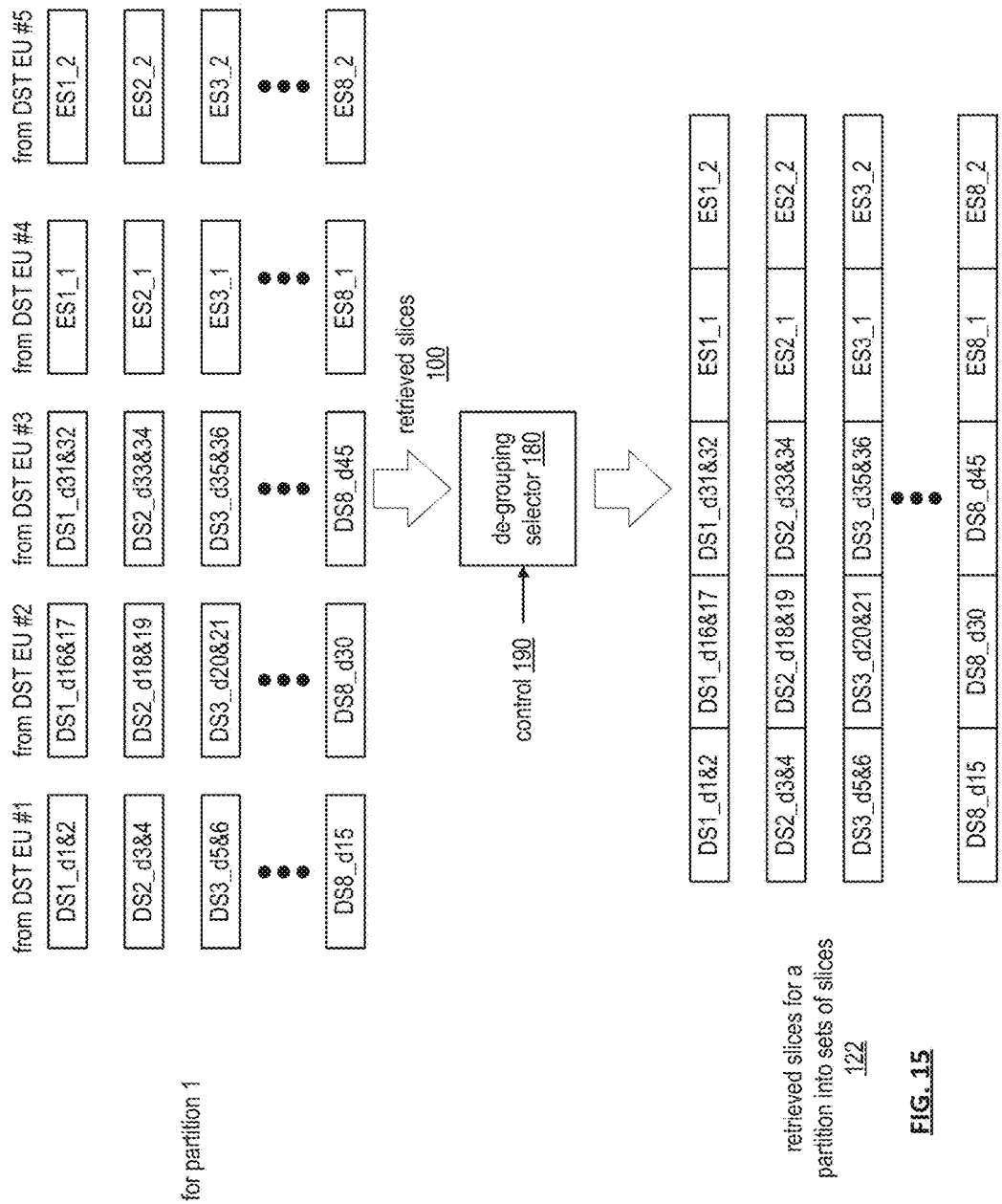
FIG. 15 is a diagram of an example of de-grouping selection processing of the inbound DST processing in accordance with the present invention.

FIG. 15 is a diagram of an example of de-grouping selection processing of an inbound distributed storage and task (DST) processing section of a DST client module. In general, this is an inverse process of the grouping module of the outbound DST processing section of FIG. 9. Accordingly, for each data partition (e.g., partition #1), the de-grouping module retrieves the corresponding slice grouping from the DST execution units (EU) (e.g., DST 1-5).

As shown, DST execution unit #1 provides a first slice grouping, which includes the first encoded slices of each of the sets of encoded slices (e.g., encoded data slices of contiguous data of data blocks 1-15); DST execution unit #2 provides a second slice grouping, which includes the second encoded slices of each of the sets of encoded slices (e.g., encoded data slices of contiguous data of data blocks 16-30); DST execution unit #3 provides a third slice grouping, which includes the third encoded slices of each of the sets of encoded slices (e.g., encoded data slices of contiguous data of data blocks 31-45); DST execution unit #4 provides a fourth slice grouping, which includes the fourth encoded slices of each of the sets of encoded slices (e.g., first encoded data slices of error coding (EC) data); and DST execution unit #5 provides a fifth slice grouping, which includes the fifth encoded slices of each of the sets of encoded slices (e.g., first encoded data slices of error coding (EC) data).

The de-grouping module de-groups the slice groupings (e.g., received slices 100) using a de-grouping selector 180 controlled by a control signal 190 as shown in the example to produce a plurality of sets of encoded data slices (e.g., retrieved slices for a partition into sets of slices 122). Each set corresponding to a data segment of the data partition.

Figure 16:
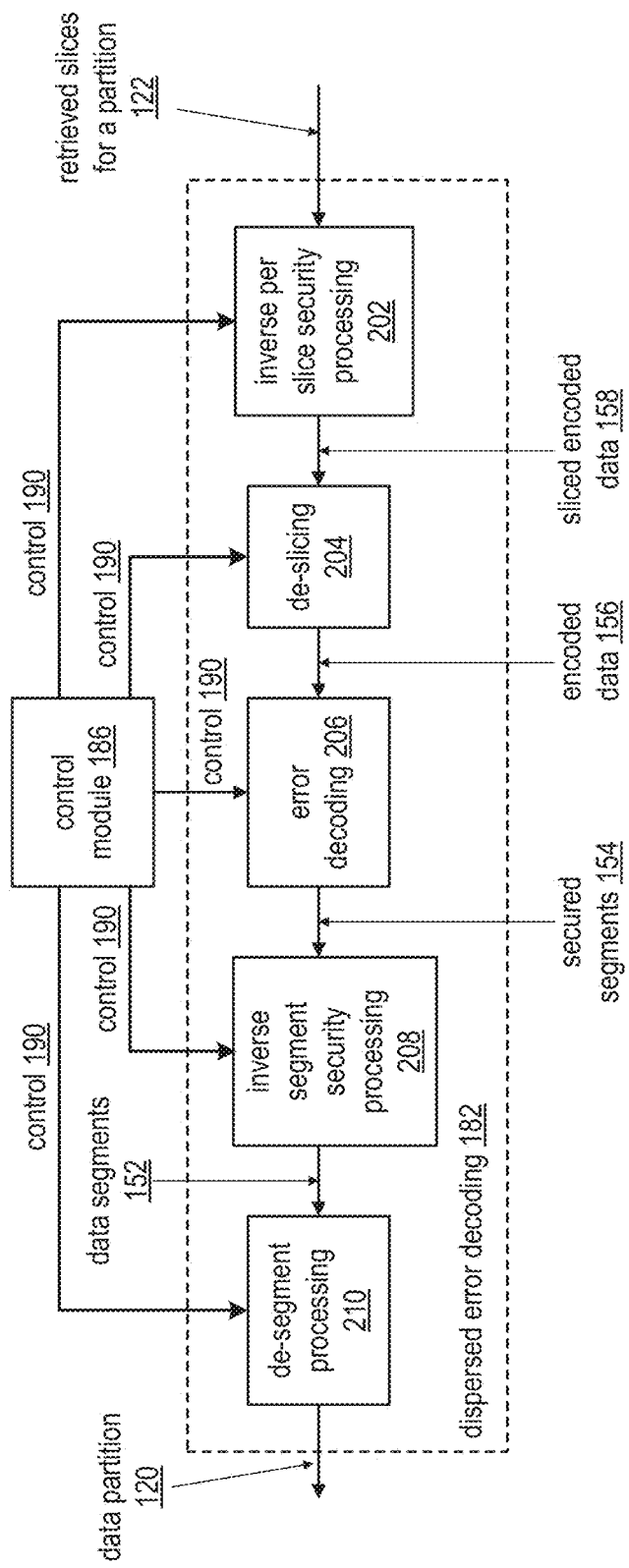
FIG. 16 is a schematic block diagram of an embodiment of a dispersed error decoding in accordance with the present invention.

FIG. 16 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, a de-segmenting processing module 210, and a control module 186.

In an example of operation, the inverse per slice security processing module 202, when enabled by the control module 186, unsecures each encoded data slice 122 based on slice de-security information received as control information 190 (e.g., the compliment of the slice security information discussed with reference to FIG. 6) received from the control module 186. The slice security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 122, it decrypts each verified encoded data slice, and decompresses each decrypted encoded data slice to produce slice encoded data 158. When the inverse per slice security processing module 202 is not enabled, it passes the encoded data slices 122 as the sliced encoded data 158 or is bypassed such that the retrieved encoded data slices 122 are provided as the sliced encoded data 158.

The de-slicing module 204 de-slices the sliced encoded data 158 into encoded data segments 156 in accordance with a pillar width of the error correction encoding parameters received as control information 190 from the control module 186. For example, if the pillar width is five, the de-slicing module 204 de-slices a set of five encoded data slices into an encoded data segment 156. The error decoding module 206 decodes the encoded data segments 156 in accordance with error correction decoding parameters received as control information 190 from the control module 186 to produce secure data segments 154. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments 154 based on segment security information received as control information 190 from the control module 186. The segment security information includes data decompression, decryption, de-watermarking, integrity check (e.g., CRC, etc.) verification, and/or any other type of digital security. For example, when the inverse segment security processing module 208 is enabled, it verifies integrity information (e.g., a CRC value) of each secure data segment 154, it decrypts each verified secured data segment, and decompresses each decrypted secure data segment to produce a data segment 152. When the inverse segment security processing module 208 is not enabled, it passes the decoded data segment 154 as the data segment 152 or is bypassed.

The de-segment processing module 210 receives the data segments 152 and receives de-segmenting information as control information 190 from the control module 186. The de-segmenting information indicates how the de-segment processing module 210 is to de-segment the data segments 152 into a data partition 120. For example, the de-segmenting information indicates how the rows and columns of data segments are to be rearranged to yield the data partition 120.

Figure 17:
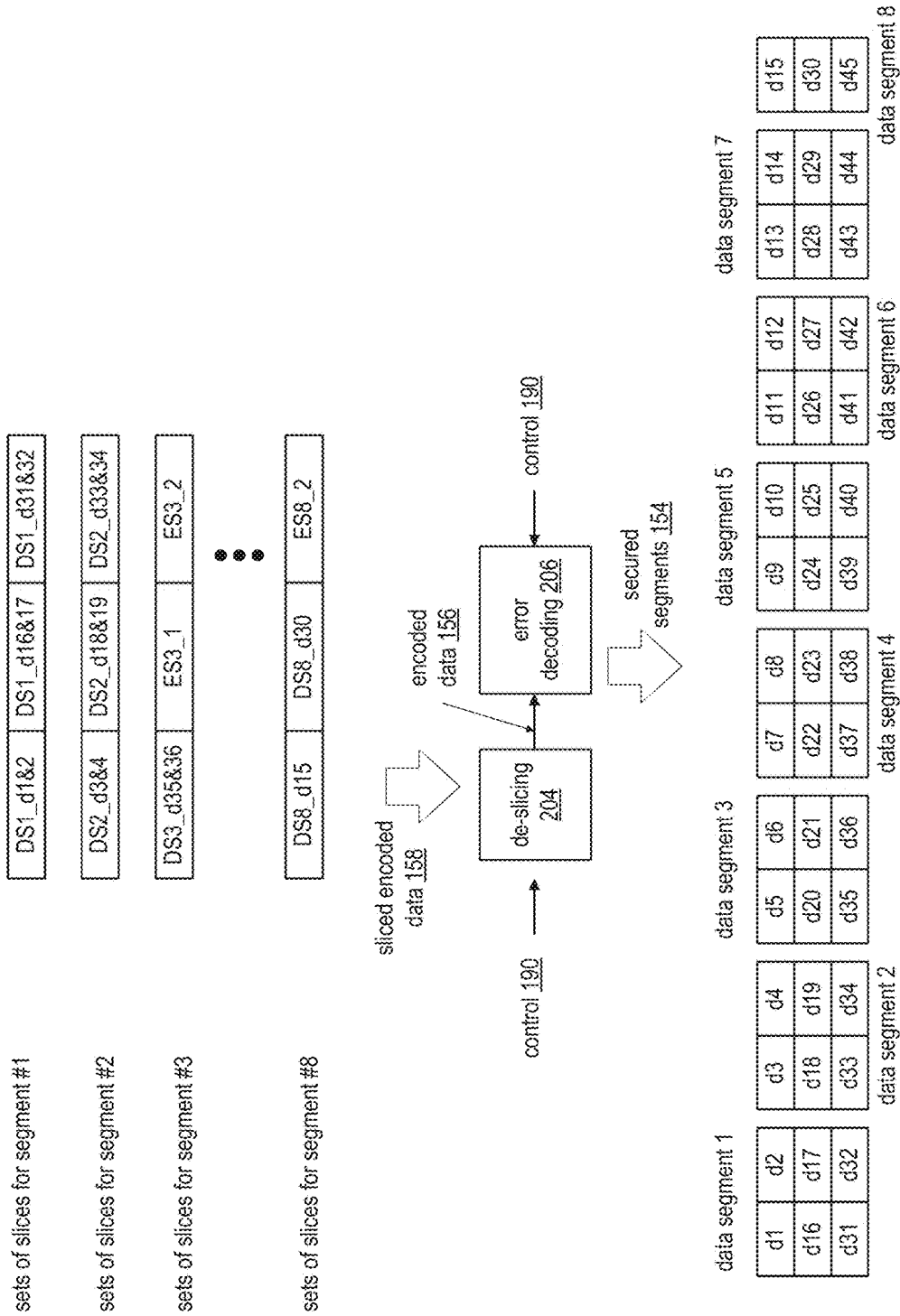
FIG. 17 is a diagram of an example of de-slicing and error decoding processing of the dispersed error decoding in accordance with the present invention.

FIG. 17 is a diagram of an example of de-slicing and error decoding processing of a dispersed error decoding module. A de-slicing module 204 receives at least a decode threshold number of encoded data slices 158 for each data segment in accordance with control information 190 and provides encoded data 156. In this example, a decode threshold is three. As such, each set of encoded data slices 158 is shown to have three encoded data slices per data segment. The de-slicing module 204 may receive three encoded data slices per data segment because an associated distributed storage and task (DST) client module requested retrieving only three encoded data slices per segment or selected three of the retrieved encoded data slices per data segment. As shown, which is based on the unity matrix encoding previously discussed with reference to FIG. 8, an encoded data slice may be a data-based encoded data slice (e.g., DS1_d1&d2) or an error code based encoded data slice (e.g., ES3_1).

An error decoding module 206 decodes the encoded data 156 of each data segment in accordance with the error correction decoding parameters of control information 190 to produce secured segments 154. In this example, data segment 1 includes 3 rows with each row being treated as one word for encoding. As such, data segment 1 includes three words: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

Figure 18:
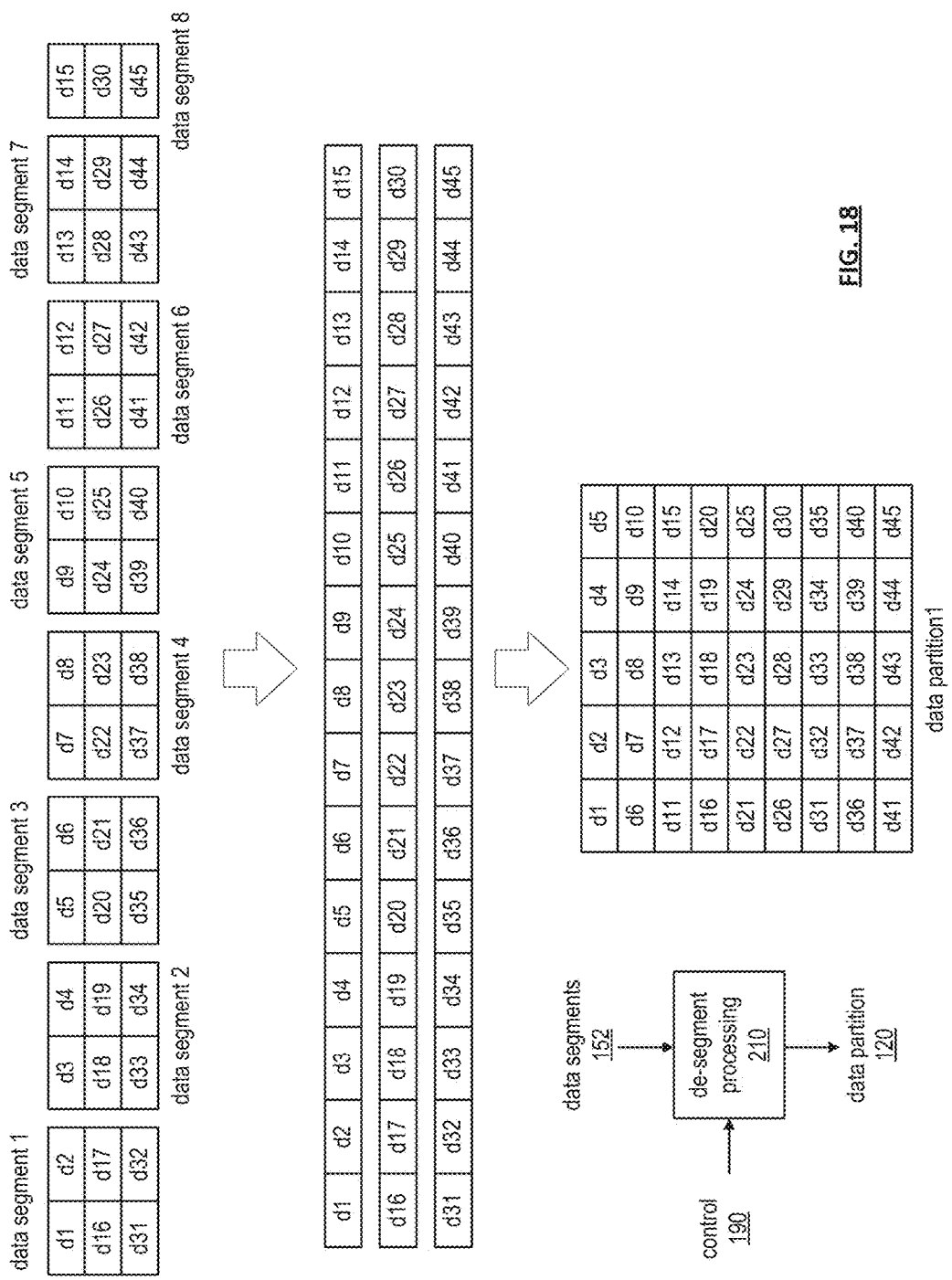
FIG. 18 is a diagram of an example of a de-segment processing of the dispersed error decoding in accordance with the present invention.

FIG. 18 is a diagram of an example of a de-segment processing of an inbound distributed storage and task (DST) processing. In this example, a de-segment processing module 210 receives data segments 152 (e.g., 1-8) and rearranges the data blocks of the data segments into rows and columns in accordance with de-segmenting information of control information 190 to produce a data partition 120. Note that the number of rows is based on the decode threshold (e.g., 3 in this specific example) and the number of columns is based on the number and size of the data blocks.

The de-segmenting module 210 converts the rows and columns of data blocks into the data partition 120. Note that each data block may be of the same size as other data blocks or of a different size. In addition, the size of each data block may be a few bytes to megabytes of data.

Figure 19:
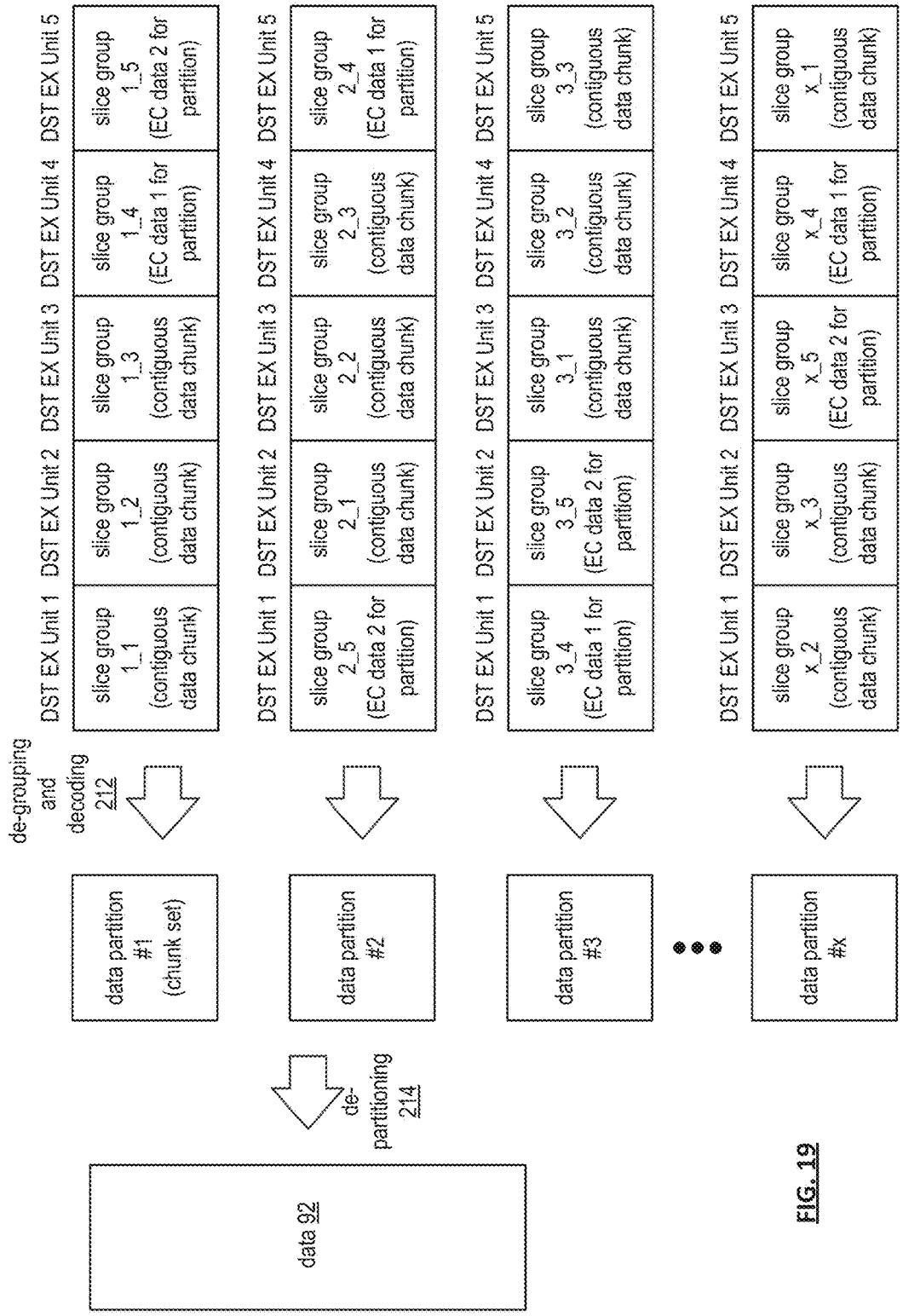
FIG. 19 is a diagram of an example of converting slice groups into data in accordance with the present invention.

FIG. 19 is a diagram of an example of converting slice groups into data 92 within an inbound distributed storage and task (DST) processing section. As shown, the data 92 is reconstructed from a plurality of data partitions (1-x, where x is an integer greater than 4). Each data partition (or chunk set of data) is decoded and re-grouped using a de-grouping and decoding function 212 and a de-partition function 214 from slice groupings as previously discussed. For a given data partition, the slice groupings (e.g., at least a decode threshold per data segment of encoded data slices) are received from DST execution units. From data partition to data partition, the ordering of the slice groupings received from the DST execution units may vary as discussed with reference to FIG. 10.

Figure 20:
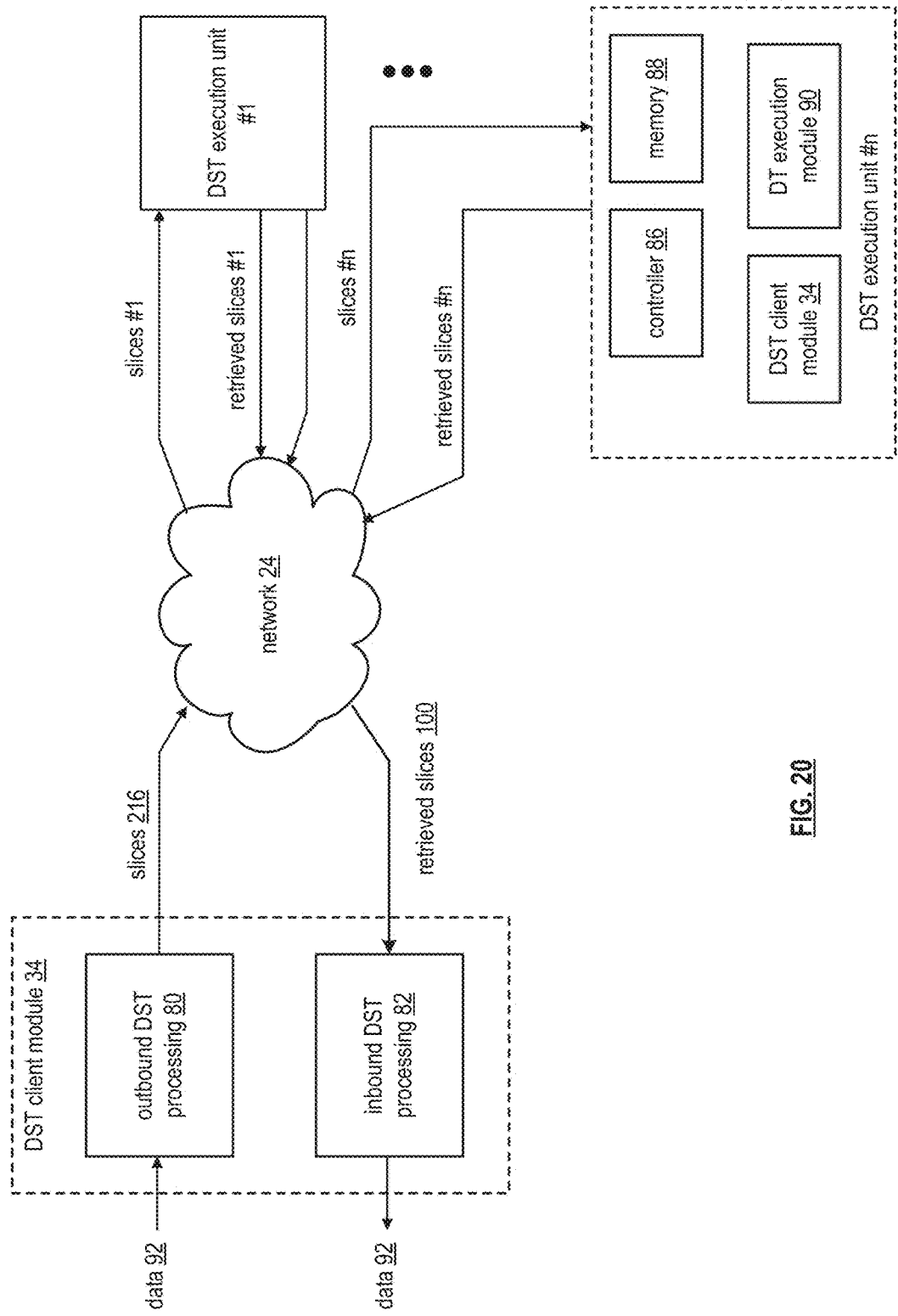
FIG. 20 is a diagram of an example of a distributed storage within the distributed computing system in accordance with the present invention.

FIG. 20 is a diagram of an example of a distributed storage and/or retrieval within the distributed computing system. The distributed computing system includes a plurality of distributed storage and/or task (DST) processing client modules 34 (one shown) coupled to a distributed storage and/or task processing network (DSTN) module, or multiple DSTN modules, via a network 24. The DST client module 34 includes an outbound DST processing section 80 and an inbound DST processing section 82. The DSTN module includes a plurality of DST execution units. Each DST execution unit includes a controller 86, memory 88, one or more distributed task (DT) execution modules 90, and a DST client module 34.

In an example of data storage, the DST client module 34 has data 92 that it desires to store in the DSTN module. The data 92 may be a file (e.g., video, audio, text, graphics, etc.), a data object, a data block, an update to a file, an update to a data block, etc. In this instance, the outbound DST processing module 80 converts the data 92 into encoded data slices 216 as will be further described with reference to FIGS. 21-23. The outbound DST processing module 80 sends, via the network 24, to the DST execution units for storage as further described with reference to FIG. 24.

In an example of data retrieval, the DST client module 34 issues a retrieve request to the DST execution units for the desired data 92. The retrieve request may address each DST executions units storing encoded data slices of the desired data, address a decode threshold number of DST execution units, address a read threshold number of DST execution units, or address some other number of DST execution units. In response to the request, each addressed DST execution unit retrieves its encoded data slices 100 of the desired data and sends them to the inbound DST processing section 82, via the network 24.

When, for each data segment, the inbound DST processing section 82 receives at least a decode threshold number of encoded data slices 100, it converts the encoded data slices 100 into a data segment. The inbound DST processing section 82 aggregates the data segments to produce the retrieved data 92.

Figure 21:
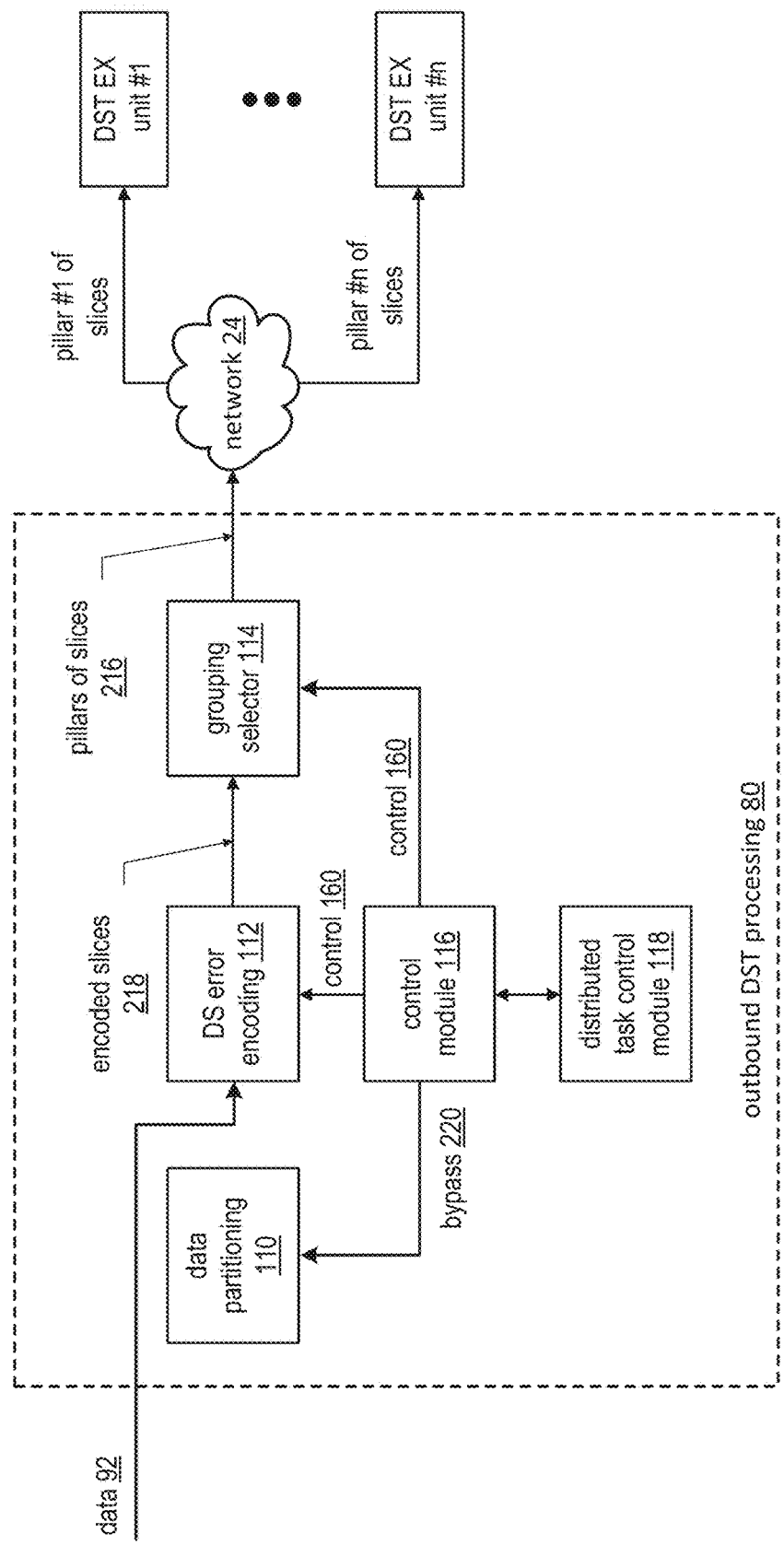
FIG. 21 is a schematic block diagram of an example of operation of outbound distributed storage and/or task (DST) processing for storing data in accordance with the present invention.

FIG. 21 is a schematic block diagram of an embodiment of an outbound distributed storage and/or task (DST) processing section 80 of a DST client module coupled to a distributed storage and task network (DSTN) module (e.g., a plurality of DST execution units) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 is by-passed such that data 92 is provided directly to the DS error encoding module 112. The control module 116 coordinates the by-passing of the data partitioning module 110 by outputting a bypass 220 message to the data partitioning module 110.

The DS error encoding module 112 receives the data 92 in a serial manner, a parallel manner, and/or a combination thereof. The DS error encoding module 112 DS error encodes the data in accordance with control information 160 from the control module 116 to produce encoded data slices 218. The DS error encoding includes segmenting the data 92 into data segments, segment security processing (e.g., encryption, compression, watermarking, integrity check (e.g., CRC, etc.)), error encoding, slicing, and/or per slice security processing (e.g., encryption, compression, watermarking, integrity check (e.g., CRC, etc.)). The control information 160 indicates which steps of the DS error encoding are active for the data 92 and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 218 of the data segments into pillars of slices 216. The number of pillars corresponds to the pillar width of the DS error encoding parameters. In this example, the distributed task control module 118 facilitates the storage request.

Figure 22:
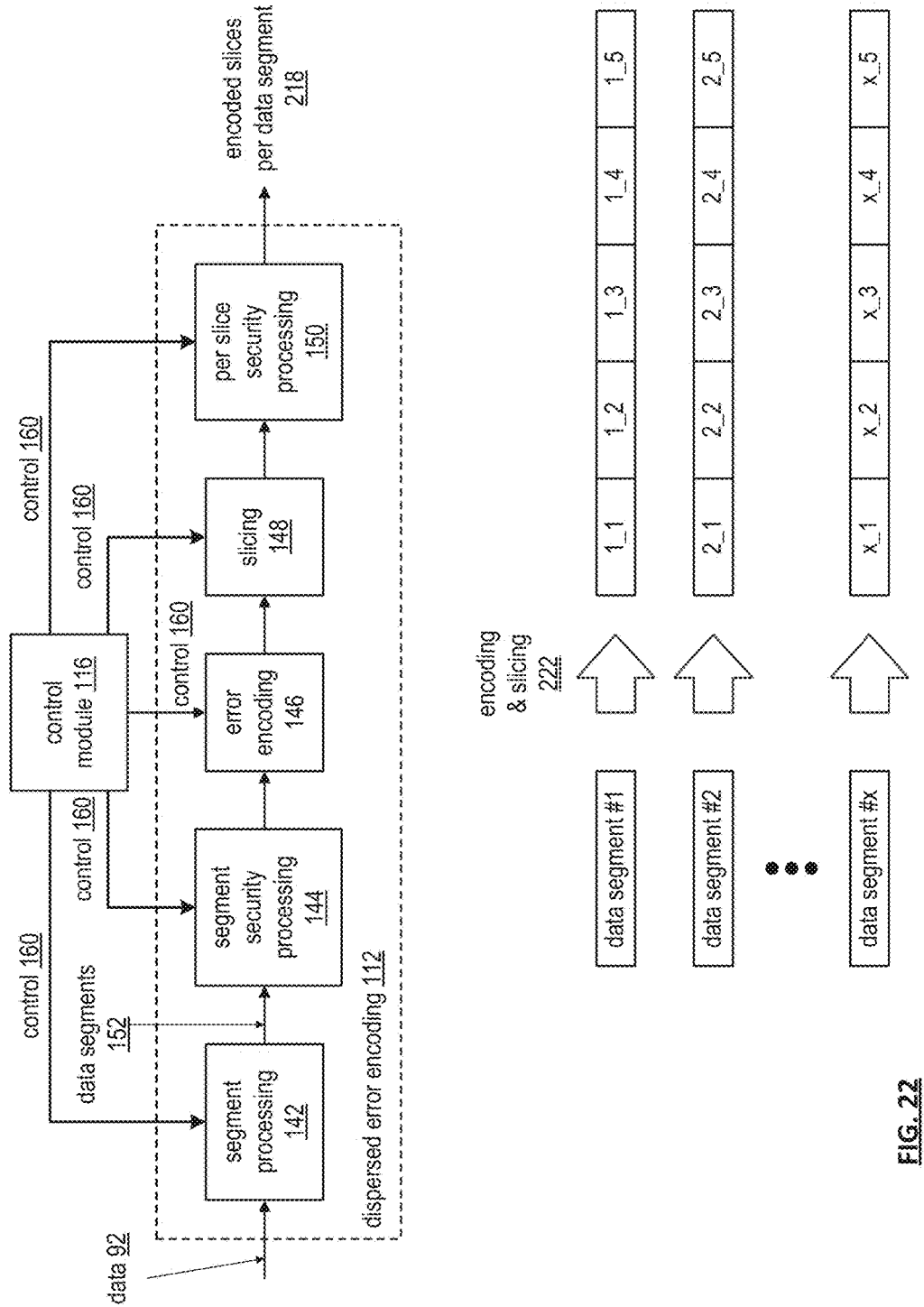
FIG. 22 is a schematic block diagram of an example of a dispersed error encoding for the example of FIG. 21 in accordance with the present invention.

FIG. 22 is a schematic block diagram of an example of a dispersed storage (DS) error encoding module 112 for the example of FIG. 21. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives data 92 and receives segmenting information as control information 160 from the control module 116. The segmenting information indicates how the segment processing module is to segment the data. For example, the segmenting information indicates the size of each data segment. The segment processing module 142 segments the data 92 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., CRC, etc.), and/or any other type of digital security. For example, when the segment security processing module 144 is enabled, it compresses a data segment 152, encrypts the compressed data segment, and generates a CRC value for the encrypted data segment to produce a secure data segment. When the segment security processing module 144 is not enabled, it passes the data segments 152 to the error encoding module 146 or is bypassed such that the data segments 152 are provided to the error encoding module 146.

The error encoding module 146 encodes the secure data segments in accordance with error correction encoding parameters received as control information 160 from the control module 116. The error correction encoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment to produce an encoded data segment.

The slicing module 148 slices the encoded data segment in accordance with a pillar width of the error correction encoding parameters. For example, if the pillar width is five, the slicing module slices an encoded data segment into a set of five encoded data slices. As such, for a plurality of data segments, the slicing module 148 outputs a plurality of sets of encoded data slices as shown within encoding and slicing function 222 as described.

The per slice security processing module 150, when enabled by the control module 116, secures each encoded data slice based on slice security information received as control information 160 from the control module 116. The slice security information includes data compression, encryption, watermarking, integrity check (e.g., CRC, etc.), and/or any other type of digital security. For example, when the per slice security processing module 150 is enabled, it may compress an encoded data slice, encrypt the compressed encoded data slice, and generate a CRC value for the encrypted encoded data slice to produce a secure encoded data slice tweaking. When the per slice security processing module 150 is not enabled, it passes the encoded data slices or is bypassed such that the encoded data slices 218 are the output of the DS error encoding module 112.

Figure 23:
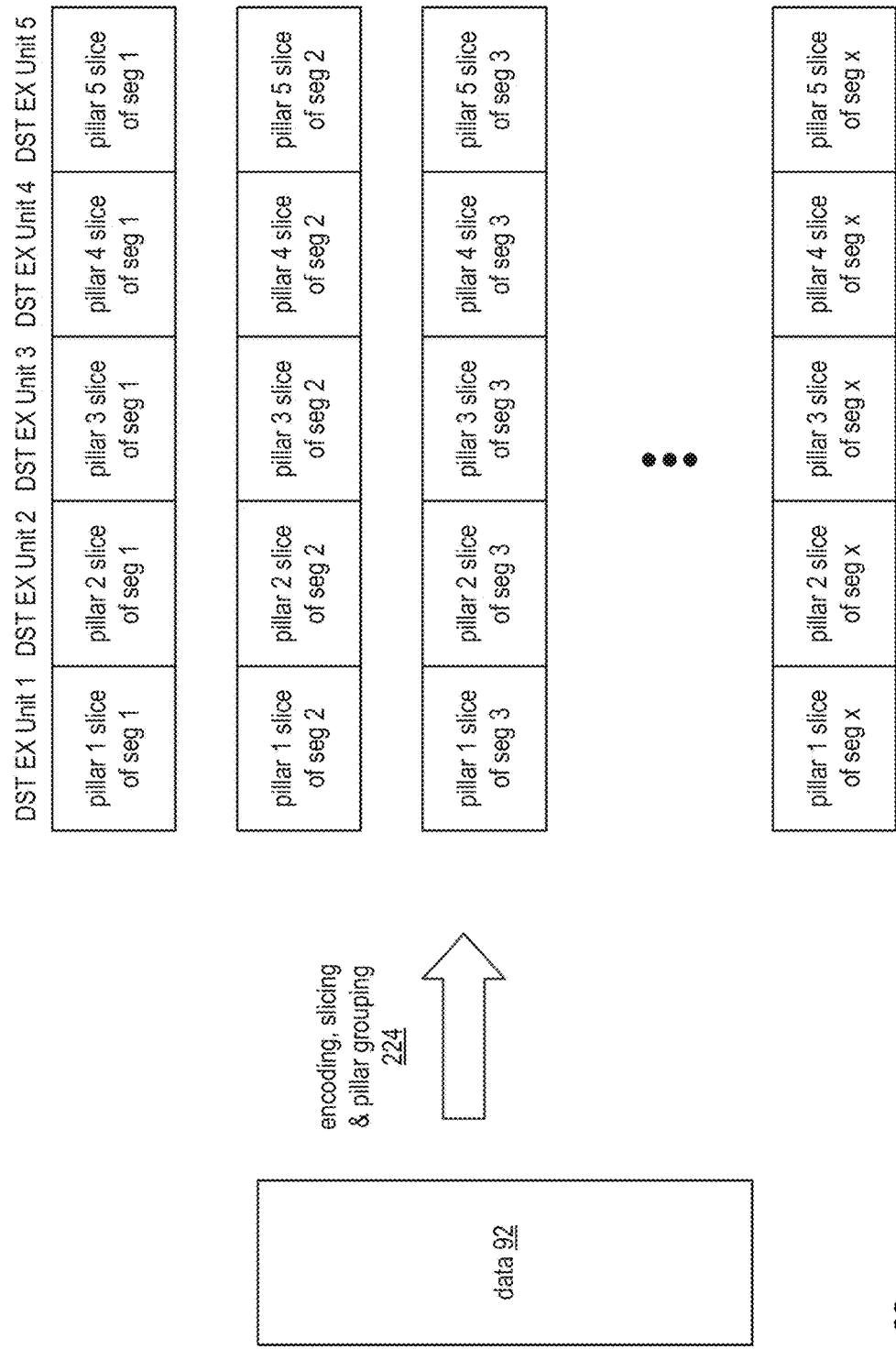
FIG. 23 is a diagram of an example of converting data into pillar slice groups for storage in accordance with the present invention.

FIG. 23 is a diagram of an example of converting data 92 into pillar slice groups utilizing encoding, slicing and pillar grouping function 224 for storage in memory of a distributed storage and task network (DSTN) module. As previously discussed the data 92 is encoded and sliced into a plurality of sets of encoded data slices; one set per data segment. The grouping selector module organizes the sets of encoded data slices into pillars of data slices. In this example, the DS error encoding parameters include a pillar width of 5 and a decode threshold of 3. As such, for each data segment, 5 encoded data slices are created.

The grouping selector module takes the first encoded data slice of each of the sets and forms a first pillar, which may be sent to the first DST execution unit. Similarly, the grouping selector module creates the second pillar from the second slices of the sets; the third pillar from the third slices of the sets; the fourth pillar from the fourth slices of the sets; and the fifth pillar from the fifth slices of the set.

FIG. 24 is a schematic block diagram of an embodiment of a distributed storage and/or task (DST) execution unit that includes an interface 169, a controller 86, memory 88, one or more distributed task (DT) execution modules 90, and a DST client module 34. A computing core 26 may be utilized to implement the one or more DT execution modules 90 and the DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a pillar of slices 216, the DST execution unit receives, via interface 169, a pillar of slices 216 (e.g., pillar #1 slices). The memory 88 stores the encoded data slices 216 of the pillar of slices in accordance with memory control information 174 it receives from the controller 86. The controller 86 (e.g., a processing module, a CPU, etc.) generates the memory control information 174 based on distributed storage information (e.g., user information (e.g., user ID, distributed storage permissions, data access permission, etc.), vault information (e.g., virtual memory assigned to user, user group, etc.), etc.). Similarly, when retrieving slices, the DST execution unit receives, via interface 169, a slice retrieval request. The memory 88 retrieves the slice in accordance with memory control information 174 it receives from the controller 86. The memory 88 outputs the slice 100, via the interface 169, to a requesting entity.

Figure 25:
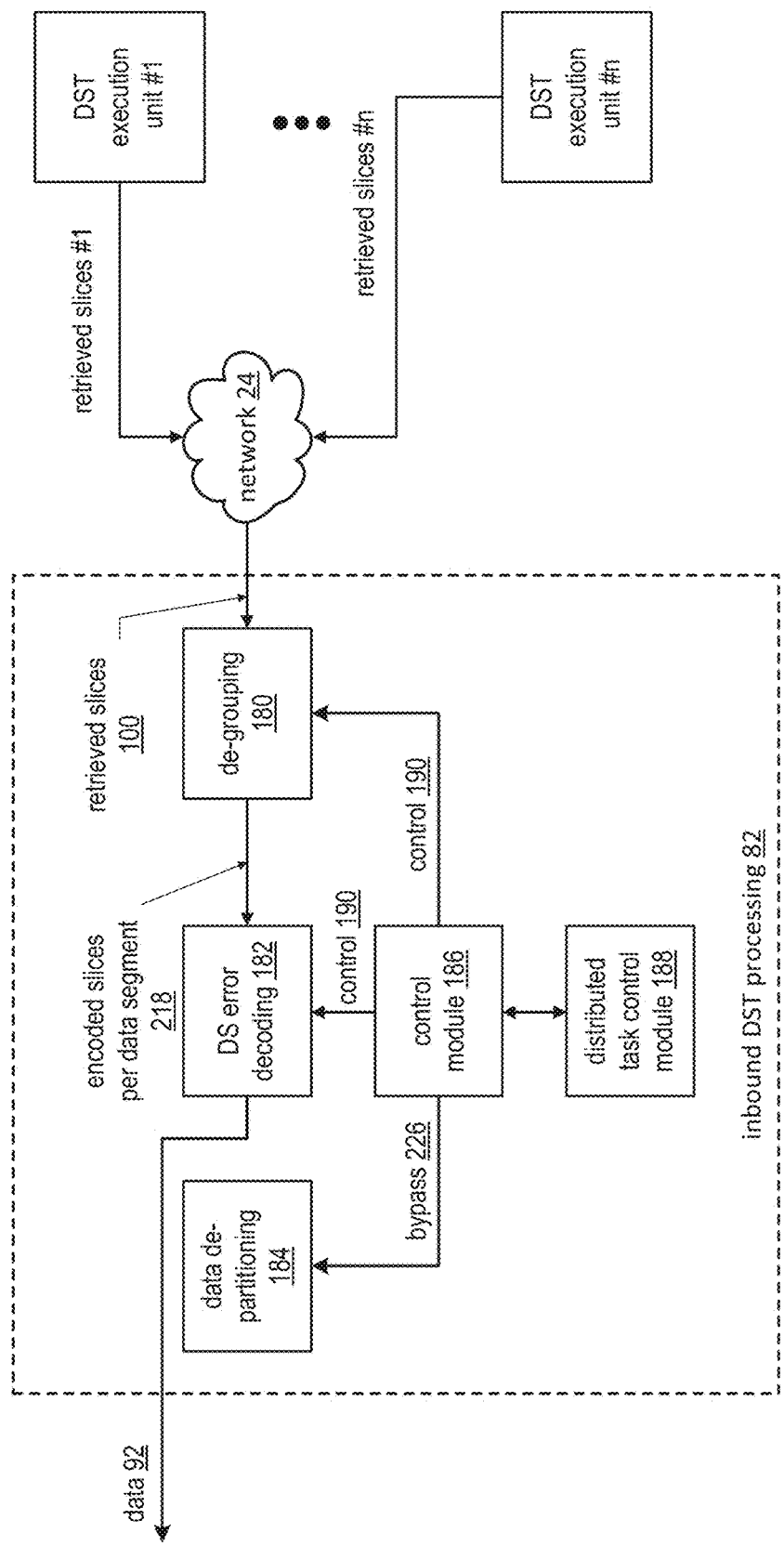
FIG. 25 is a schematic block diagram of an example of operation of inbound distributed storage and/or task (DST) processing for retrieving dispersed error encoded data in accordance with the present invention.

FIG. 25 is a schematic block diagram of an example of operation of an inbound distributed storage and/or task (DST) processing section 82 for retrieving dispersed error encoded data 92. The inbound DST processing section 82 includes a de-grouping module 180, a dispersed storage (DS) error decoding module 182, a data de-partitioning module 184, a control module 186, and a distributed task control module 188. Note that the control module 186 and/or the distributed task control module 188 may be separate modules from corresponding ones of an outbound DST processing section or may be the same modules.

In an example of operation, the inbound DST processing section 82 is retrieving stored data 92 from the DST execution units (i.e., the DSTN module). In this example, the DST execution units output encoded data slices corresponding to data retrieval requests from the distributed task control module 188. The de-grouping module 180 receives pillars of slices 100 and de-groups them in accordance with control information 190 from the control module 186 to produce sets of encoded data slices 218. The DS error decoding module 182 decodes, in accordance with the DS error encoding parameters received as control information 190 from the control module 186, each set of encoded data slices 218 to produce data segments, which are aggregated into retrieved data 92. The data de-partitioning module 184 is by-passed in this operational mode via a bypass signal 226 of control information 190 from the control module 186.

Figure 26:
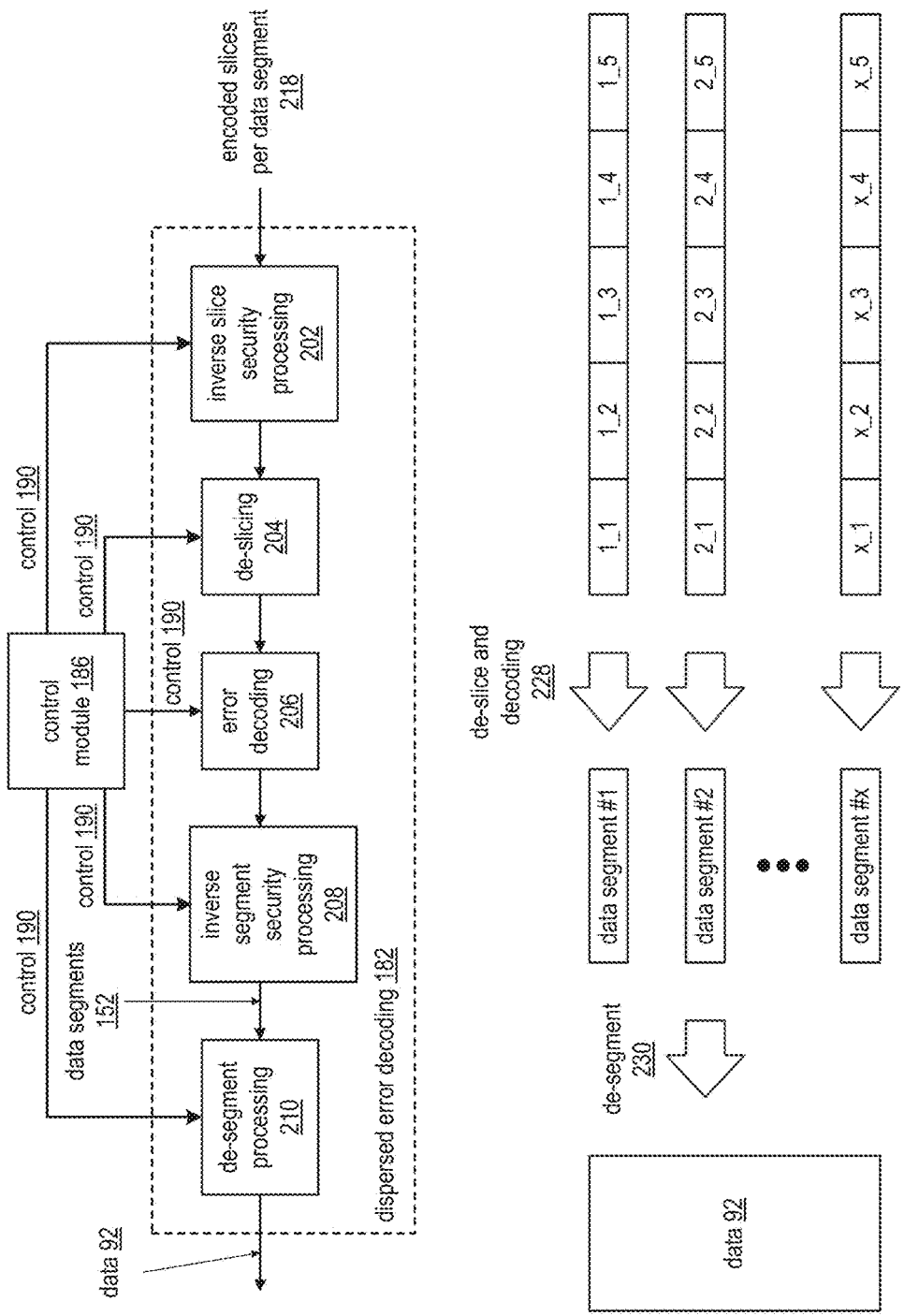
FIG. 26 is a schematic block diagram of an example of a dispersed error decoding for the example of FIG. 25 in accordance with the present invention.

FIG. 26 is a schematic block diagram of an embodiment of a dispersed storage (DS) error decoding module 182 of an inbound distributed storage and task (DST) processing section.

The DS error decoding module 182 includes an inverse per slice security processing module 202, a de-slicing module 204, an error decoding module 206, an inverse segment security module 208, and a de-segmenting processing module 210. The dispersed error decoding module 182 is operable to de-slice and decode encoded slices per data segment 218 utilizing a de-slicing and decoding function 228 to produce a plurality of data segments that are de-segmented utilizing a de-segment function 230 to recover data 92.

In an example of operation, the inverse per slice security processing module 202, when enabled by the control module 186 via control information 190, unsecures each encoded data slice 218 based on slice de-security information (e.g., the compliment of the slice security information discussed with reference to FIG. 6) received as control information 190 from the control module 186. The slice de-security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 218, it decrypts each verified encoded data slice, and decompresses each decrypted encoded data slice to produce slice encoded data. When the inverse per slice security processing module 202 is not enabled, it passes the encoded data slices 218 as the sliced encoded data or is bypassed such that the retrieved encoded data slices 218 are provided as the sliced encoded data.

The de-slicing module 204 de-slices the sliced encoded data into encoded data segments in accordance with a pillar width of the error correction encoding parameters received as control information 190 from a control module 186. For example, if the pillar width is five, the de-slicing module de-slices a set of five encoded data slices into an encoded data segment. Alternatively, the encoded data segment may include just three encoded data slices (e.g., when the decode threshold is 3).

The error decoding module 206 decodes the encoded data segments in accordance with error correction decoding parameters received as control information 190 from the control module 186 to produce secure data segments. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments based on segment security information received as control information 190 from the control module 186. The segment security information includes data decompression, decryption, de-watermarking, integrity check (e.g., CRC, etc.) verification, and/or any other type of digital security. For example, when the inverse segment security processing module is enabled, it verifies integrity information (e.g., a CRC value) of each secure data segment, it decrypts each verified secured data segment, and decompresses each decrypted secure data segment to produce a data segment 152. When the inverse segment security processing module 208 is not enabled, it passes the decoded data segment 152 as the data segment or is bypassed. The de-segmenting processing module 210 aggregates the data segments 152 into the data 92 in accordance with control information 190 from the control module 186.

Figure 27:
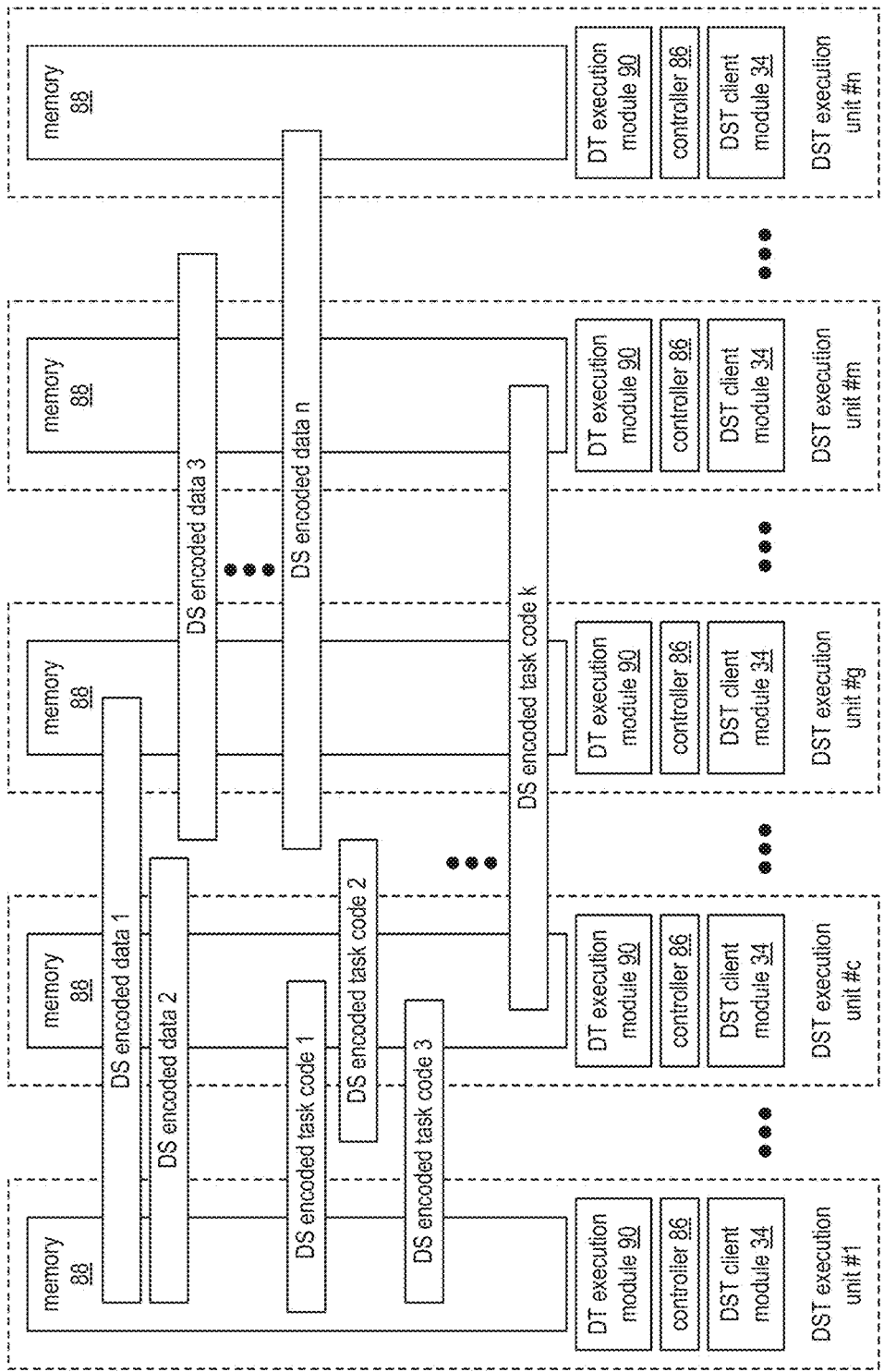
FIG. 27 is a schematic block diagram of an example of a distributed storage and task processing network (DSTN) module storing a plurality of data and a plurality of task codes in accordance with the present invention.

FIG. 27 is a schematic block diagram of an example of a distributed storage and task processing network (DSTN) module that includes a plurality of distributed storage and task (DST) execution units (#1 through #n, where, for example, n is an integer greater than or equal to three). Each of the DST execution units includes a DST client module 34, a controller 86, one or more DT (distributed task) execution modules 90, and memory 88.

In this example, the DSTN module stores, in the memory of the DST execution units, a plurality of DS (dispersed storage) encoded data (e.g., 1 through n, where n is an integer greater than or equal to two) and stores a plurality of DS encoded task codes (e.g., 1 through k, where k is an integer greater than or equal to two). The DS encoded data may be encoded in accordance with one or more examples described with reference to FIGS. 3-19 (e.g., organized in slice groupings) or encoded in accordance with one or more examples described with reference to FIGS. 20-26 (e.g., organized in pillar groups). The data that is encoded into the DS encoded data may be of any size and/or of any content. For example, the data may be one or more digital books, a copy of a company's emails, a large-scale Internet search, a video security file, one or more entertainment video files (e.g., television programs, movies, etc.), data files, and/or any other large amount of data (e.g., greater than a few Terabytes).

The tasks that are encoded into the DS encoded task code may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. The tasks may be encoded into the DS encoded task code in accordance with one or more examples described with reference to FIGS. 3-19 (e.g., organized in slice groupings) or encoded in accordance with one or more examples described with reference to FIGS. 20-26 (e.g., organized in pillar groups).

In an example of operation, a DST client module of a user device or of a DST processing unit issues a DST request to the DSTN module. The DST request may include a request to retrieve stored data, or a portion thereof, may include a request to store data that is included with the DST request, may include a request to perform one or more tasks on stored data, may include a request to perform one or more tasks on data included with the DST request, etc. In the cases where the DST request includes a request to store data or to retrieve data, the client module and/or the DSTN module processes the request as previously discussed with reference to one or more of FIGS. 3-19 (e.g., slice groupings) and/or 20-26 (e.g., pillar groupings). In the case where the DST request includes a request to perform one or more tasks on data included with the DST request, the DST client module and/or the DSTN module process the DST request as previously discussed with reference to one or more of FIGS. 3-19.

In the case where the DST request includes a request to perform one or more tasks on stored data, the DST client module and/or the DSTN module processes the DST request as will be described with reference to one or more of FIGS. 28-39. In general, the DST client module identifies data and one or more tasks for the DSTN module to execute upon the identified data. The DST request may be for a one-time execution of the task or for an on-going execution of the task. As an example of the latter, as a company generates daily emails, the DST request may be to daily search new emails for inappropriate content and, if found, record the content, the email sender(s), the email recipient(s), email routing information, notify human resources of the identified email, etc.

Figure 28:
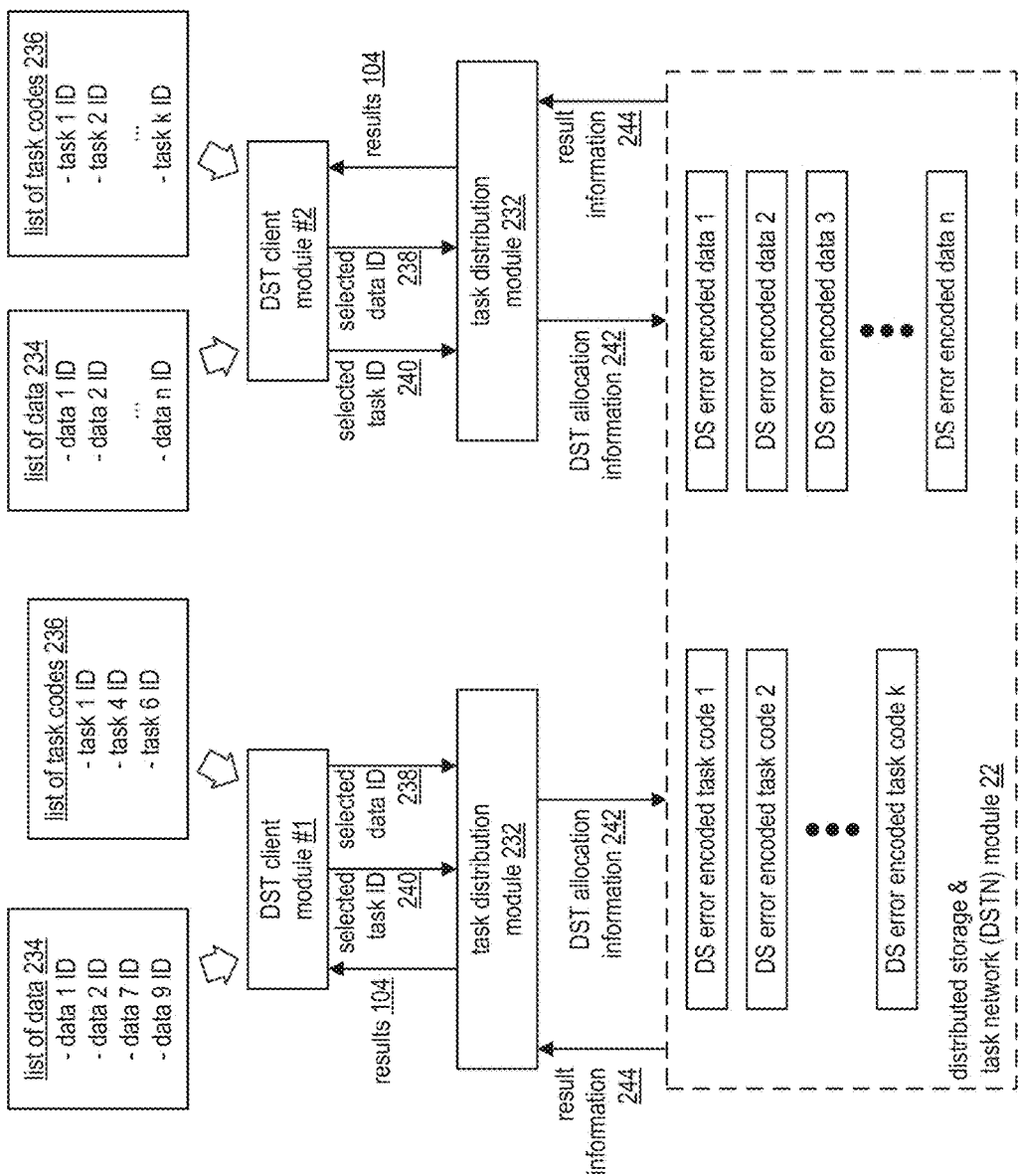
FIG. 28 is a schematic block diagram of an example of the distributed computing system performing tasks on stored data in accordance with the present invention.

FIG. 28 is a schematic block diagram of an example of a distributed computing system performing tasks on stored data. In this example, two distributed storage and task (DST) client modules 1-2 are shown: the first may be associated with a user device and the second may be associated with a DST processing unit or a high priority user device (e.g., high priority clearance user, system administrator, etc.). Each DST client module includes a list of stored data 234 and a list of tasks codes 236. The list of stored data 234 includes one or more entries of data identifying information, where each entry identifies data stored in the DSTN module 22. The data identifying information (e.g., data ID) includes one or more of a data file name, a data file directory listing, DSTN addressing information of the data, a data object identifier, etc. The list of tasks 236 includes one or more entries of task code identifying information, when each entry identifies task codes stored in the DSTN module 22. The task code identifying information (e.g., task ID) includes one or more of a task file name, a task file directory listing, DSTN addressing information of the task, another type of identifier to identify the task, etc.

As shown, the list of data 234 and the list of tasks 236 are each smaller in number of entries for the first DST client module than the corresponding lists of the second DST client module. This may occur because the user device associated with the first DST client module has fewer privileges in the distributed computing system than the device associated with the second DST client module. Alternatively, this may occur because the user device associated with the first DST client module serves fewer users than the device associated with the second DST client module and is restricted by the distributed computing system accordingly. As yet another alternative, this may occur through no restraints by the distributed computing system, it just occurred because the operator of the user device associated with the first DST client module has selected fewer data and/or fewer tasks than the operator of the device associated with the second DST client module.

In an example of operation, the first DST client module selects one or more data entries 238 and one or more tasks 240 from its respective lists (e.g., selected data ID and selected task ID). The first DST client module sends its selections to a task distribution module 232. The task distribution module 232 may be within a stand-alone device of the distributed computing system, may be within the user device that contains the first DST client module, or may be within the DSTN module 22.

Regardless of the task distribution module's location, it generates DST allocation information 242 from the selected task ID 240 and the selected data ID 238. The DST allocation information 242 includes data partitioning information, task execution information, and/or intermediate result information. The task distribution module 232 sends the DST allocation information 242 to the DSTN module 22. Note that one or more examples of the DST allocation information will be discussed with reference to one or more of FIGS. 29-39.

The DSTN module 22 interprets the DST allocation information 242 to identify the stored DS encoded data (e.g., DS error encoded data 2) and to identify the stored DS error encoded task code (e.g., DS error encoded task code 1). In addition, the DSTN module 22 interprets the DST allocation information 242 to determine how the data is to be partitioned and how the task is to be partitioned. The DSTN module 22 also determines whether the selected DS error encoded data 238 needs to be converted from pillar grouping to slice grouping. If so, the DSTN module 22 converts the selected DS error encoded data into slice groupings and stores the slice grouping DS error encoded data by overwriting the pillar grouping DS error encoded data or by storing it in a different location in the memory of the DSTN module 22 (i.e., does not overwrite the pillar grouping DS encoded data).

The DSTN module 22 partitions the data and the task as indicated in the DST allocation information 242 and sends the portions to selected DST execution units of the DSTN module 22. Each of the selected DST execution units performs its partial task(s) on its slice groupings to produce partial results. The DSTN module 22 collects the partial results from the selected DST execution units and provides them, as result information 244, to the task distribution module. The result information 244 may be the collected partial results, one or more final results as produced by the DSTN module 22 from processing the partial results in accordance with the DST allocation information 242, or one or more intermediate results as produced by the DSTN module 22 from processing the partial results in accordance with the DST allocation information 242.

The task distribution module 232 receives the result information 244 and provides one or more final results 104 therefrom to the first DST client module. The final result(s) 104 may be result information 244 or a result(s) of the task distribution module's processing of the result information 244.

In concurrence with processing the selected task of the first DST client module, the distributed computing system may process the selected task(s) of the second DST client module on the selected data(s) of the second DST client module. Alternatively, the distributed computing system may process the second DST client module's request subsequent to, or preceding, that of the first DST client module. Regardless of the ordering and/or parallel processing of the DST client module requests, the second DST client module provides its selected data 238 and selected task 240 to a task distribution module 232. If the task distribution module 232 is a separate device of the distributed computing system or within the DSTN module, the task distribution modules 232 coupled to the first and second DST client modules may be the same module. The task distribution module 232 processes the request of the second DST client module in a similar manner as it processed the request of the first DST client module.

Figure 29:
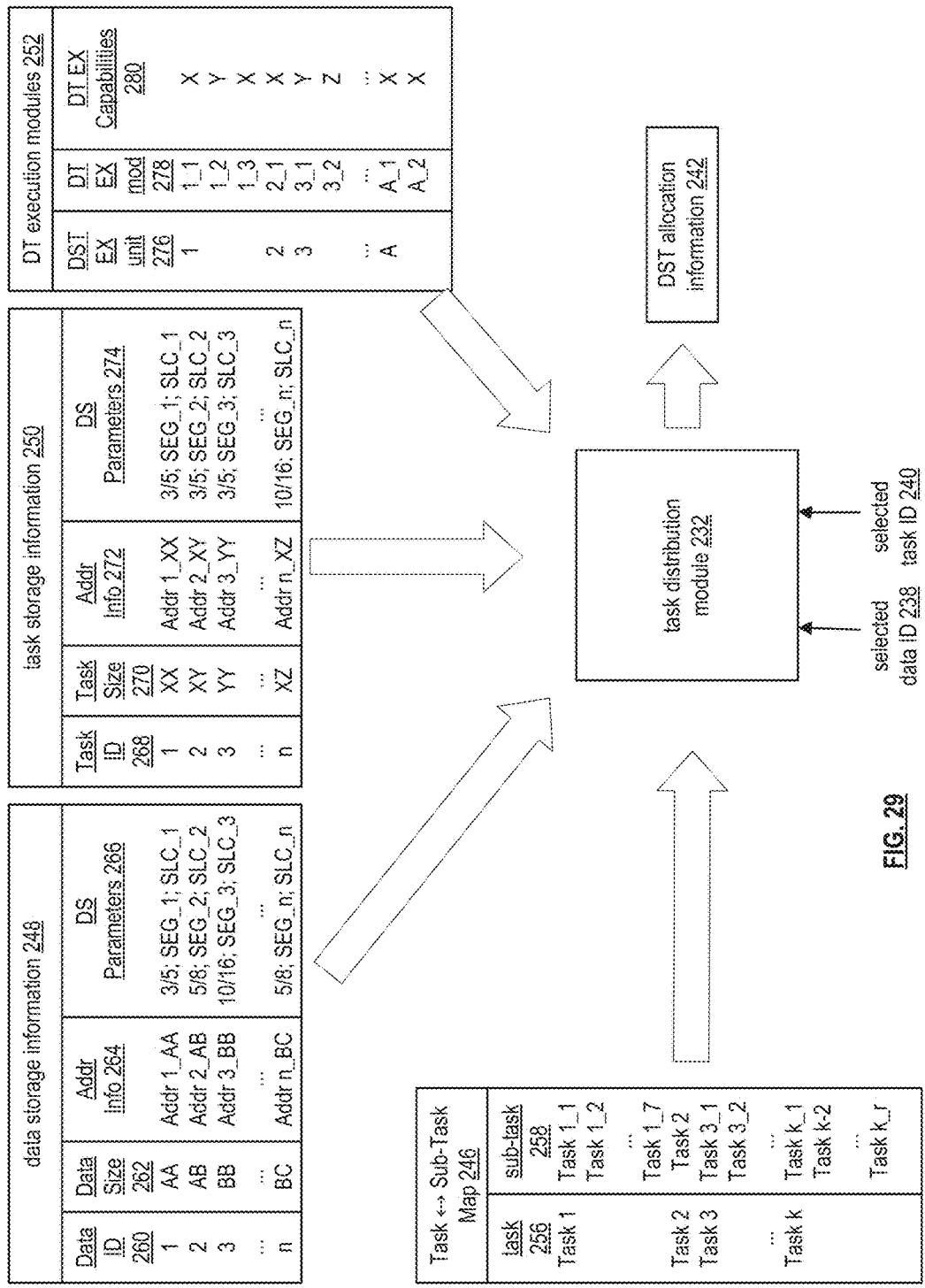
FIG. 29 is a schematic block diagram of an embodiment of a task distribution module facilitating the example of FIG. 28 in accordance with the present invention.

FIG. 29 is a schematic block diagram of an embodiment of a task distribution module 232 facilitating the example of FIG. 28. The task distribution module 232 includes a plurality of tables it uses to generate distributed storage and task (DST) allocation information 242 for selected data and selected tasks received from a DST client module. The tables include data storage information 248, task storage information 250, distributed task (DT) execution module information 252, and task ⇔ sub-task mapping information 246.

The data storage information table 248 includes a data identification (ID) field 260, a data size field 262, an addressing information field 264, distributed storage (DS) information 266, and may further include other information regarding the data, how it is stored, and/or how it can be processed. For example, DS encoded data #1 has a data ID of 1, a data size of AA (e.g., a byte size of a few Terabytes or more), addressing information of Addr_1_AA, and DS parameters of 3/5; SEG_1; and SLC_1. In this example, the addressing information may be a virtual address corresponding to the virtual address of the first storage word (e.g., one or more bytes) of the data and information on how to calculate the other addresses, may be a range of virtual addresses for the storage words of the data, physical addresses of the first storage word or the storage words of the data, may be a list of slice names of the encoded data slices of the data, etc. The DS parameters may include identity of an error encoding scheme, decode threshold/pillar width (e.g., 3/5 for the first data entry), segment security information (e.g., SEG_1), per slice security information (e.g., SLC_1), and/or any other information regarding how the data was encoded into data slices.

The task storage information table 250 includes a task identification (ID) field 268, a task size field 270, an addressing information field 272, distributed storage (DS) information 274, and may further include other information regarding the task, how it is stored, and/or how it can be used to process data. For example, DS encoded task #2 has a task ID of 2, a task size of XY, addressing information of Addr_2_XY, and DS parameters of 3/5; SEG_2; and SLC_2. In this example, the addressing information may be a virtual address corresponding to the virtual address of the first storage word (e.g., one or more bytes) of the task and information on how to calculate the other addresses, may be a range of virtual addresses for the storage words of the task, physical addresses of the first storage word or the storage words of the task, may be a list of slices names of the encoded slices of the task code, etc. The DS parameters may include identity of an error encoding scheme, decode threshold/pillar width (e.g., 3/5 for the first data entry), segment security information (e.g., SEG_2), per slice security information (e.g., SLC_2), and/or any other information regarding how the task was encoded into encoded task slices. Note that the segment and/or the per-slice security information include a type of encryption (if enabled), a type of compression (if enabled), watermarking information (if enabled), and/or an integrity check scheme (if enabled).

The task ⇔ sub-task mapping information table 246 includes a task field 256 and a sub-task field 258. The task field 256 identifies a task stored in the memory of a distributed storage and task network (DSTN) module and the corresponding sub-task fields 258 indicates whether the task includes sub-tasks and, if so, how many and if any of the sub-tasks are ordered. In this example, the task ⇔ sub-task mapping information table 246 includes an entry for each task stored in memory of the DSTN module (e.g., task 1 through task k). In particular, this example indicates that task 1 includes 7 sub-tasks; task 2 does not include sub-tasks, and task k includes r number of sub-tasks (where r is an integer greater than or equal to two).

The DT execution module table 252 includes a DST execution unit ID field 276, a DT execution module ID field 278, and a DT execution module capabilities field 280. The DST execution unit ID field 276 includes the identity of DST units in the DSTN module. The DT execution module ID field 278 includes the identity of each DT execution unit in each DST unit. For example, DST unit 1 includes three DT executions modules (e.g., 1_1, 1_2, and 1_3). The DT execution capabilities field 280 includes identity of the capabilities of the corresponding DT execution unit. For example, DT execution module 1_1 includes capabilities X, where X includes one or more of MIPS capabilities, processing resources (e.g., quantity and capability of microprocessors, CPUs, digital signal processors, co-processor, microcontrollers, arithmetic logic circuitry, and/or other analog and/or digital processing circuitry), availability of the processing resources, memory information (e.g., type, size, availability, etc.), and/or any information germane to executing one or more tasks.

From these tables, the task distribution module 232 generates the DST allocation information 242 to indicate where the data is stored, how to partition the data, where the task is stored, how to partition the task, which DT execution units should perform which partial task on which data partitions, where and how intermediate results are to be stored, etc. If multiple tasks are being performed on the same data or different data, the task distribution module factors such information into its generation of the DST allocation information.

Figure 30:
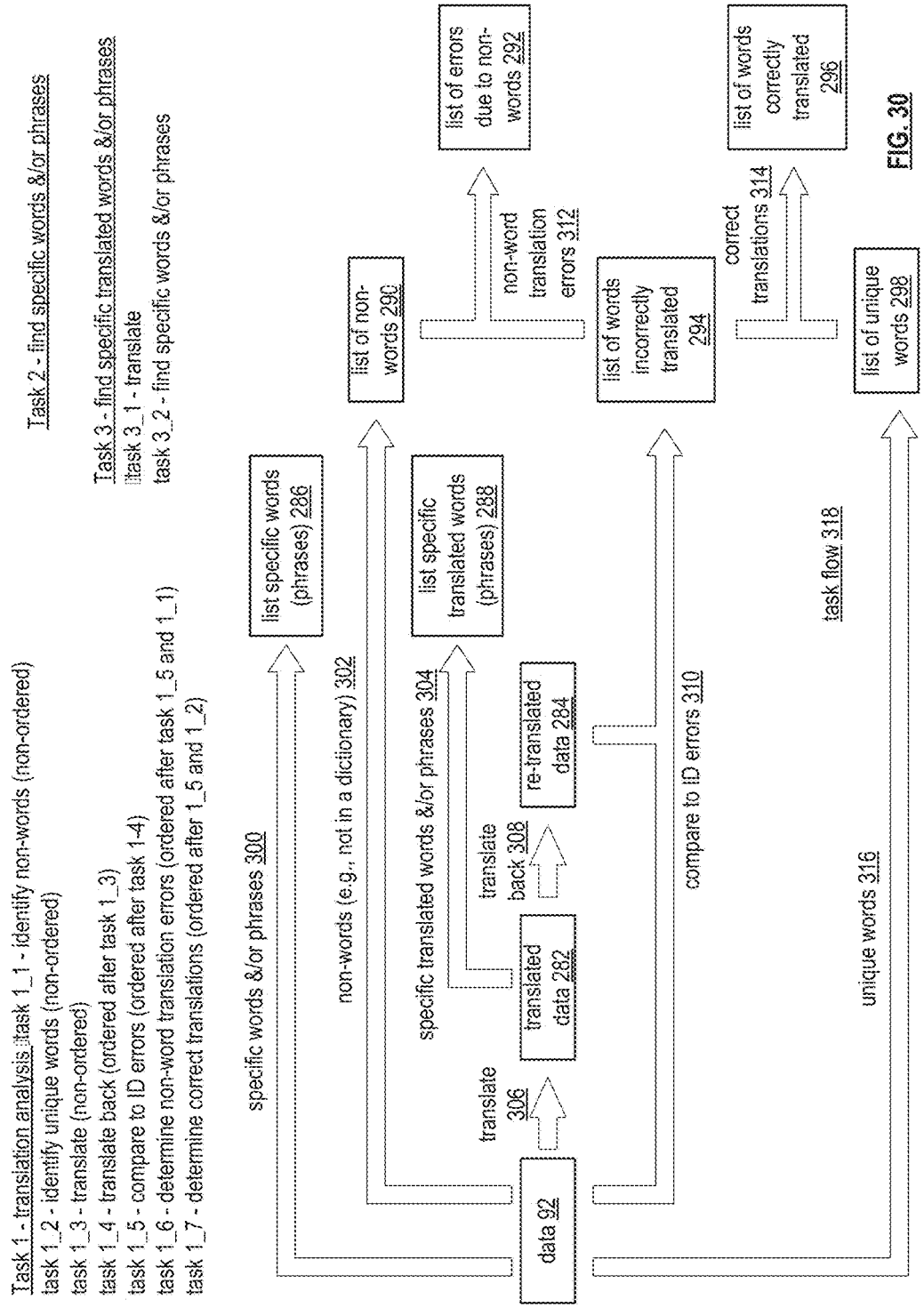
FIG. 30 is a diagram of a specific example of the distributed computing system performing tasks on stored data in accordance with the present invention.

FIG. 30 is a diagram of a specific example of a distributed computing system performing tasks on stored data as a task flow 318. In this example, selected data 92 is data 2 and selected tasks are tasks 1, 2, and 3. Task 1 corresponds to analyzing translation of data from one language to another (e.g., human language or computer language); task 2 corresponds to finding specific words and/or phrases in the data; and task 3 corresponds to finding specific translated words and/or phrases in translated data.

In this example, task 1 includes 7 sub-tasks: task 1_1—identify non-words (non-ordered); task 1_2—identify unique words (non-ordered); task 1_3—translate (non-ordered); task 1_4—translate back (ordered after task 1_3); task 1_5—compare to ID errors (ordered after task 1-4); task 1_6—determine non-word translation errors (ordered after task 1_5 and 1_1); and task 1_7—determine correct translations (ordered after 1_5 and 1_2). The sub-task further indicates whether they are an ordered task (i.e., are dependent on the outcome of another task) or non-order (i.e., are independent of the outcome of another task). Task 2 does not include sub-tasks and task 3 includes two sub-tasks: task 3_1 translate; and task 3_2 find specific word or phrase in translated data.

In general, the three tasks collectively are selected to analyze data for translation accuracies, translation errors, translation anomalies, occurrence of specific words or phrases in the data, and occurrence of specific words or phrases on the translated data. Graphically, the data 92 is translated 306 into translated data 282; is analyzed for specific words and/or phrases 300 to produce a list of specific words and/or phrases 286; is analyzed for non-words 302 (e.g., not in a reference dictionary) to produce a list of non-words 290; and is analyzed for unique words 316 included in the data 92 (i.e., how many different words are included in the data) to produce a list of unique words 298. Each of these tasks is independent of each other and can therefore be processed in parallel if desired.

The translated data 282 is analyzed (e.g., sub-task 3_2) for specific translated words and/or phrases 304 to produce a list of specific translated words and/or phrases 288. The translated data 282 is translated back 308 (e.g., sub-task 1_4) into the language of the original data to produce re-translated data 284. These two tasks are dependent on the translate task (e.g., task 1_3) and thus must be ordered after the translation task, which may be in a pipelined ordering or a serial ordering. The re-translated data 284 is then compared 310 with the original data 92 to find words and/or phrases that did not translate (one way and/or the other) properly to produce a list of incorrectly translated words 294. As such, the comparing task (e.g., sub-task 1_5) 310 is ordered after the translation 306 and re-translation tasks 308 (e.g., sub-tasks 1_3 and 1_4).

The list of words incorrectly translated 294 is compared 312 to the list of non-words 290 to identify words that were not properly translated because the words are non-words to produce a list of errors due to non-words 292. In addition, the list of words incorrectly translated 294 is compared 314 to the list of unique words 298 to identify unique words that were properly translated to produce a list of correctly translated words 296. The comparison may also identify unique words that were not properly translated to produce a list of unique words that were not properly translated. Note that each list of words (e.g., specific words and/or phrases, non-words, unique words, translated words and/or phrases, etc.) may include the word and/or phrase, how many times it is used, where in the data it is used, and/or any other information requested regarding a word and/or phrase.

Figure 31:
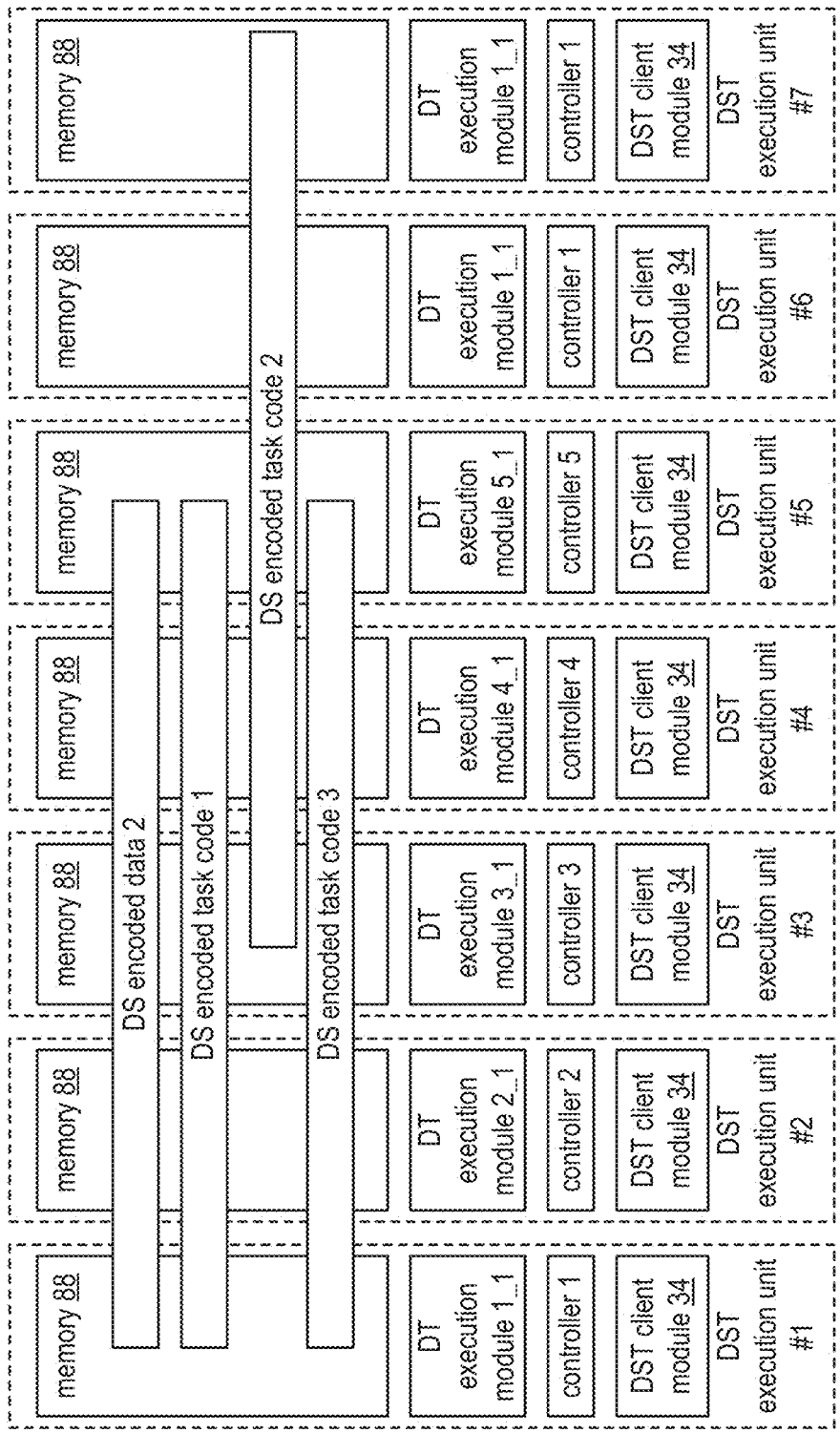
FIG. 31 is a schematic block diagram of an example of a distributed storage and task processing network (DSTN) module storing data and task codes for the example of FIG. 30 in accordance with the present invention.

FIG. 31 is a schematic block diagram of an example of a distributed storage and task processing network (DSTN) module storing data and task codes for the example of FIG. 30. As shown, DS encoded data 2 is stored as encoded data slices across the memory (e.g., stored in memories 88) of DST execution units 1-5; the DS encoded task code 1 (of task 1) and DS encoded task 3 are stored as encoded task slices across the memory of DST execution units 1-5; and DS encoded task code 2 (of task 2) is stored as encoded task slices across the memory of DST execution units 3-7. As indicated in the data storage information table and the task storage information table of FIG. 29, the respective data/task has DS parameters of 3/5 for their decode threshold/pillar width; hence spanning the memory of five DST execution units.

FIG. 32 is a diagram of an example of distributed storage and task (DST) allocation information 242 for the example of FIG. 30. The DST allocation information 242 includes data partitioning information 320, task execution information 322, and intermediate result information 324. The data partitioning information 320 includes the data identifier (ID), the number of partitions to split the data into, address information for each data partition, and whether the DS encoded data has to be transformed from pillar grouping to slice grouping. The task execution information 322 includes tabular information having a task identification field 326, a task ordering field 328, a data partition field ID 330, and a set of DT execution modules 332 to use for the distributed task processing per data partition. The intermediate result information 324 includes tabular information having a name ID field 334, an ID of the DST execution unit assigned to process the corresponding intermediate result 336, a scratch pad storage field 338, and an intermediate result storage field 340.

Continuing with the example of FIG. 30, where tasks 1-3 are to be distributedly performed on data 2, the data partitioning information includes the ID of data 2. In addition, the task distribution module determines whether the DS encoded data 2 is in the proper format for distributed computing (e.g., was stored as slice groupings). If not, the task distribution module indicates that the DS encoded data 2 format needs to be changed from the pillar grouping format to the slice grouping format, which will be done the by DSTN module. In addition, the task distribution module determines the number of partitions to divide the data into (e.g., 2_1 through 2_z) and addressing information for each partition.

The task distribution module generates an entry in the task execution information section for each sub-task to be performed. For example, task 1_1 (e.g., identify non-words on the data) has no task ordering (i.e., is independent of the results of other sub-tasks), is to be performed on data partitions 2_1 through 2_z by DT execution modules 1_1, 2_1, 3_1, 4_1, and 5_1. For instance, DT execution modules 1_1, 2_1, 3_1, 4_1, and 5_1 search for non-words in data partitions 2_1 through 2_z to produce task 1_1 intermediate results (R1-1, which is a list of non-words). Task 1_2 (e.g., identify unique words) has similar task execution information as task 1_1 to produce task 1_2 intermediate results (R1-2, which is the list of unique words).

Task 1_3 (e.g., translate) includes task execution information as being non-ordered (i.e., is independent), having DT execution modules 1_1, 2_1, 3_1, 4_1, and 5_1 translate data partitions 2_1 through 2_4 and having DT execution modules 1_2, 2_2, 3_2, 4_2, and 5_2 translate data partitions 2_5 through 2_z to produce task 1_3 intermediate results (R1-3, which is the translated data). In this example, the data partitions are grouped, where different sets of DT execution modules perform a distributed sub-task (or task) on each data partition group, which allows for further parallel processing.

Task 1_4 (e.g., translate back) is ordered after task 1_3 and is to be executed on task 1_3's intermediate result (e.g., R1-3_1) (e.g., the translated data). DT execution modules 1_1, 2_1, 3_1, 4_1, and 5_1 are allocated to translate back task 1_3 intermediate result partitions R1-3_1 through R1-3_4 and DT execution modules 1_2, 2_2, 6_1, 7_1, and 7_2 are allocated to translate back task 1_3 intermediate result partitions R1-3_5 through R1-3_z to produce task 1-4 intermediate results (R1-4, which is the translated back data).

Task 1_5 (e.g., compare data and translated data to identify translation errors) is ordered after task 1_4 and is to be executed on task 1_4's intermediate results (R4-1) and on the data. DT execution modules 1_1, 2_1, 3_1, 4_1, and 5_1 are allocated to compare the data partitions (2_1 through 2_z) with partitions of task 1-4 intermediate results partitions R1-4_1 through R1-4_z to produce task 1_5 intermediate results (R1-5, which is the list words translated incorrectly).

Task 1_6 (e.g., determine non-word translation errors) is ordered after tasks 1_1 and 1_5 and is to be executed on tasks 1_1's and 1_5's intermediate results (R1-1 and R1-5). DT execution modules 1_1, 2_1, 3_1, 4_1, and 5_1 are allocated to compare the partitions of task 1_1 intermediate results (R1-1_1 through R1-1_z) with partitions of task 1-5 intermediate results partitions (R1-5_1 through R1-5_z) to produce task 1_6 intermediate results (R1-6, which is the list translation errors due to non-words).

Task 1_7 (e.g., determine words correctly translated) is ordered after tasks 1_2 and 1_5 and is to be executed on tasks 1_2's and 1_5's intermediate results (R1-1 and R1-5). DT execution modules 1_2, 2_2, 3_2, 4_2, and 5_2 are allocated to compare the partitions of task 1_2 intermediate results (R1-2_1 through R1-2_z) with partitions of task 1-5 intermediate results partitions (R1-5_1 through R1-5_z) to produce task 1_7 intermediate results (R1-7, which is the list of correctly translated words).

Task 2 (e.g., find specific words and/or phrases) has no task ordering (i.e., is independent of the results of other sub-tasks), is to be performed on data partitions 2_1 through 2_z by DT execution modules 3_1, 4_1, 5_1, 6_1, and 7_1. For instance, DT execution modules 3_1, 4_1, 5_1, 6_1, and 7_1 search for specific words and/or phrases in data partitions 2_1 through 2_z to produce task 2 intermediate results (R2, which is a list of specific words and/or phrases).

Task 3_2 (e.g., find specific translated words and/or phrases) is ordered after task 1_3 (e.g., translate) is to be performed on partitions R1-3_1 through R1-3_z by DT execution modules 1_2, 2_2, 3_2, 4_2, and 5_2. For instance, DT execution modules 1_2, 2_2, 3_2, 4_2, and 5_2 search for specific translated words and/or phrases in the partitions of the translated data (R1-3_1 through R1-3_z) to produce task 3_2 intermediate results (R3-2, which is a list of specific translated words and/or phrases).

For each task, the intermediate result information indicates which DST unit is responsible for overseeing execution of the task and, if needed, processing the partial results generated by the set of allocated DT execution units. In addition, the intermediate result information indicates a scratch pad memory for the task and where the corresponding intermediate results are to be stored. For example, for intermediate result R1-1 (the intermediate result of task 1_1), DST unit 1 is responsible for overseeing execution of the task 1_1 and coordinates storage of the intermediate result as encoded intermediate result slices stored in memory of DST execution units 1-5. In general, the scratch pad is for storing non-DS encoded intermediate results and the intermediate result storage is for storing DS encoded intermediate results.

FIGS. 33-38 are schematic block diagrams of the distributed storage and task network (DSTN) module performing the example of FIG. 30. In FIG. 33, the DSTN module accesses the data 92 and partitions it into a plurality of partitions 1-z in accordance with distributed storage and task network (DST) allocation information. For each data partition, the DSTN identifies a set of its DT (distributed task) execution modules 90 to perform the task (e.g., identify non-words (i.e., not in a reference dictionary) within the data partition) in accordance with the DST allocation information. From data partition to data partition, the set of DT execution modules 90 may be the same, different, or a combination thereof (e.g., some data partitions use the same set while other data partitions use different sets).

For the first data partition, the first set of DT execution modules (e.g., 1_1, 2_1, 3_1, 4_1, and 5_1 per the DST allocation information of FIG. 32) executes task 1_1 to produce a first partial result 102 of non-words found in the first data partition. The second set of DT execution modules (e.g., 1_1, 2_1, 3_1, 4_1, and 5_1 per the DST allocation information of FIG. 32) executes task 1_1 to produce a second partial result 102 of non-words found in the second data partition. The sets of DT execution modules (as per the DST allocation information) perform task 1_1 on the data partitions until the "z" set of DT execution modules performs task 1_1 on the "zth" data partition to produce a "zth" partial result 102 of non-words found in the "zth" data partition.

As indicated in the DST allocation information of FIG. 32, DST execution unit 1 is assigned to process the first through "zth" partial results to produce the first intermediate result (R1-1), which is a list of non-words found in the data. For instance, each set of DT execution modules 90 stores its respective partial result in the scratchpad memory of DST execution unit 1 (which is identified in the DST allocation or may be determined by DST execution unit 1). A processing module of DST execution 1 is engaged to aggregate the first through "zth" partial results to produce the first intermediate result (e.g., R1_1). The processing module stores the first intermediate result as non-DS error encoded data in the scratchpad memory or in another section of memory of DST execution unit 1.

DST execution unit 1 engages its DST client module to slice grouping based DS error encode the first intermediate result (e.g., the list of non-words). To begin the encoding, the DST client module determines whether the list of non-words is of a sufficient size to partition (e.g., greater than a Terabyte). If yes, it partitions the first intermediate result (R1-1) into a plurality of partitions (e.g., R1-1_1 through R1-1_m). If the first intermediate result is not of sufficient size to partition, it is not partitioned.

For each partition of the first intermediate result, or for the first intermediate result, the DST client module uses the DS error encoding parameters of the data (e.g., DS parameters of data 2, which includes ⅗ decode threshold/pillar width ratio) to produce slice groupings. The slice groupings are stored in the intermediate result memory (e.g., allocated memory in the memories of DST execution units 1-5).

In FIG. 34, the DSTN module is performing task 1_2 (e.g., find unique words) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_2 in accordance with the DST allocation information. From data partition to data partition, the set of DT execution modules may be the same, different, or a combination thereof. For the data partitions, the allocated set of DT execution modules executes task 1_2 to produce a partial results (e.g., 1ˢᵗ through "zth") of unique words found in the data partitions.

As indicated in the DST allocation information of FIG. 32, DST execution unit 1 is assigned to process the first through "zth" partial results 102 of task 1_2 to produce the second intermediate result (R1-2), which is a list of unique words found in the data 92. The processing module of DST execution 1 is engaged to aggregate the first through "zth" partial results of unique words to produce the second intermediate result. The processing module stores the second intermediate result as non-DS error encoded data in the scratchpad memory or in another section of memory of DST execution unit 1.

DST execution unit 1 engages its DST client module to slice grouping based DS error encode the second intermediate result (e.g., the list of non-words). To begin the encoding, the DST client module determines whether the list of unique words is of a sufficient size to partition (e.g., greater than a Terrabyte). If yes, it partitions the second intermediate result (R1-2) into a plurality of partitions (e.g., R1-2_1 through R1-2_m). If the second intermediate result is not of sufficient size to partition, it is not partitioned.

For each partition of the second intermediate result, or for the second intermediate results, the DST client module uses the DS error encoding parameters of the data (e.g., DS parameters of data 2, which includes ⅗ decode threshold/pillar width ratio) to produce slice groupings. The slice groupings are stored in the intermediate result memory (e.g., allocated memory in the memories of DST execution units 1-5).

In FIG. 35, the DSTN module is performing task 1_3 (e.g., translate) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_3 in accordance with the DST allocation information (e.g., DT execution modules 1_1, 2_1, 3_1, 4_1, and 5_1 translate data partitions 2_1 through 2_4 and DT execution modules 1_2, 2_2, 3_2, 4_2, and 5_2 translate data partitions 2_5 through 2_z). For the data partitions, the allocated set of DT execution modules 90 executes task 1_3 to produce partial results 102 (e.g., 1st through "zth") of translated data.

As indicated in the DST allocation information of FIG. 32, DST execution unit 2 is assigned to process the first through "zth" partial results of task 1_3 to produce the third intermediate result (R1-3), which is translated data. The processing module of DST execution 2 is engaged to aggregate the first through "zth" partial results of translated data to produce the third intermediate result. The processing module stores the third intermediate result as non-DS error encoded data in the scratchpad memory or in another section of memory of DST execution unit 2.

DST execution unit 2 engages its DST client module to slice grouping based DS error encode the third intermediate result (e.g., translated data). To begin the encoding, the DST client module partitions the third intermediate result (R1-3) into a plurality of partitions (e.g., R1-3_1 through R1-3_y). For each partition of the third intermediate result, the DST client module uses the DS error encoding parameters of the data (e.g., DS parameters of data 2, which includes ⅗ decode threshold/pillar width ratio) to produce slice groupings. The slice groupings are stored in the intermediate result memory (e.g., allocated memory in the memories of DST execution units 2-6 per the DST allocation information).

As is further shown in FIG. 35, the DSTN module is performing task 1_4 (e.g., retranslate) on the translated data of the third intermediate result. To begin, the DSTN module accesses the translated data (from the scratchpad memory or from the intermediate result memory and decodes it) and partitions it into a plurality of partitions in accordance with the DST allocation information. For each partition of the third intermediate result, the DSTN identifies a set of its DT execution modules 90 to perform task 1_4 in accordance with the DST allocation information (e.g., DT execution modules 1_1, 2_1, 3_1, 4_1, and 5_1 are allocated to translate back partitions R1-3_1 through R1-3_4 and DT execution modules 1_2, 2_2, 6_1, 7_1, and 7_2 are allocated to translate back partitions R1-3_5 through R1-3_z). For the partitions, the allocated set of DT execution modules executes task 1_4 to produce partial results 102 (e.g., $1^{st}$ through "zth") of re-translated data.

As indicated in the DST allocation information of FIG. 32, DST execution unit 3 is assigned to process the first through "zth" partial results of task 1_4 to produce the fourth intermediate result (R1-4), which is retranslated data. The processing module of DST execution 3 is engaged to aggregate the first through "zth" partial results of retranslated data to produce the fourth intermediate result. The processing module stores the fourth intermediate result as non-DS error encoded data in the scratchpad memory or in another section of memory of DST execution unit 3.

DST execution unit 3 engages its DST client module to slice grouping based DS error encode the fourth intermediate result (e.g., retranslated data). To begin the encoding, the DST client module partitions the fourth intermediate result (R1-4) into a plurality of partitions (e.g., R1-4_1 through R1-4_z). For each partition of the fourth intermediate result, the DST client module uses the DS error encoding parameters of the data (e.g., DS parameters of data 2, which includes ⅗ decode threshold/pillar width ratio) to produce slice groupings. The slice groupings are stored in the intermediate result memory (e.g., allocated memory in the memories of DST execution units 3-7 per the DST allocation information).

Figure 36:
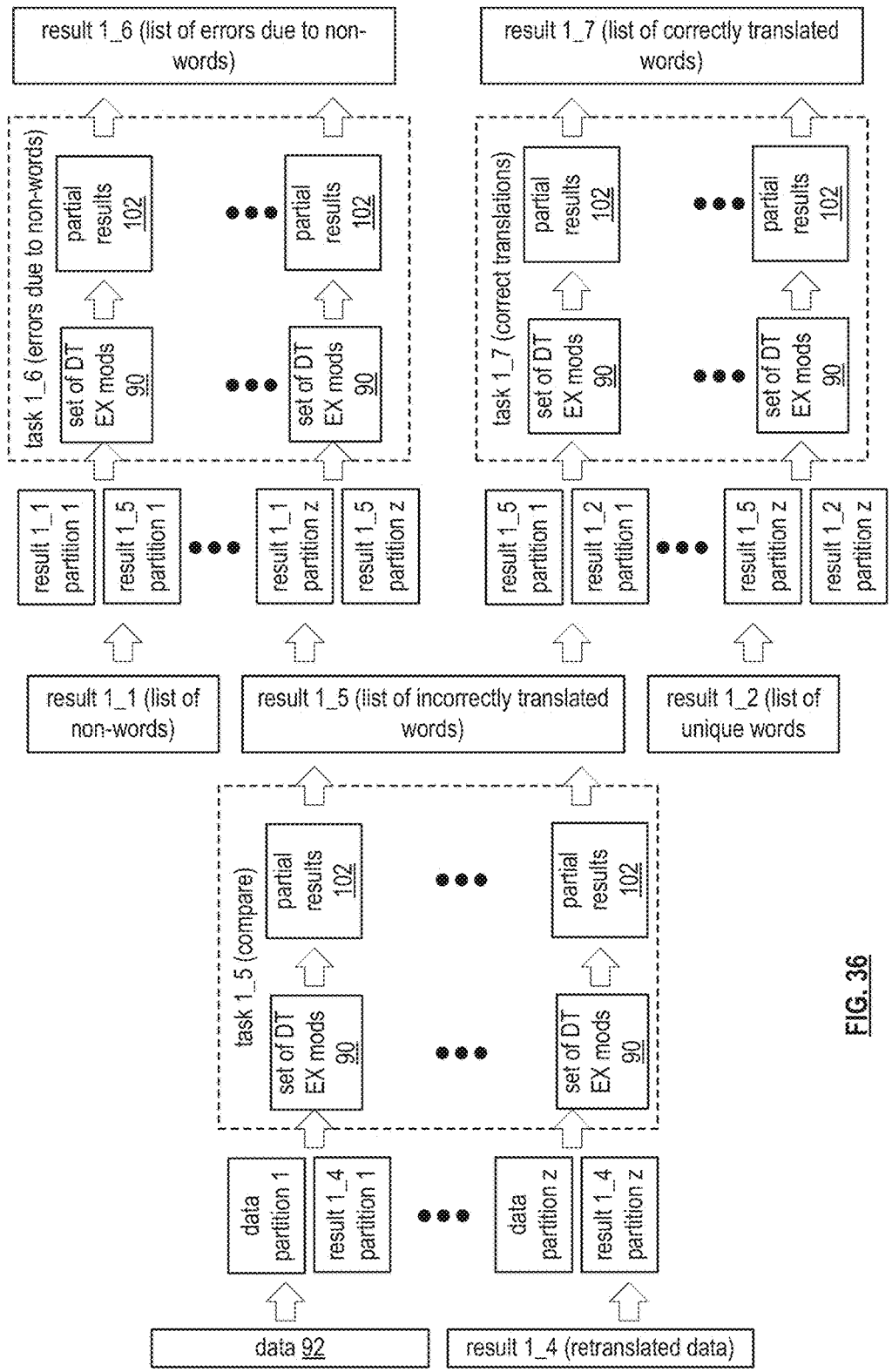

In FIG. 36, a distributed storage and task network (DSTN) module is performing task 1_5 (e.g., compare) on data 92 and retranslated data of FIG. 35. To begin, the DSTN module accesses the data 92 and partitions it into a plurality of partitions in accordance with the DST allocation information or it may use the data partitions of task 1_1 if the partitioning is the same. The DSTN module also accesses the retranslated data from the scratchpad memory, or from the intermediate result memory and decodes it, and partitions it into a plurality of partitions in accordance with the DST allocation information. The number of partitions of the retranslated data corresponds to the number of partitions of the data.

For each pair of partitions (e.g., data partition 1 and retranslated data partition 1), the DSTN identifies a set of its DT execution modules 90 to perform task 1_5 in accordance with the DST allocation information (e.g., DT execution modules 1_1, 2_1, 3_1, 4_1, and 5_1). For each pair of partitions, the allocated set of DT execution modules executes task 1_5 to produce partial results 102 (e.g., $1^{st}$ through "zth") of a list of incorrectly translated words and/or phrases.

As indicated in the DST allocation information of FIG. 32, DST execution unit 1 is assigned to process the first through "zth" partial results of task 1_5 to produce the fifth intermediate result (R1-5), which is the list of incorrectly translated words and/or phrases. In particular, the processing module of DST execution 1 is engaged to aggregate the first through "zth" partial results of the list of incorrectly translated words and/or phrases to produce the fifth intermediate result. The processing module stores the fifth intermediate result as non-DS error encoded data in the scratchpad memory or in another section of memory of DST execution unit 1.

DST execution unit 1 engages its DST client module to slice grouping based DS error encode the fifth intermediate result. To begin the encoding, the DST client module partitions the fifth intermediate result (R1-5) into a plurality of partitions (e.g., R1-5_1 through R1-5_z). For each partition of the fifth intermediate result, the DST client module uses the DS error encoding parameters of the data (e.g., DS parameters of data 2, which includes ⅗ decode threshold/pillar width ratio) to produce slice groupings. The slice groupings are stored in the intermediate result memory (e.g., allocated memory in the memories of DST execution units 1-5 per the DST allocation information).

As is further shown in FIG. 36, the DSTN module is performing task 1_6 (e.g., translation errors due to non-words) on the list of incorrectly translated words and/or phrases (e.g., the fifth intermediate result R1-5) and the list of non-words (e.g., the first intermediate result R1-1). To begin, the DSTN module accesses the lists and partitions them into a corresponding number of partitions.

For each pair of partitions (e.g., partition R1-1_1 and partition R1-5_1), the DSTN identifies a set of its DT execution modules 90 to perform task 1_6 in accordance with the DST allocation information (e.g., DT execution modules 1_1, 2_1, 3_1, 4_1, and 5_1). For each pair of partitions, the allocated set of DT execution modules executes task 1_6 to produce partial results 102 (e.g., $1^{st}$ through "zth") of a list of incorrectly translated words and/or phrases due to non-words.

As indicated in the DST allocation information of FIG. 32, DST execution unit 2 is assigned to process the first through "zth" partial results of task 1_6 to produce the sixth intermediate result (R1-6), which is the list of incorrectly translated words and/or phrases due to non-words. In particular, the processing module of DST execution 2 is engaged to aggregate the first through "zth" partial results of the list of incorrectly translated words and/or phrases due to non-words to produce the sixth intermediate result. The processing module stores the sixth intermediate result as non-DS error encoded data in the scratchpad memory or in another section of memory of DST execution unit 2.

DST execution unit 2 engages its DST client module to slice grouping based DS error encode the sixth intermediate result. To begin the encoding, the DST client module partitions the sixth intermediate result (R1-6) into a plurality of partitions (e.g., R1-6_1 through R1-6_z). For each partition of the sixth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is still further shown in FIG. 36, the DSTN module is performing task 1_7 (e.g., correctly translated words and/or phrases) on the list of incorrectly translated words and/or phrases (e.g., the fifth intermediate result R1-5) and the list of unique words (e.g., the second intermediate result R1-2). To begin, the DSTN module accesses the lists and partitions them into a corresponding number of partitions.

For each pair of partitions (e.g., partition R1-2_1 and partition R1-5_1), the DSTN identifies a set of its DT execution modules 90 to perform task 1_7 in accordance with the DST allocation information (e.g., DT execution modules 1_2, 2_2, 3_2, 4_2, and 5_2). For each pair of partitions, the allocated set of DT execution modules executes task 1_7 to produce partial results 102 (e.g., $1^{st}$ through "zth") of a list of correctly translated words and/or phrases.

As indicated in the DST allocation information of FIG. 32, DST execution unit 3 is assigned to process the first through "zth" partial results of task 1_7 to produce the seventh intermediate result (R1-7), which is the list of correctly translated words and/or phrases. In particular, the processing module of DST execution 3 is engaged to aggregate the first through "zth" partial results of the list of correctly translated words and/or phrases to produce the seventh intermediate result. The processing module stores the seventh intermediate result as non-DS error encoded data in the scratchpad memory or in another section of memory of DST execution unit 3.

DST execution unit 3 engages its DST client module to slice grouping based DS error encode the seventh intermediate result. To begin the encoding, the DST client module partitions the seventh intermediate result (R1-7) into a plurality of partitions (e.g., R1-7_1 through R1-7_z). For each partition of the seventh intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

In FIG. 37, the distributed storage and task network (DSTN) module is performing task 2 (e.g., find specific words and/or phrases) on the data 92. To begin, the DSTN module accesses the data and partitions it into a plurality of partitions 1-z in accordance with the DST allocation information or it may use the data partitions of task 1_1 if the partitioning is the same. For each data partition, the DSTN identifies a set of its DT execution modules 90 to perform task 2 in accordance with the DST allocation information. From data partition to data partition, the set of DT execution modules may be the same, different, or a combination thereof. For the data partitions, the allocated set of DT execution modules executes task 2 to produce partial results 102 (e.g., $1^{st}$ through "zth") of specific words and/or phrases found in the data partitions.

As indicated in the DST allocation information of FIG. 32, DST execution unit 7 is assigned to process the first through "zth" partial results of task 2 to produce task 2 intermediate result (R2), which is a list of specific words and/or phrases found in the data. The processing module of DST execution 7 is engaged to aggregate the first through "zth" partial results of specific words and/or phrases to produce the task 2 intermediate result. The processing module stores the task 2 intermediate result as non-DS error encoded data in the scratchpad memory or in another section of memory of DST execution unit 7.

DST execution unit 7 engages its DST client module to slice grouping based DS error encode the task 2 intermediate result. To begin the encoding, the DST client module determines whether the list of specific words and/or phrases is of a sufficient size to partition (e.g., greater than a Terabyte). If yes, it partitions the task 2 intermediate result (R2) into a plurality of partitions (e.g., R2_1 through R2_m). If the task 2 intermediate result is not of sufficient size to partition, it is not partitioned.

For each partition of the task 2 intermediate result, or for the task 2 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, and 7).

In FIG. 38, the distributed storage and task network (DSTN) module is performing task 3 (e.g., find specific translated words and/or phrases) on the translated data (R1-3). To begin, the DSTN module accesses the translated data (from the scratchpad memory or from the intermediate result memory and decodes it) and partitions it into a plurality of partitions in accordance with the DST allocation information. For each partition, the DSTN identifies a set of its DT execution modules to perform task 3 in accordance with the DST allocation information. From partition to partition, the set of DT execution modules may be the same, different, or a combination thereof. For the partitions, the allocated set of DT execution modules 90 executes task 3 to produce partial results 102 (e.g., $1^{st}$ through "zth") of specific translated words and/or phrases found in the data partitions.

As indicated in the DST allocation information of FIG. 32, DST execution unit 5 is assigned to process the first through "zth" partial results of task 3 to produce task 3 intermediate result (R3), which is a list of specific translated words and/or phrases found in the translated data. In particular, the processing module of DST execution 5 is engaged to aggregate the first through "zth" partial results of specific translated words and/or phrases to produce the task 3 intermediate result. The processing module stores the task 3 intermediate result as non-DS error encoded data in the scratchpad memory or in another section of memory of DST execution unit 7.

DST execution unit 5 engages its DST client module to slice grouping based DS error encode the task 3 intermediate result. To begin the encoding, the DST client module determines whether the list of specific translated words and/or phrases is of a sufficient size to partition (e.g., greater than a Terabyte). If yes, it partitions the task 3 intermediate result (R3) into a plurality of partitions (e.g., R3_1 through R3_m). If the task 3 intermediate result is not of sufficient size to partition, it is not partitioned.

For each partition of the task 3 intermediate result, or for the task 3 intermediate results, the DST client module uses the DS error encoding parameters of the data (e.g., DS parameters of data 2, which includes ⅗ decode threshold/pillar width ratio) to produce slice groupings. The slice groupings are stored in the intermediate result memory (e.g., allocated memory in the memories of DST execution units 1-4, 5, and 7).

FIG. 39 is a diagram of an example of combining result information into final results 104 for the example of FIG. 30. In this example, the result information includes the list of specific words and/or phrases found in the data (task 2 intermediate result), the list of specific translated words and/or phrases found in the data (task 3 intermediate result), the list of non-words found in the data (task 1 first intermediate result R1-1), the list of unique words found in the data (task 1 second intermediate result R1-2), the list of translation errors due to non-words (task 1 sixth intermediate result R1-6), and the list of correctly translated words and/or phrases (task 1 seventh intermediate result R1-7). The task distribution module provides the result information to the requesting DST client module as the results 104.

Figure 40A:
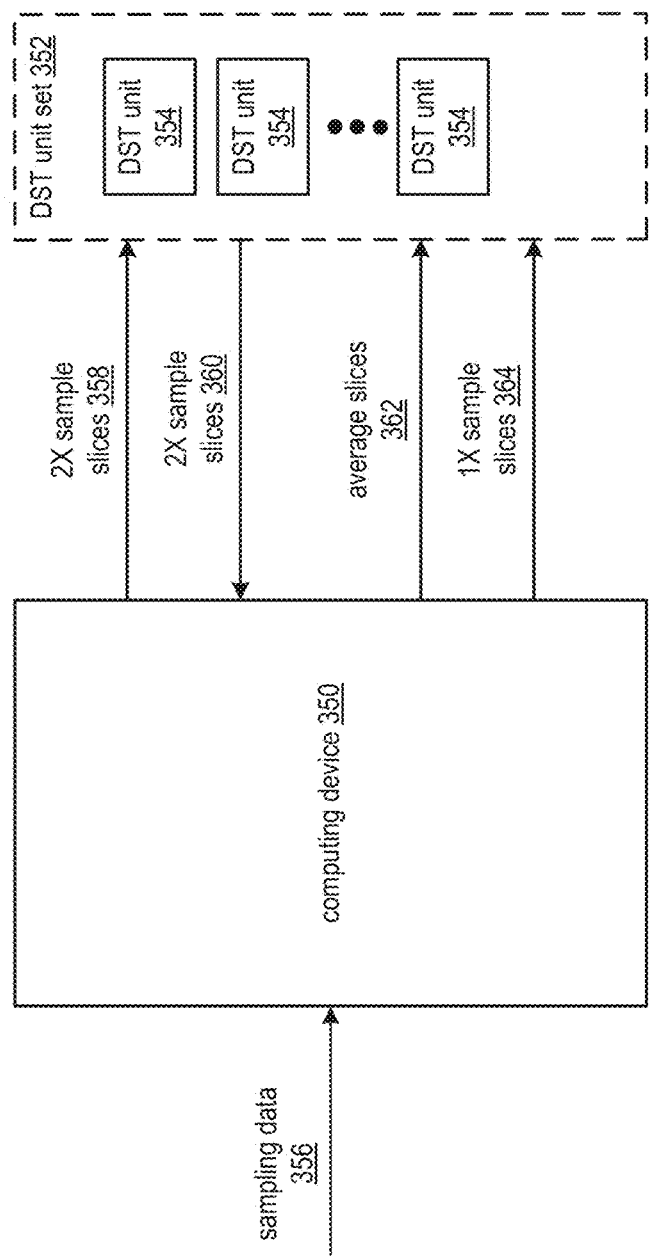
FIG. 40A is a schematic block diagram of another embodiment of a distributed computing system in accordance with the present invention.

FIG. 40A is a schematic block diagram of another embodiment of a distributed computing system that includes a computing device 350 and a distributed storage and task (DST) unit set 352. The DST unit set 352 includes a set of DST units 354. Each DST unit 354 may be implemented by one or more of the DST execution unit 36 of FIG. 1, a dispersed storage (DS) unit, a storage server, a distributed computing server, a memory module, a memory device, a user device, a DST processing unit, and a DS processing unit. The computing device 350 may be implemented utilizing one or more of the DST processing unit 16 of FIG. 1, the DST execution unit 36 of FIG. 1, a DS unit, a storage server, a distributed computing server, a user device, a DS processing unit, and a DST unit 354 of the DST unit set 352.

The system functions to receive sampling data 356 (e.g., any type of data for analysis), process the sampling data 356, and store representative processed data samples of the sampling data in the DST unit set 352 as one or more sets of encoded data slices. The computing device 350 receives the sampling data 356 and samples the sampling data 356 to produce a 2× sample data object. For example, the computing device 350 samples the sampling data 356 at a sampling rate that is twice a reference sampling rate to produce a plurality of 2× samples, where the 2× sample data object includes the plurality of 2× samples. Next, the computing device 350 encodes the 2× sample data object using a dispersed storage error coding function to produce one or more sets of 2× sample slices 358. The computing device 350 outputs the one or more sets of 2× sample slices 358 to the DST unit set 352 for storage therein.

The computing device 350 averages every two adjacent samples of the 2× sample data object to produce an average sample data object. The averaging may include recovering the 2× sample data object from the DST unit set 352 (e.g., retrieving at least a decode threshold number of 2× sample slices 360 for each set of the one or more sets of 2× sample slices 358, decoding retrieved 2× sample slices 360). The plurality of 2× samples of the 2× sample data object may be numbered. Every two adjacent samples includes one odd-numbered sample and one even-numbered sample. Next, the computing device 350 deletes every other sample of the plurality of 2× samples of the 2× sample data object to produce a plurality of 1× samples of a 1× sample data object. For example, the computing device 350 deletes all the odd-numbered 2× samples.

The computing device 350 encodes the average data object to produce one or more sets of average slices 362. The computing device 350 encodes the 1× sample data object to produce one or more sets of 1× sample slices 364. The computing device 350 stores the one or more sets of average slices 362 and the one or more sets of 1× sample slices 364 in the DST unit set 352.

Such a combination process can be repeated any number of times, where on a bottom level, there may be a sample every second, then a sample every 2 seconds, then 4, 8, 16, 32, and so on. A graphing package can render these samples at a low (weekly, or daily) resolution by retrieving the appropriate objects corresponding to that reduced resolution, but the graphing package can also zoom in to the highest level when desired.

Figure 40B:
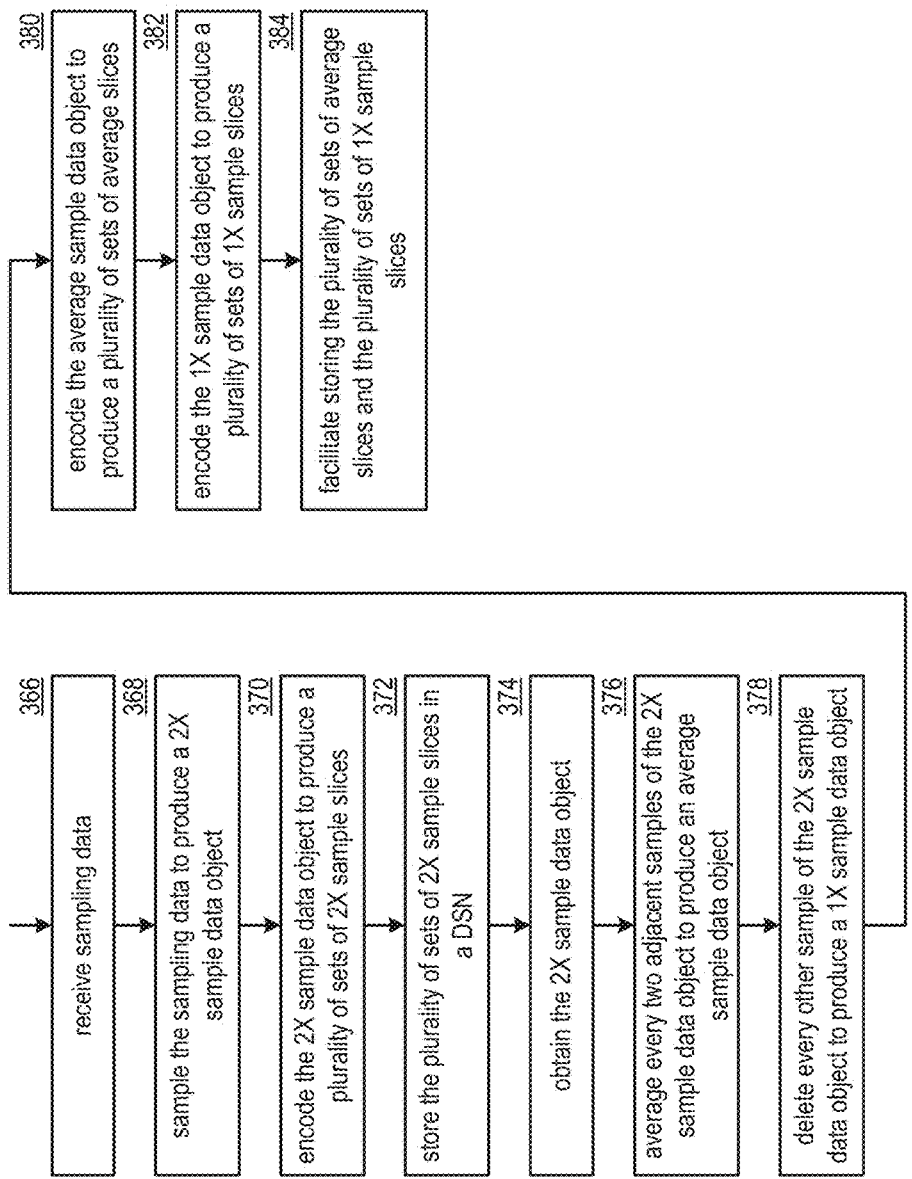
FIG. 40B is a flowchart illustrating an example of storing data samples in accordance with the present invention.

FIG. 40B is a flowchart illustrating an example of storing data samples. The method begins at step 366 where a processing module (e.g., of a computing device) receives sampling data. The method continues at step 368 where the processing module samples the sampling data to produce a 2× sample data object (e.g., sampling at a rate twice a reference rate). The method continues at step 370 where the processing module and encodes the 2× sample data object using a dispersed storage error coding function to produce a plurality of sets of 2× examples slices. The method continues at step 372 where the processing module stores the plurality of sets of 2× sample slices in a dispersed storage network (DSN) memory.

The method continues at step 374 where the processing module obtains the 2× sample data object. The obtaining includes at least one of retrieving from a local memory and recovering from at least some of the plurality of sets of 2× sample slices stored in the DSN memory. The recovering includes retrieving at least a decode threshold number of 2× sample slices of each set of the plurality of sets of 2× sample slices, decoding the decode threshold number of 2× sample slices to produce a plurality of data segments, and aggregating the plurality of data segments to produce the recovered 2× sample data object.

The method continues at step 376 where the processing module averages every two adjacent samples of the 2× sample data object to produce an average sample data object. As such, the average sample data object includes half as many samples and is half the size of the 2× sample data object. The method continues at step 378 where the processing module deletes every other sample of the 2× sample data object to produce a 1× sample data object. As such, the 1× sample data object has half as many samples as the 2× sample data object.

The method continues at step 380 where the processing module encodes the average sample data object to produce a plurality of sets of average slices using the dispersed storage error coding function. The method continues at step 382 where the processing module encodes the 1× sample data object to produce a plurality of sets of 1× sample slices using the dispersed storage error coding function. The method continues at step 384 where the processing module facilitates storing the plurality of sets of average slices and the plurality of sets of 1× sample slices. For example, the processing module generates a common set of write requests that includes a common transaction number and the plurality sets of average slices and the plurality of sets of 1× sample slices. Next, the processing module utilizes a three-phase commit process to align storage of a common revision of the average sample data object and the 1× sample data object in the DSN memory. For instance, the processing module outputs the common set of write requests to the DSN memory, outputs a common set of commit transaction requests for the common transaction number, and outputs a common set of finalize requests for the common transaction number.

FIGS. 41A-41D are schematic block diagrams of an embodiment of a dispersed storage network (DSN) that illustrate an example of updating shared group information. The DSN includes the network 24 of FIG. 1 and an affiliated group of computing devices 388. The affiliated group of computing devices 388 includes two or more computing devices that share a common affiliation. The common affiliation may include at least one of storage devices for a common DSN address range, a group of user devices sharing a common vault, a group of computing devices of the DSN, and any other computing device association. As a specific example, the affiliated group of computing devices 388 includes a distributed storage and task (DST) execution (EX) unit set 390 that has been assigned encoded data slice storage responsibilities for the common DSN address range, where the DST execution unit set 390 includes a set of DST execution units (e.g., computing devices) that store sets of encoded data slices associated with the common DSN address range when the common affiliation includes storage devices for the common DSN address range. As another specific example, the affiliated group of computing devices 388 includes a group of ten user devices 12 of FIG. 1 that share a common vault number 457 for storage of data in the DSN when the common affiliation includes the group of user devices sharing the common vault. As yet another specific example, the affiliated group of computing devices 388 includes five hundred computing devices (e.g., mixture of user devices 12, DST processing units 16, DST execution units 16 of FIG. 1) when the common affiliation includes the group of computing devices of the DSN.

When the affiliated group of computing devices 388 includes the DST execution unit set 390, DST execution unit set 390 includes the set of DST execution units. Each DST execution unit of the set of DST execution units may be implemented with the DST execution unit 36 of FIG. 1. The set of DST execution units includes at least a width number of DST execution units, where dispersal parameters of a dispersed storage error coding function includes one or more of the width number, a write threshold, a target threshold, a read threshold, and a decode threshold. For example, the set of DST execution units includes DST execution units 1-6 when the width number is 6.

Each DST execution unit includes the processing module 84 of FIG. 3 and a collection of memory devices (e.g., memory devices 1-4) such that, collectively, the set of DST execution units (e.g., affiliated group of computing devices) includes a plurality (e.g., 4) of collections of memory devices, and where the plurality of collections of memory devices are virtually arranged into a multitude of memory sets (e.g., 1-4) that span the set of DST execution units. Each memory set is associated with a unique DSN address range. For example, a memory set 1 of the multitude a memory sets includes memory 1 of DST execution unit 1, memory 2 of DST execution unit 2, etc., through memory 1 of DST execution unit 6 and is associated with a first DSN address range. As such, the memories 1 of the memory set 1 are utilized for storage of sets of encoded data slices associated with slice names that are common to the first DSN address range. The processing module 84 includes a dispersed storage (DS) module 386, where the DS module 386 includes one or more modules to facilitate operation of the associated DST execution unit (e.g., computing device).

The affiliated group of computing devices 388 operate in accordance with the shared group information, where the shared group information includes data regarding inter-device operation for at least some of the computing devices of the affiliated group of computing devices. The shared group information includes one or more of intra-device configuration information (e.g., the dispersal parameters, memory device activation/de-activation, available processing resources, available network communication resources, DSN address range assignment), inter-device configuration information (e.g., which DST execution units to activate/deactivate memories of a given memory set, the target threshold number, vault number assignment, a slice error scanning DSN address range assignments, computing device authorization access information), power saving modes (e.g., adjusting target threshold number of active memories per memory set, deactivating a DST execution unit, activating a DST execution unit), group level administration functions (e.g., network management roles, error message handling, new vault establishment), device level administration functions (e.g., self testing procedures, naming assignment, error reporting procedures, software update procedures, configuration procedures, power usage guidelines), and operational functions (e.g., performing one or more functions including reading, writing, deleting, listing, etc.). As a specific example, DST execution units 1-6 utilize dispersal parameters that includes a decode threshold of 4, a target threshold of 4, and the width number of 6 when the shared group information includes inter-device configuration information specifying the dispersal parameters.

The target threshold indicates a number of memories of a memory set to activate for simultaneous operation in accordance with a corresponding power saving mode, where the target threshold is greater than or equal to the decode threshold and less than or equal to the width number. The target threshold may be different for each memory set. For example, memory 2 of DST execution units 1, 2, 3 and 6 are activated and memory 2 of DST execution units 4 and 5 are deactivated when the target threshold is 4. As another example, memory 4 of DST execution units 1, 3-6 are activated and memory 4 of DST execution unit 2 is deactivated when the target threshold is 5. FIGS. 41A-D illustrate example steps of updating the shared group information when the shared group information includes data regarding powering down memory devices within a memory set of the multitude of memory sets 1-4.

Figure 41A:
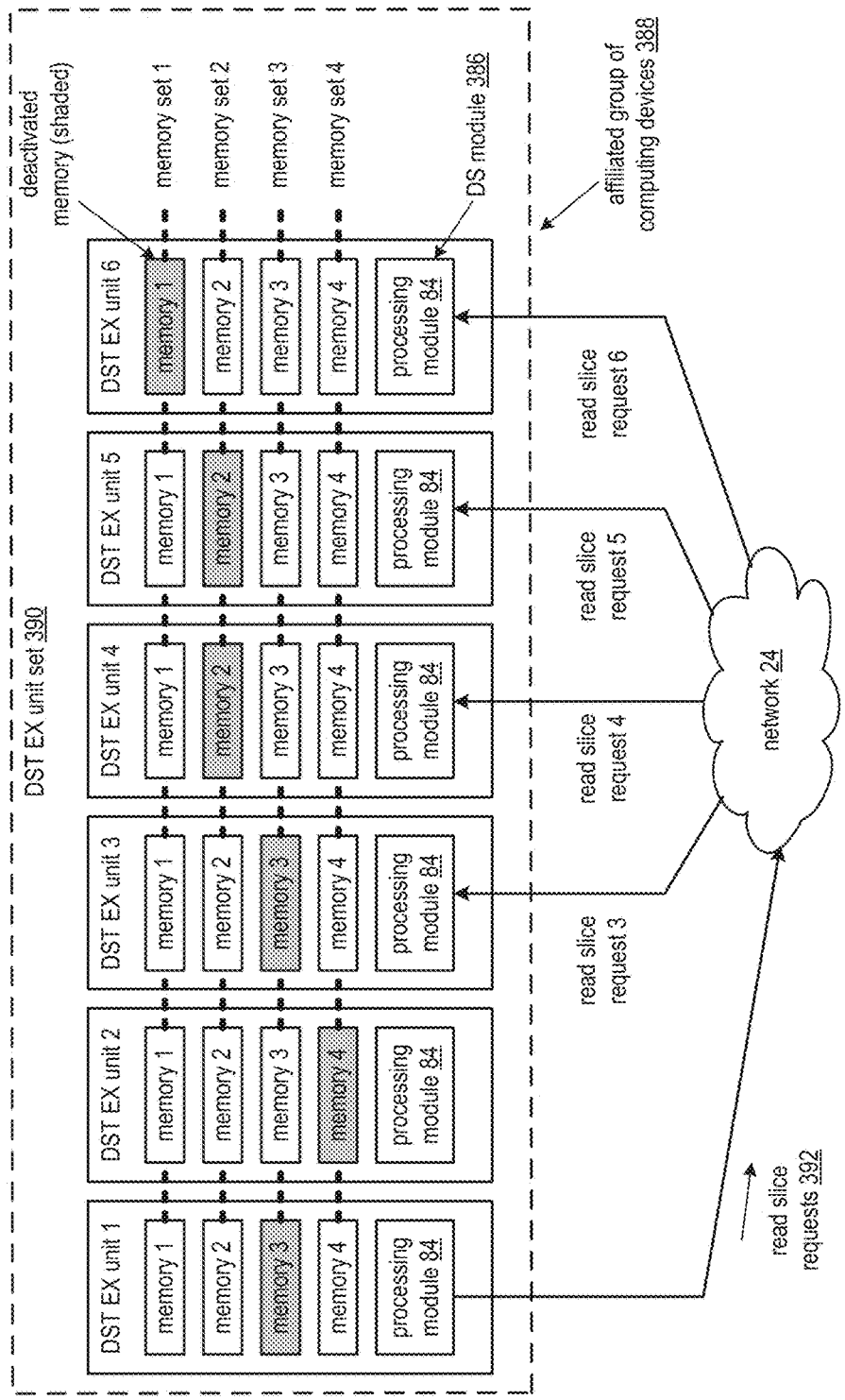
FIGS. 41A-41D are schematic block diagrams of an embodiment of a dispersed storage network (DSN) that illustrate an example of updating shared group information in accordance with the present invention.

In particular, FIG. 41A illustrates initial steps of the updating of the shared group information. As a specific example, a first module of the processing module 84 of the DST execution unit 1 establishes a desired change to the shared group information. For example, the first module establishes a desire to power-down one or more memory devices of the DST execution unit 1 when the first module detects power usage of the DST execution unit 1 exceeding a high power usage threshold level of power usage guidelines of the shared group information. As another example, the first module establishes the desire to power-down the one or more memory devices of the DST execution unit 1 when a locally stored revision of the shared group information indicates that a target threshold associated with the memory set 1 is 4 and 5 of the memories 1 are active (e.g., memory 1 of DST execution units 1-5 are active and memory 1 of DST execution unit 6 is deactivated).

The shared group information is stored in at least a subset of the DST execution units (e.g., computing devices) in the DST execution unit set 390 (e.g., affiliated group of computing devices 388). Each DST execution unit in the at least the subset of DST execution units stores an encoded portion of the shared group information. The shared group information is encoded using an encoding scheme to produce encoded portions. The encoding scheme includes at least one of the dispersed storage error coding function, a Shamir secret sharing function, and an encryption function. A current version of the shared group information is recoverable from the encoded portions stored by the at least the subset of DST execution units.

Having established the desired change to the shared group information, at least one of a second module and the first module of the processing module 84 of the DST execution unit 1 requests a current version of the shared group information from the at least the subset of the DST execution units. As a specific example, when the encoding scheme includes the dispersed storage error coding function, the second module requests at least a decode threshold number of encoded data slices from the at least the subset of DST execution units, where the shared group information is dispersed storage error encoded to produce a set of encoded data slices. For instance, the second module issues, via network 24, read slice requests 392 that includes read slice requests 3-6 two DST execution units 3-6. The decoded threshold number of encoded data slices is a subset of the set of encoded data slices. The shared group information is recoverable from the decode threshold number of encoded data slices. As another specific example, the second module requests, via network 24, at least a Shamir secret sharing threshold number of shares from the at least the subset of DST execution units when the encoding scheme includes the Shamir secret sharing function.

Alternatively, or in addition to, the second module requests the current version of the shared group information from the at least the subset of the DST execution units in response to a self-verification compliance function. The self-verification compliance function includes verifying that the DST execution unit 1 is compliant with assigned operations. As a specific example, the second module interprets a schedule of the self-verification compliance function to determine when to request the current version of the shared group information.

Figure 41B:
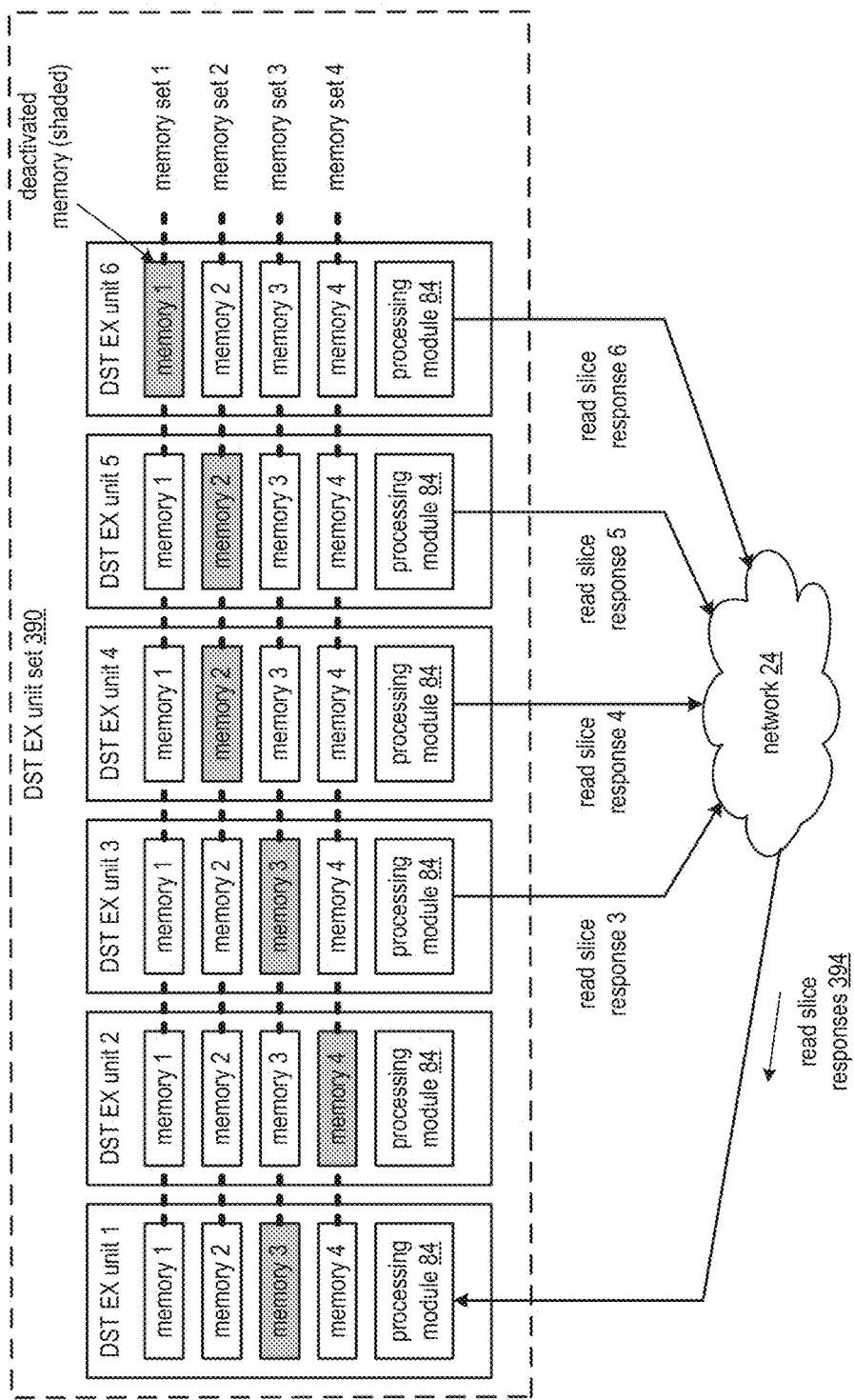

FIG. 41B illustrates further steps of the updating of the shared group information. Having requested the current version of the shared group information from the at least the subset of the DST execution units, a third module of the processing module 84 of the DST execution unit 1 recovers the current version of the shared group information. As a specific example, the third module receives, via network 24, read slice responses 394 that includes read slice responses 3-6 from DST execution units 3-6 and disperse storage error decodes the at least the decode threshold number of encoded data slices of the read slice responses 394 to produce a recovered shared group information. Having produced the recovered shared group information, the third module determines that the recovered shared group information from the at least the decode threshold number of encoded data slices is the current version of the shared group information based on corresponding revision numbers associated with the encoded data slices of the at least the decode threshold number of encoded data slices. As a specific example, the third module indicates that the recovered shared group information is the current version of the shared group information when the read slice responses 3-6 do not include error indicators and the corresponding revision numbers associated with encoded data slices are equal to or greater than a revision number of locally stored shared group information.

Upon successful recovery of the current version of the shared group information, the third module interprets the current version of the shared group information to determine whether the desired change to the shared group information is permissible per inter-device acceptable operational procedures. The inter-device acceptable operational procedures includes one or more of guidelines, rules, algorithms, preferences, and goals associated with inter-device operation. Such guidelines, rules, algorithms, goals includes one or more of which DST execution units are allowed to activate/deactivate memories for a given memory set, which DST execution units are allowed to scan for slice errors, acceptable changes to the target threshold based on power saving goals, which DST execution units are authorized to interact with which other DST execution units, and which DST execution units are affiliated.

As a specific example of interpreting the current version of the shared group information, the third module determines whether an operation corresponding to the desired change is a permitted operation per the inter-device acceptable operational procedures based on one or more of a lookup, a simulation, a power savings algorithm, a reliability algorithm, and an availability algorithm. For instance, the third module determines that the desired change is the permitted operation when the desired change includes deactivating a memory of the DST execution unit 1 and the lookup of the inter-device acceptable operational procedures indicates that the DST execution unit 1 is authorized to deactivate one or more memories in accordance with the target threshold.

As another specific example of interpreting the current version of the shared information, the third module determines whether performance of the operation corresponding to the desired change will cause a violation of one or more group operational rules of the inter-device acceptable operational procedures. The group operational rules includes one or more of a maximum power utilization level rule, a minimum power utilization level rule, a maximum number of deactivated memories rule, a maximum number of active memories rule, a minimum retrieval reliability threshold level rule, and a maximum retrieval reliability threshold level rule. For instance, the third module determines that the desired changes will not cause the violation of the one or more group operational rules when a number of remaining active memories is at least the target threshold number.

As yet another specific example of interpreting the current version of the shared information, the third module determines whether the DST execution unit 1 has an appropriate authorization level to perform the operation corresponding to the desired change per the inter-device acceptable operational procedures. The determining includes identifying an authorization level associated with the DST execution unit 1 by one or more of initiating a query, performing a lookup, accessing a system registry record, and accessing an authorization table. For instance, the third module initiates a query to a managing unit and receives an authorization response from the managing unit indicating that the DST execution unit 1 is authorized to change number of active memories of the memory set 1.

As a further specific example of interpreting the current version of the shared information, the third module interprets the current version of the shared group information to determine, for a given memory set, a permitted number of DST execution units of the affiliated group of DST execution units that is permitted to power down one or more memory devices in the given memory set (e.g., target threshold of 4 for each of the four memory sets 1-4). Having determined the permitted number of DST execution units, the third module determines a current number of DST execution units that have powered down one or more memory devices with each of the multitude of memory sets 1-4. For instance, the third module determines that DST execution unit 6 has power down memory 1, DST execution unit 5 has power down memory 2, DST execution unit 4 has power down memory 2, DST execution unit 3 has power down memory 3, DST execution unit 2 has power down memory 4, and DST execution unit 1 has power down memory 3. As such, memory sets 1 and 4 are permitted to have to power down two memories and currently only have one powered down memory; and memory sets 2 and 3 are permitted to power down two memories and currently have two powered down memories.

When at least one memory set of the multitude of memory sets has the current number less than the permitted number, at least one of a fifth module of the processing module 84 of the DST execution unit 1 and the third module sends a request to power down one or more memory devices with one of the at least one memory set. As a specific example, the fifth module facilitates powering down memories 1 and 4 of DST execution unit 1. As another specific example, the fifth module sends, via network 24, a request to DST execution unit 2 to power down memory 1 of DST execution unit 2. As yet another specific example, the fifth module sends, via network 24, a request to DST execution unit 5 to power down memory 4 of DST execution unit 5.

When the processing module 84 requests the current version of the shared group information in response to the self-verification compliance function, and upon successful recovery of the current version of the shared group information, the third module interprets the current version of the shared group information to determine whether the DST execution unit 1 is compliant with assigned operations. As a specific example, the third module compares the current version of the shared group information to locally stored last known shared group information and indicates that the DST execution unit 1 is compliant with the assigned operations when the comparison indicates that the current version of the shared group information is substantially the same as the locally stored last known shared group information (e.g., number of activated/deactivated memories matches). As another specific example, the third module compares the current version of the shared group information to locally stored last known shared group information and indicates that the DST execution unit 1 is not compliant with the assigned operations when the comparison indicates that the current version of the shared group information is not substantially the same as the locally stored last known shared group information (e.g., too many deactivated memories). When the DST execution unit 1 is not compliant with the assigned operations, the fifth module updates performance of operations to establish compliance with the assigned operations. As a specific example, the fifth module activates a deactivated memory to achieve the compliance. As another specific example, the fifth module deactivates an active memory to achieve the compliance.

Figure 41C:
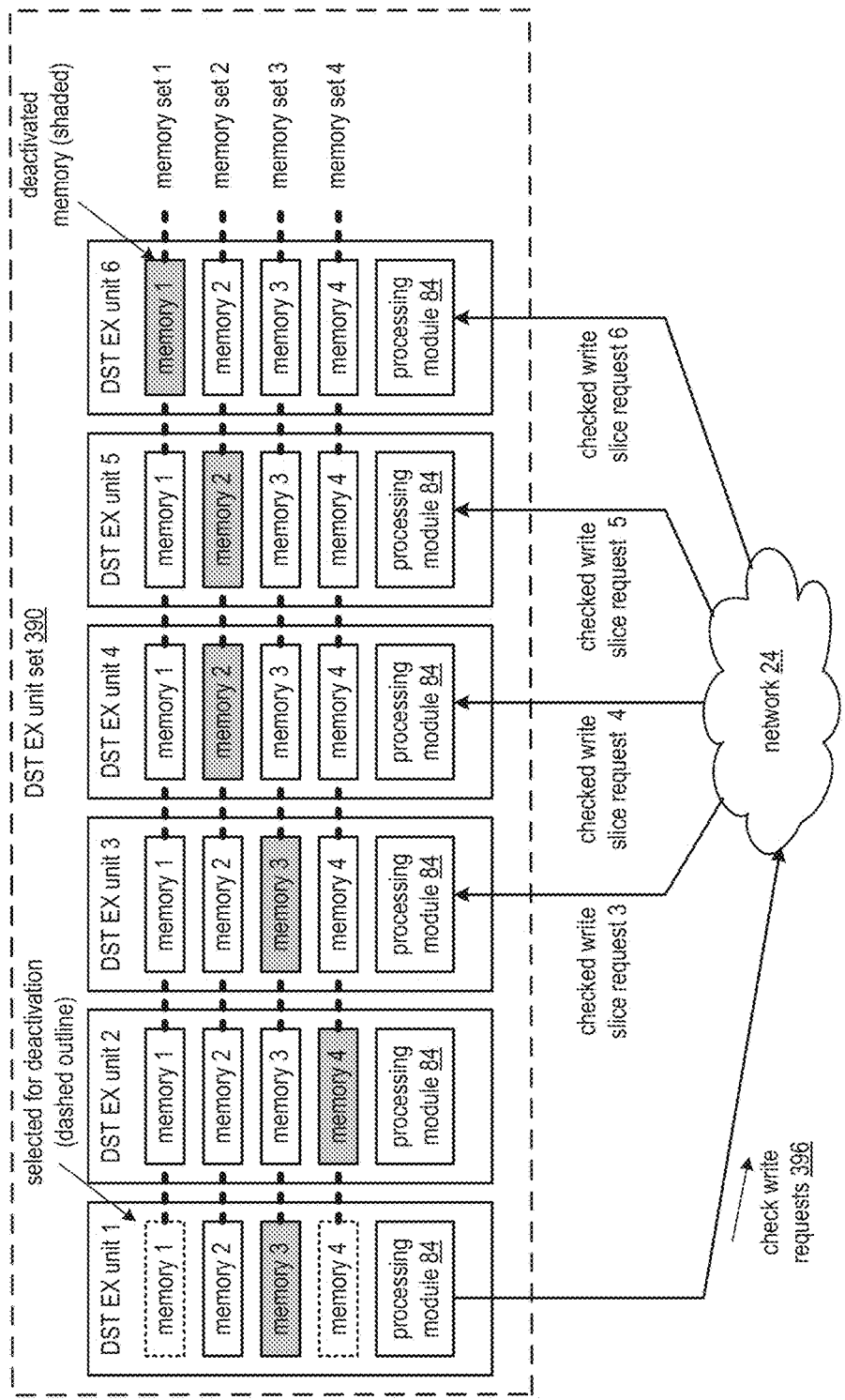

FIG. 41C illustrates further steps of the updating of the shared group information. When the desired change to the shared group information is permissible per the inter-device acceptable operational procedures, a fourth module of the processing module 84 of the DST execution unit 1 sends, via network 24, a request to update the shared group information to include the desired change to the at least the subset of DST execution units (e.g., computing devices). As a specific example, the fourth module sends, via network 24, the desired change (e.g., deactivating selected memories 1 and 4 of DST execution unit 1) to the shared group information to the subset of DST execution units. As another specific example, the fourth module sends, via network 24, updated shared group information to the subset of DST execution units.

When sending the updated shared group information, the fourth module disperse storage error encodes the updated shared group information to produce a set of updated encoded data slices, generates a set of checked write requests 396, and sends, via network 24, the set of checked write requests 396 to the subset of DST execution units. Each checked write request of the set of checked write request 396 includes a checked write slice request. For instance, the fourth module sends, via network 24, checked write slice requests 3-6 to DST execution units 3-6. Each checked write slice request includes one or more of a corresponding encoded data slice of the set of encoded data slices, a last known revision number (e.g., a current revision number of the current version of the shared group information), and an updated revision number (e.g., the current version number plus 1). Each DST execution unit of the subset of DST execution units indicates successful updating of a corresponding encoded data slice when the last known revision number compares favorably (e.g., substantially the same) with a locally stored current revision number for a corresponding encoded data slice.

Figure 41D:
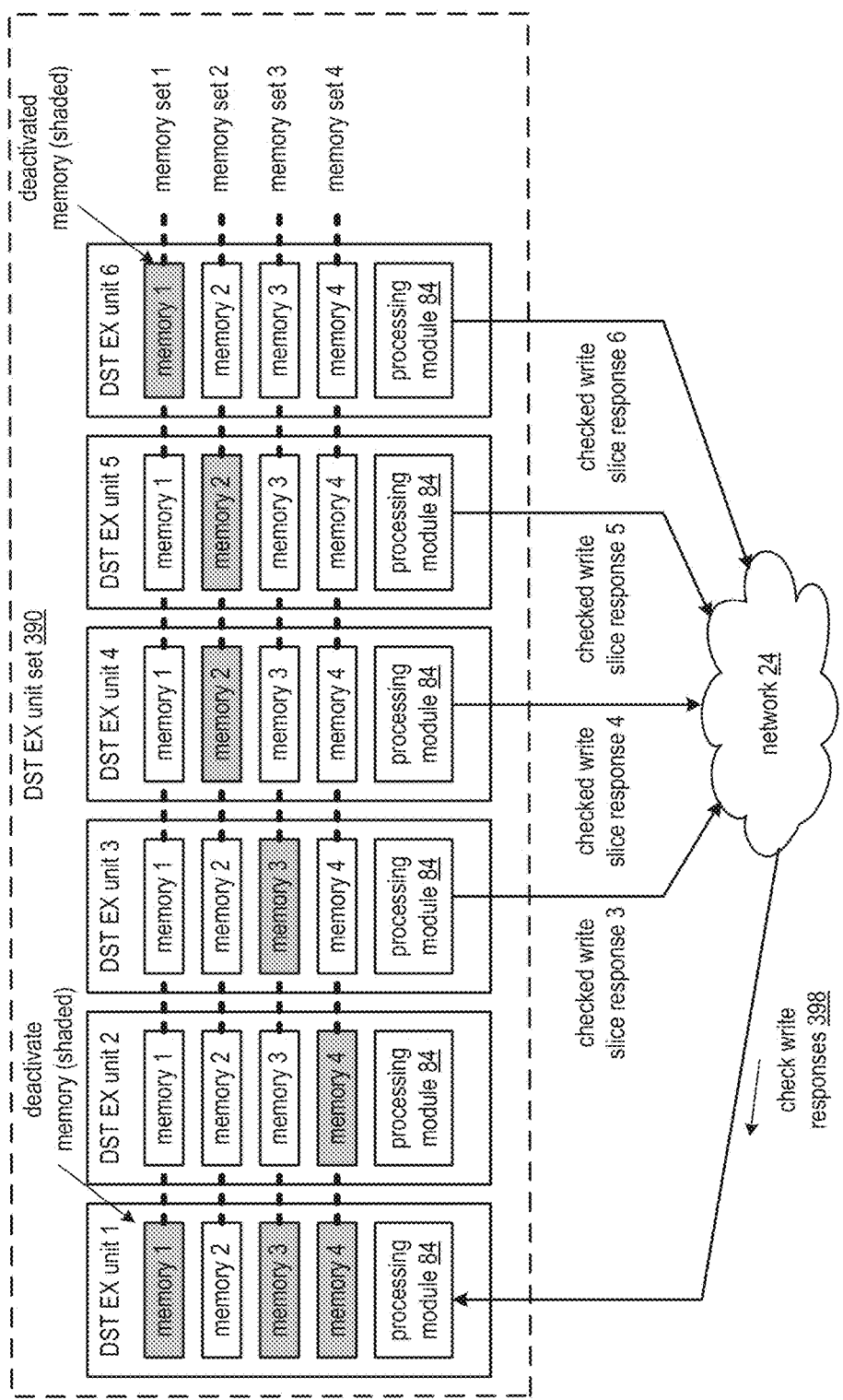

FIG. 41D illustrates remaining steps of the updating of the shared group information. Each DST execution unit of the subset of DST execution units issues a checked write slice response to the processing module 84 of the DST execution unit 1, where the checked write slice response indicates whether the corresponding encoded data slice was successfully updated (e.g., no checked write error, checked write error, no write conflict error, write conflict error). For instance, DST execution unit 3 issues a checked write slice response 3 to indicate that no checked write error occurred at no write conflict error occurred when the last known revision number compares favorably to the locally stored current revision number.

A fifth module of the processing module 84 of the DST execution unit 1 receives, via network 24, checked write responses 398 that includes checked write slice responses 3-6 from the subset of DST execution units 3-6. Having received the checked write responses 398, the fifth module indicates that the shared group information has been successfully updated to include the desired change when at least a threshold number of the checked write slice responses of the checked write responses 398 indicates successful updating of a corresponding threshold number corresponding encoded data slices. The threshold number may include at least one of the decode threshold number, the read threshold number, the write threshold number, and the target threshold number. For instance, the fifth module indicates that the shared group information has been successfully updated when the target threshold number (e.g., 4) of checked write responses indicate successful updating of corresponding encoded data slices.

Upon receipt of successfully updating the shared group information from the at least the subset of DST execution units, the fifth module performs the operation corresponding to the desired change. As a specific example, when at least one memory set of the multitude of memory sets has the current number less than the permitted number, the fifth module sends the request to power down the one or more memory devices with the one of the at least one memory set. For instance, the fifth module deactivates memories 1 and 4 of DST execution unit 1.

Figure 41E:
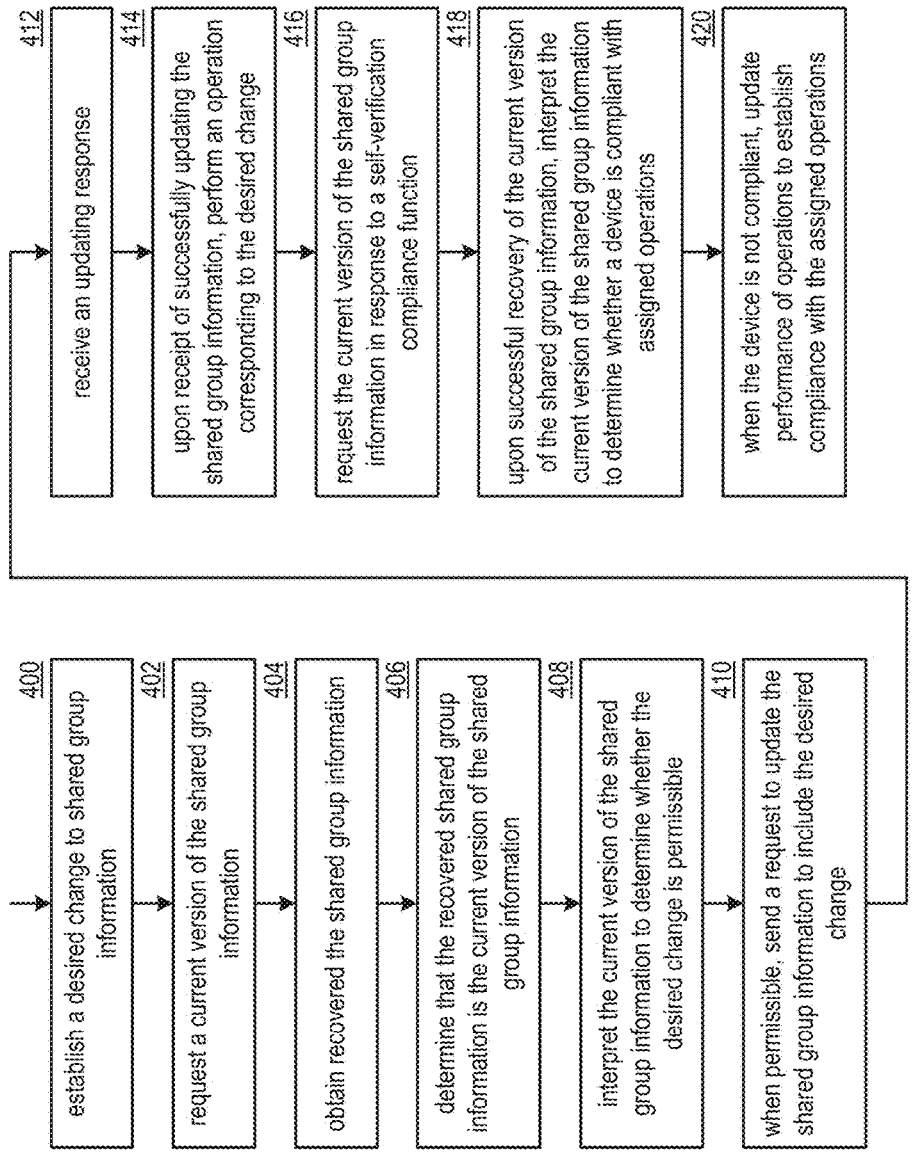
FIG. 41E is a flowchart illustrating an example of updating shared group information in accordance with the present invention.

FIG. 41E is a flowchart illustrating an example of updating shared group information. The method begins at step 400 where a processing module of a device (e.g., a computing device, a distributed storage and task (DST) execution unit) of an affiliated group of devices within a dispersed storage network (DSN) establishes a desired change to shared group information. The shared group information includes data regarding inter-device operation for at least some of the devices of the affiliated group of devices. As a specific example, the device establishes a desire to power-down one or more memory devices, where each of the devices in the affiliated group of devices includes a collection of memory devices such that, collectively, the affiliated group of devices includes a plurality of collections of memory devices. The plurality of collections of memory devices are virtually arranged into a multitude of memory sets that span the affiliated group of devices. The shared group information further includes data regarding powering down memory devices within a memory set of the multitude of memory sets.

The method continues at step 402 where the processing module requests a current version of the shared group information from at least a subset of the devices. Each device in the at least the subset of devices stores an encoded portion (e.g., encrypted, dispersed storage error encoded, secret sharing encoded, etc.) of the shared group information. The current version of the shared group information is recoverable from the encoded portions stored by the at least the subset of devices. As a specific example of requesting the current version of the shared group information, the processing module requests at least a decode threshold number of encoded data slices from the at least the subset of devices. The shared group information is dispersed storage error encoded to produce a set of encoded data slices. The decoded threshold number of encoded data slices is a subset of the set of encoded data slices. The shared group information is recoverable from the decode threshold number of encoded data slices.

The method continues at step 404 where the processing module obtains recovered shared group information. As a specific example, the processing module receives the at least the decode threshold number of encoded data slices from the at least the subset of devices and disperse storage error decodes the at least the decode threshold number of encoded data slices to produce the recovered shared group information. As another specific example, the processing module retrieves a locally stored copy of the current version of the shared group information to produce the recovered shared group information.

The method continues at step 406 where the processing module determines that the recovered shared group information is the current revision of the shared group information. As a specific example, the processing module determines that the recovered shared group information from the at least the decode threshold number of encoded data slices is the current version of the shared group information based on corresponding revision numbers associated with the encoded data slices of the at least the decode threshold number of encoded data slices. For instance, the processing module indicates that the recovered shared group information as the current revision of the shared group information when the processing module determines that a revision number associated with the decode threshold number of encoded data slices matches a revision number of the locally stored copy of the current version of the shared group information.

Upon successful recovery of the current version of the shared group information, the method continues at step 408 where the processing module interprets the current version of the shared group information to determine whether the desired change to the shared group information is permissible per inter-device acceptable operational procedures. As a specific example of interpreting the current version of the shared group information, the processing module determines whether the operation corresponding to the desired change is a permitted operation per the inter-device acceptable operational procedures (e.g., lookup, simulation, power savings algorithm, reliability algorithm, availability algorithm). As another specific example of interpreting the current version of the shared group information, the processing module determines whether performance of the operation corresponding to the desired change will cause a violation of one or more group operational rules of the inter-device acceptable operational procedures (e.g., too much power consumption, too few memories online, too many memories online, too little retrieval reliability, too much retrieval reliability). As yet another specific example of interpreting the current version of the shared group information, the processing module determines whether the device has an appropriate authorization level to perform the operation corresponding to the desired change per the inter-device acceptable operational procedures (e.g., lookup, query whether authorized to change number of active memories).

As a still further specific example of interpreting the current version of the shared group information, the processing module determines, for a given memory set, a permitted number of devices of the affiliated group of devices that is permitted to power down one or more memory devices in the given memory set and a current number of devices that have powered down one or more memory devices with each of the multitude of memory sets. When at least one memory set of the multitude of memory sets has the current number less than the permitted number, the processing module may send a request to power down one or more memory devices with one of the at least one memory set. Alternatively, the processing module may wait to obtain receipt of successfully updating the shared group information (e.g., confirming storage in the subset of devices) prior to sending a request to power down the one or more memory devices.

When the desired change to the shared group information is permissible per the inter-device acceptable operational procedures, the method continues at step 410 where the processing module sends, via network 24, to the at least the subset of devices, a request to update the shared group information to include the desired change (e.g., sends just the desired change, sends and updated shared group information). As a specific example, the processing module generates a set of checked write requests and sends, via network 24, the set of checked write requests to the at least the subset of devices. For instance, the processing module encodes the updated shared group information to produce a set of updated encoded data slices, generates the set of checked write requests to include the set of updated encoded data slices and a last known revision number of the shared group information, and sends, via network 24, the set of checked write requests to the at least the subset of devices.

The method continues at step 412 where the processing module receives an updating response. As a specific example, the processing module receives checked write responses from the at least the subset of devices and indicates that the shared group information has been successfully updated when at least a threshold number of the checked write responses indicate no errors. Upon receipt of successfully updating the shared group information from the at least the subset of devices, the method continues at step 414 where the processing module performs an operation corresponding to the desired change. As a specific example, the processing module power downs the one or more memory devices.

Alternatively, or in addition to, the processing module performs a self-verification compliance function to align compliance of performance of operations with assigned operations. The processing module may perform the self-verification compliance function in accordance to at least one of a request, and detecting that a timeframe has elapsed since a previous performance of the self-verification compliance function, and detecting an error. The method continues at step 416 where the processing module requests the current version of the shared group information from the at least the subset of the devices in response to the self-verification compliance function. Upon successful recovery of the current version of the shared group information, the method continues at step 418 where the processing module interprets the current version of the shared group information to determine whether the device is compliant with assigned operations (e.g., a number of deactivated memories is less than or equal to a maximum number of allowed deactivated memories of the device associated with the processing module). When the device is not compliant with the assigned operations, the method continues at step 420 where the processing module updates performance of operations to establish compliance with the assigned operations. As a specific example, the processing module activates a deactivated memory when too many memories are deactivated. As another specific example, the processing module deactivates an active memory when too many memories are activated.

Figure 42A:
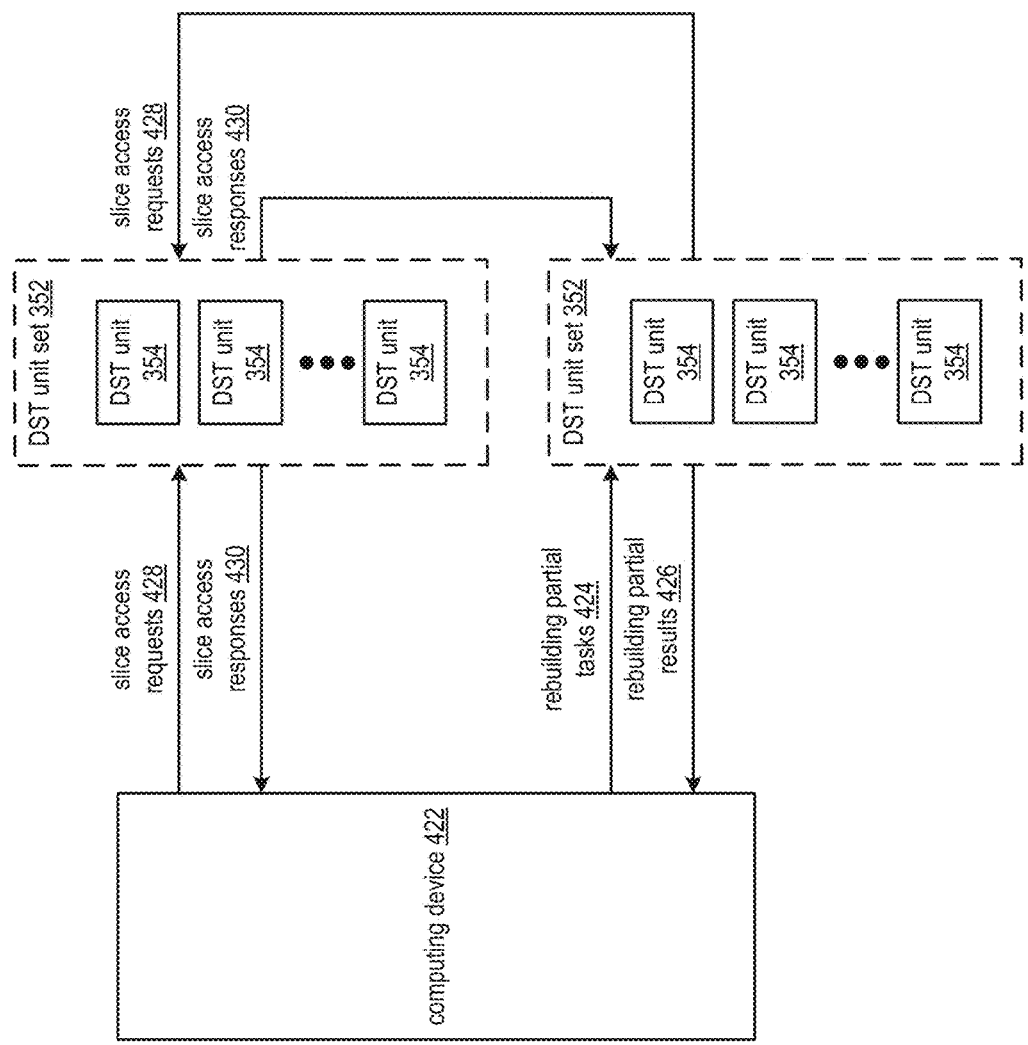
FIG. 42A is a schematic block diagram of another embodiment of a distributed computing system in accordance with the present invention.

FIG. 42A is a schematic block diagram of another embodiment of a distributed computing system that includes a computing device 422 and at least two distributed storage and task (DST) unit sets 352. Each DST unit set 352 includes a set of DST units 354. Each DST unit 354 may be implemented by one or more of the DST execution unit 36 of FIG. 1, a dispersed storage (DS) unit, a storage server, a distributed computing server, a memory module, a memory device, a user device, a DST processing unit, and a DS processing unit. The computing device 422 may be implemented utilizing one or more of the DST processing unit 16 of FIG. 1, the DST execution unit, a DS unit, a storage server, a distributed computing server, a user device, a DS processing unit, and a DST unit 354 of the DST unit set 352. The system functions to utilize a distributed computing approach to rebuild one or more encoded data slices to be rebuilt, where data is stored in a first DST unit set 352 as a plurality of sets of encoded data slices. The encoded data slice to be rebuilt includes one or more of a missing slice, a corrupted slice (e.g., based on storage corruption), and a tampered slice (e.g., from a malicious act). The computing device 422 may identify the one or more slices to be rebuilt based on issuing slice access requests 428 to the first DST unit set 352 and analyzing slice access responses 430 from the first DS unit set 352 to determine whether one or more slices are to be rebuilt. The slice access requests 428 includes one or more of a list request, a list digest request, and a read request.

The computing device 422 initiates a rebuilding process to rebuild the one or more encoded data slices to be rebuilt, where the rebuilding process includes one or more tasks (e.g., identify good slices of a set of slices that also includes a slice to be rebuilt, retrieving the good slices, processing the retrieved good slices to reproduce a new slice for the slice to be rebuilt, storing the new slice to replace the slice to be rebuilt). The computing device 422 may initiate a rebuilding process by assigning the one or more tasks of the rebuilding process to one or more task execution resources (e.g., a processing module, a DST unit 354, the computing device, etc.) in accordance with a task execution schedule. From time to time, ability of a task execution resource to execute an assigned task may vary such that the overall rebuilding process may not adhere to the task execution schedule.

The computing device 422 identifies one or more tasks of the rebuilding process to receive additional resources when the rebuilding process is active and does not adhere to the task execution schedule. The computing device 422 divides each of the one or more tasks into one or more rebuilding partial tasks 422 and assigns each of the one or more rebuilding partial tasks 422 to one or more DST units 354 of a second DST unit set 352 of the two or more DST unit sets. The computing device 422 issues the rebuilding partial tasks 424 to the assigned one or more DST units 354 of the second DST unit set 352. The rebuilding partial tasks 424 includes one or more of a slice name range to scan, a slice name of a slice to be rebuilt, identities of DST units of the DST unit set that includes the slice to be rebuilt, dispersed storage error coding parameters, and an encoding matrix utilized to encode the data to produce the plurality of sets of encoded data slices. The assigned one or more DST units 354 of the second DST unit set 352 facilitate execution of the rebuilding partial tasks for 24. The facilitating may include issuing slice access requests 428 to the first DST unit set 352 and receiving slice access responses 430 from the first DST unit set 352.

The computing device 422 receives rebuilding partial results 426 from the assigned one or more DST units 354 of the second DST unit set 352. The rebuilding partial results 426 includes one or more of a slice name of the slice to be rebuilt, a no error found indicator, a rebuilt slice, a partially rebuilt slice, and an indicator that the rebuilt slice has been stored to retire the error. The computing device 422 facilitates completion of the one or more tasks of the rebuilding process utilizing the received rebuilding partial results 426. For example, the computing device 422 initiates more rebuilding tasks based on scanning results. As another example, the computing device 422 stores a rebuilt slice.

Figure 42B:
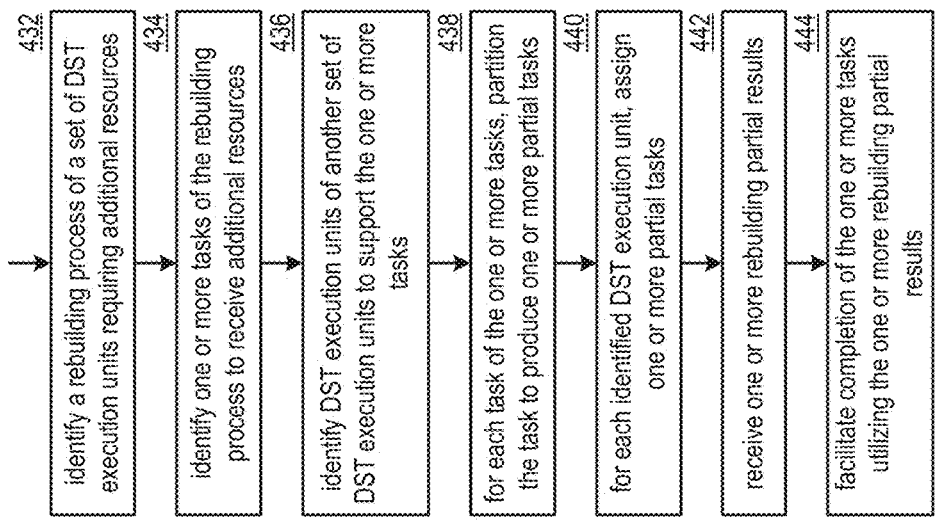
FIG. 42B is a flowchart illustrating an example of rebuilding data in accordance with the present invention.

FIG. 42B is a flowchart illustrating an example of rebuilding data. The method begins at step 432 where a processing module (e.g., of a computing device) identifies a rebuilding process of a set of DST execution units requiring additional resources. The identifying includes at least one of determining that a pace of rebuilding compares unfavorably to a target pace and determining that a number of slices to be rebuilt is greater than a rebuilding threshold number. The method continues at step 434 of the processing module identifies one or more tasks of the rebuilding process to receive additional resources. The identifying includes one or more of identifying unexecuted tasks from a task list associated with the rebuilding process, receiving a request, receiving an error message, and identifying a task that is most unlikely to be executed within a desired time frame. The method continues at step 436 where the processing module identifies DST execution units of another set of DST execution units to support the one or more tasks. The identifying may be based on one or more of DST execution unit availability, a query, an error message, obtaining a list, and a level of DST execution unit errors.

For each task of the one or more task, the method continues at step 438 where the processing module partitions the task to produce one or more partial tasks. The partitioning may be in accordance with a task partitioning approach including matching a number of partial tasks to a number of the identified DST execution units. For each identified DST execution unit, the method continues at step 440 where the processing module assigns one or more partial tasks. The assigning includes one or more of mapping a number of partial task to each DST execution unit based on dividing a total number of partial tasks by a number of DST execution units, matching partial tasks to DST execution units based on DST execution unit capability information, and receiving an assignment plan.

The method continues at step 442 where the processing module receives one or more rebuilding partial results. For example, the processing module receives the one or more rebuilding partial results from the identified DST execution units. The method continues at step 444 where the processing module facilitates completion of the one or more tasks utilizing the one or more rebuilding partial results. For example, the processing module initiates a new rebuilding process and receives a slice error detection message. As another example, the processing module stores a rebuilt slice in a corresponding DST execution unit of the set of DST execution units. As yet another example, the processing module instructs a DST execution unit to store a rebuilt slice in a corresponding DST execution unit of the set of DST execution units.

Figure 43A:
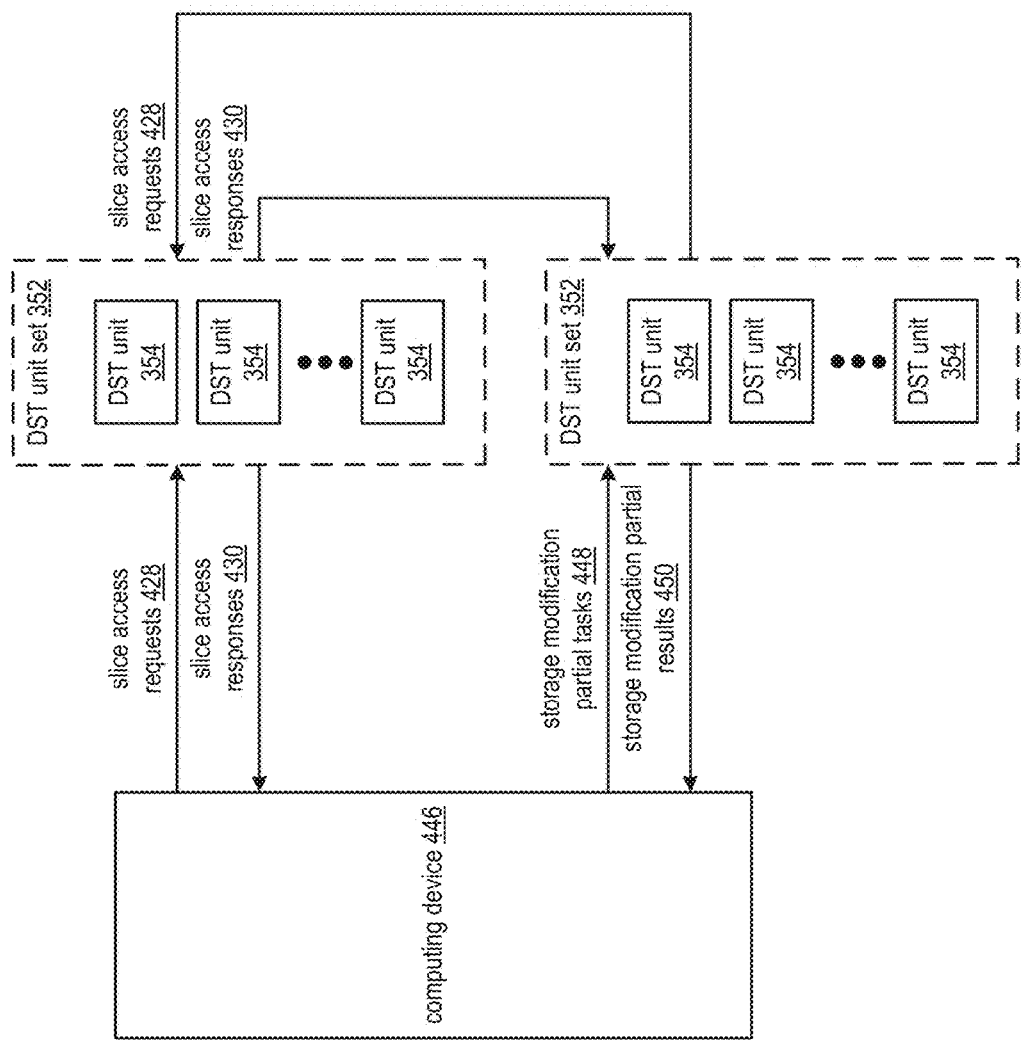
FIG. 43A is a schematic block diagram of another embodiment of a distributed computing system in accordance with the present invention.

FIG. 43A is a schematic block diagram of another embodiment of a distributed computing system that includes a computing device 446 and the at least two distributed storage and task (DST) unit sets 352 of FIG. 42A. The computing device may be implemented utilizing one or more of the DST processing unit 16 of FIG. 1, the DST execution unit 36 of FIG. 1, a DS unit, a storage server, a distributed computing server, a user device, a DS processing unit, and a DST unit 354 of the DST unit set 352.

The system functions to modify storage of data in a first DST unit set 352 of the at least two DST unit sets 352 by utilizing a distributed computing storage modification process. The computing device 446 issues slice access requests 428 to the first DST unit set 352 and receives slice access responses 430. The computing device 446 identifies a data object stored as a plurality of sets of encoded data slices for the storage modification process based on the received slice access responses 430. For example, the computing device determines a measured reliability level based on the received slice access responses 430 and initiates the storage modification process to improve reliability when the measured reliability level compares unfavorably to a reliability level goal.

The computing device 446 determines one or more tasks of the storage modification process (e.g., retrieve slices, decode slices, re-encode slices, store slices). The determining may be based on one or more of a lookup, receiving a task list, generating the task list based on the received slice access responses. The computing device 446 partitions each of the one or more tasks to produce one or more storage modification partial tasks 448. The computing device 446 assigns each of the one or more storage modification partial tasks 448 to one or more DST units 354 of another DST unit set 352 of the two or more DST unit sets 352. Alternatively, the first DST unit set 352 includes at least one of the assigned one or more DST units 354. The computing device 446 outputs the storage modification partial tasks 448 to the assigned one or more DST units 354.

The assigned one or more DST units 354 execute the storage modification partial tasks 448 to produce storage modification partial results 450. The storage modification partial results 450 include one or more of a slice name of a slice to be generated, the retrieved slice, a newly generated slice, an error indicator, a set of modified slices, a set of newly generated slices, a data segment, and an indicator that the modified slices have been stored to retire the storage modification process. The assigned one or more DST units 354 may issue slice access requests 428 to the first DST unit set 352 and receive slice access responses 430 from the first DST unit set 352. The computing device 446 facilitates completion of the one or more tasks of the storage modification process utilizing the storage modification partial results 450. For example, the computing device 446 stores newly generated slices. As another example, the computing device 446 updates a storage location list.

Figure 43B:
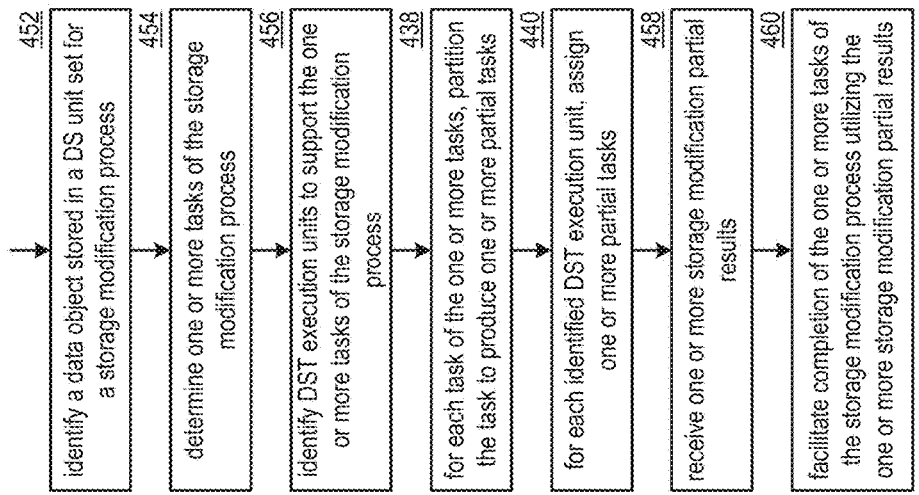
FIG. 43B is a flowchart illustrating an example of modifying storage of data in accordance with the present invention.

FIG. 43B is a flowchart illustrating an example of modifying storage of data, which include similar steps to FIG. 42B. The method begins at step 452 where a processing module (e.g., of a computing device) identifies a data object stored in a dispersed storage (DS) unit set for a storage modification process. The identifying may be based on one or more of a measured reliability level, a goal reliability level, an actual storage efficiency level, and a goal storage efficiency level. The storage modification process may be invoked when more or less reliability is desired and/or more or less storage efficiency is desired. The method continues at step 454 where the processing module determines one or more tasks of the storage modification process. The determining includes identifying a new set of storage parameters and identifying the tasks to utilize the new set of storage parameters. For example, the processing module identifies the new set of storage parameters where a new pillar width is less than a previous pillar width when more storage efficiency is desired.

The method continues at step 456 where the processing module identifies distributed storage and task (DST) execution units to support the one or more tasks of the storage modification process. The identifying may be based on one or more of DST execution unit availability, an error message, and a DST execution unit encoding capability level. The method continues with steps 438 and 440 of FIG. 42B where, for each task of the one or more tasks, the processing module partitions the task to produce one or more partial tasks and for each identified DST execution unit, the processing module assigns one or more partial tasks.

The method continues at step 458 where the processing module receives one or more storage modification partial results. The method continues at step 460 where the processing module facilitates completion of the one or more tasks of the storage modification process utilizing the one or more storage modification partial results. For example, the processing module stores new slices. As another example, the processing module updates a storage location table. As yet another example, the processing module issues a command to a DST execution unit to store a newly generated slice.

Figure 44A:
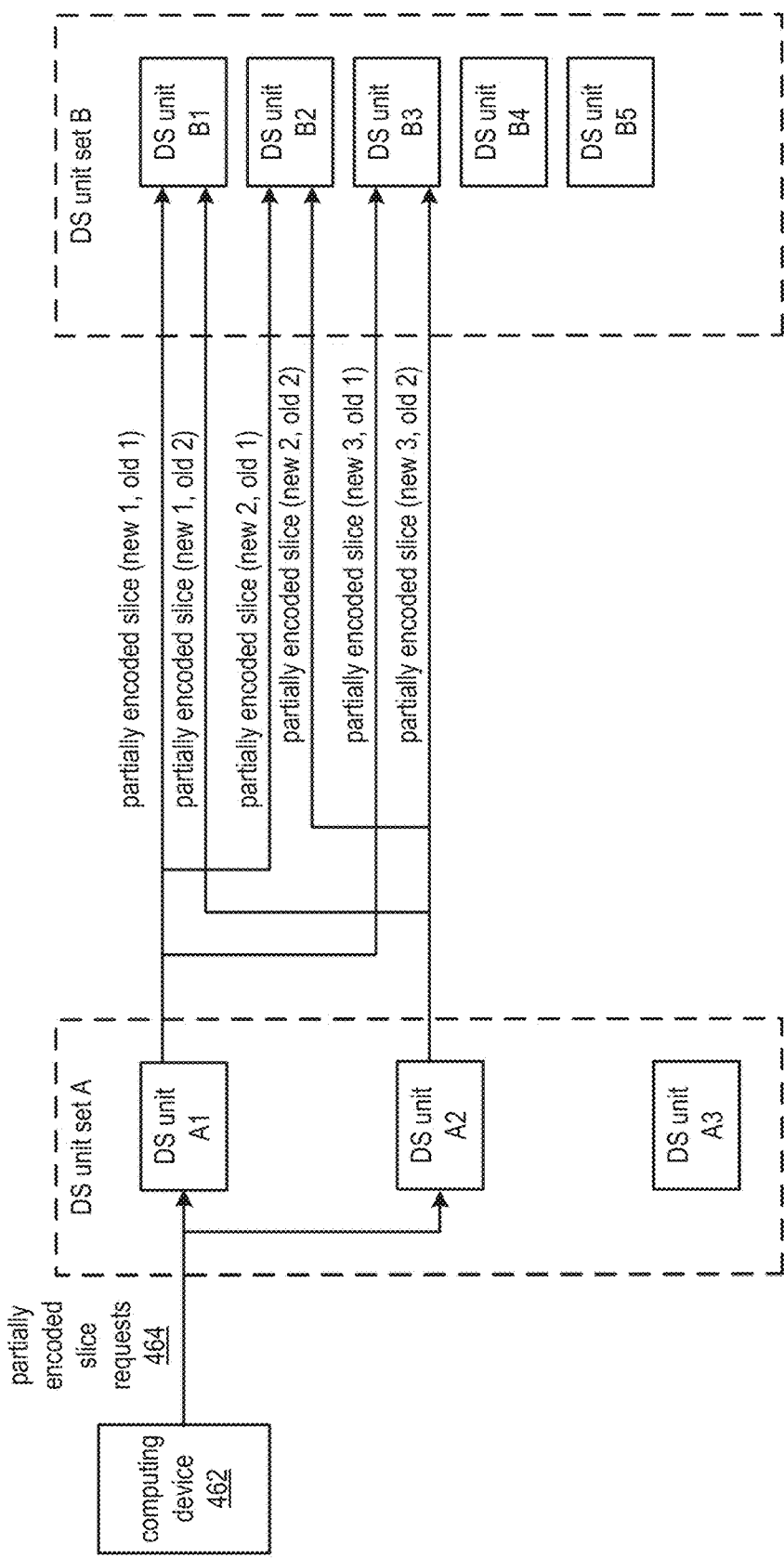
FIG. 44A is a schematic block diagram of another embodiment of a distributed computing system in accordance with the present invention.

FIG. 44A is a schematic block diagram of another embodiment of a distributed computing system that includes a computing device 462 and at least two dispersed storage (DS) unit sets A and B. Each DS unit set includes a set of DS units. Each DS unit may be implemented by one or more of the distributed storage and task (DST) execution unit 36 of FIG. 1, a storage server, a distributed computing server, a memory module, a memory device, a user device, the DST processing unit 16 of FIG. 1, and a DS processing unit. The computing device 462 may be implemented utilizing one or more of the DST processing unit 16, the DST execution unit 36, a DS unit, a storage server, a distributed computing server, a user device, a DS processing unit, and a DS unit of the at least two DS unit sets.

Each DS unit set includes a number of DS units in accordance with a pillar width number of a corresponding dispersed storage error coding function parameters. For example, DS unit set A includes three DS units DS units A1, A2, and A3 when a corresponding pillar width of DS unit set A is three. As another example, DS unit set B includes five DS units DS units B1-B5 when a corresponding pillar width of DS unit set B is five. Alternatively, DS unit sets A and B may share a common set of DS units.

The system functions to change first dispersed storage error coding function parameters for data stored as a plurality of sets of encoded data slices in DS unit set A transforming the plurality of encoded data slices stored in DS unit set A to a plurality of encoded data slices stored in DS unit set B in accordance with second dispersed storage error coding function parameters. For example, slices stored in DS unit set A with the pillar width of three is transformed into slices stored in DS unit set B with the pillar width of five.

The computing device 462 determines to re-store data stored in DS unit set A with different dispersed storage error coding function parameters based on one or more of a reliability level, a performance level, a storage efficiency level, and storage cost. The computing device 462 issues partially encoded slice requests 464 to at least a decode threshold number of DS units of DS unit set A when determining to restore the data. The partially encoded slice requests 464 includes one or more of a first decoding matrix, a second encoding matrix, a slice name, a slice name range, the first dispersed storage error coding function parameters, the second dispersed storage error coding function parameters, and identity of one or more DS units of DS unit set B.

Each DS unit receiving a corresponding partially encoded slice request 464 generates a second decode threshold number of partially encoded slices based on the first dispersed storage error coding function parameters and the second dispersed storage error coding function parameters. The partially encoded slice includes a result of a partial encoded data slice generation function including obtaining an encoding matrix of the first DS parameters, reducing the encoding matrix to produce a square matrix that exclusively includes rows associated with a first decode threshold number of DS units of the first set of DS units, inverting the square matrix to produce an inverted matrix, matrix multiplying the inverted matrix by an encoded data slice associated with the DS unit to produce a vector, and matrix multiplying the vector by one or more rows of an encoding matrix associated with the second DS parameters to produce the partially encoded data slice (s).

The DS unit outputs the second decode threshold number of partially encoded slices to a second decode threshold number of DS units of the DS unit set B. For example, DS unit A1 outputs the partial encoded slices for new slices 1-3 (e.g., to be stored at DS units B1-B3) to DS units B1-B3 based on a previous slice 1 stored at DS unit A1.

Each DS unit of the second decode threshold number of DS units of DS unit set B combines received partially encoded slices to produce a corresponding new encoded data slice for storage therein. For example, DS unit B performs an exclusive OR function to combine partially encoded slice (new 2, old 1 ) and partially encoded slice (new 2, old 2 ) to produce new slice 2 for storage therein. In addition, the system may generate slices for more than the second decode threshold number of DS units of DS unit set B. For example, a similar partial encoding approach may be utilized to generate a new slice 4 based on generating and combining partially encoded slices for new slice 4 based on new slices 1-3.

Figure 44B:
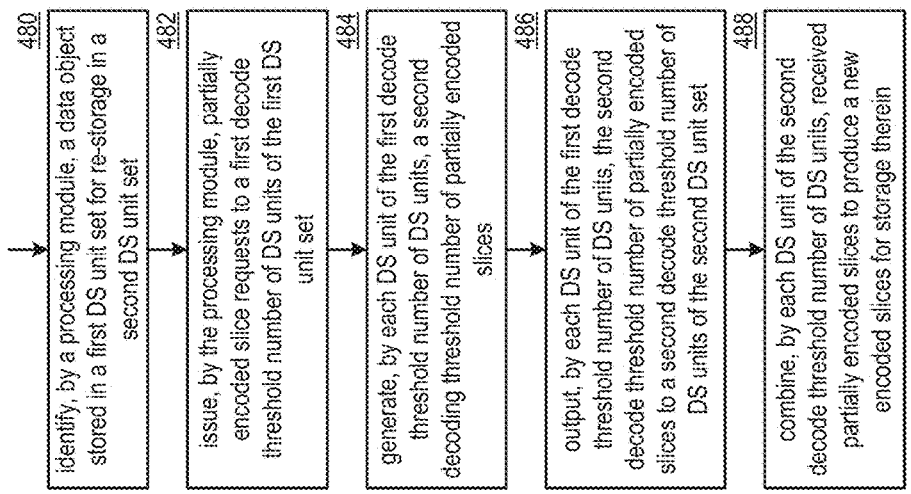
FIG. 44B is a flowchart illustrating an example of changing data storage parameters in accordance with the present invention.

FIG. 44B is a flowchart illustrating an example of changing data storage parameters. The method begins at step 480 where a processing module (e.g., of a computing device) identifies a data object stored in a first dispersed storage (DS) unit set for re-storage in a second DS unit set. The method continues at step 482 where the processing module issues partially encoded slice requests to a first decode threshold number of DS units of the first DS unit set. The method continues at step 484 where each DS unit of the first decode threshold number of DS units generates a second decoding threshold number of partially encoded slices. Alternatively, or in addition to, the DS unit may generate more than the second decode threshold number of partially encoded slices. The method continues at step 486 where each DS unit of the first decode threshold number of DS units outputs the second decode threshold number of partially encoded slices to a second decode threshold number of DS units of the second DS unit set. Alternatively, or in addition to, the DS unit may output more than the second decode threshold number of partially encoded slices to remaining DS units of the second DS unit set. The method continues at step 488 where each DS unit of the second decode threshold number of DS units combines (e.g., exclusive OR) received partially encoded slices to produce a new encoded slice for storage therein.

Figure 45A:
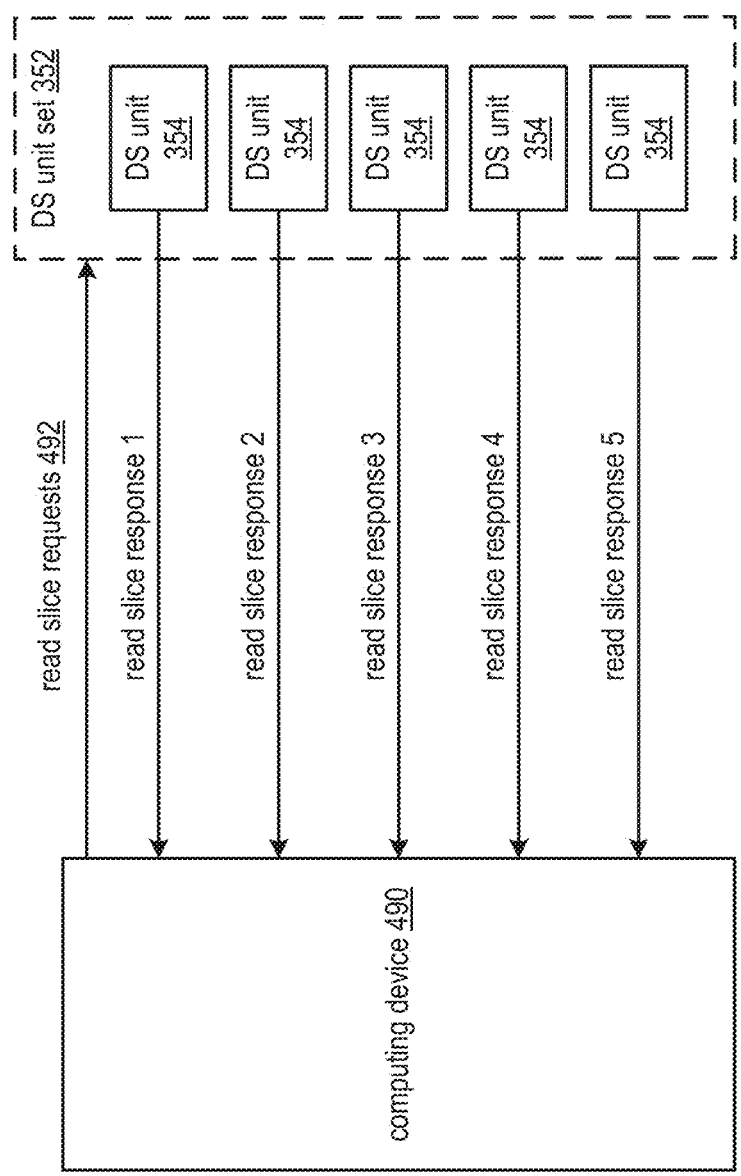
FIG. 45A is a schematic block diagram of another embodiment of a distributed computing system in accordance with the present invention.

FIG. 45A is a schematic block diagram of another embodiment of a distributed computing system that includes a computing device 490 and the dispersed storage (DS) unit set 352 of FIG. 42A. The DS unit set 352 includes the set of DS units 354 of FIG. 42A. The computing device 490 may be implemented utilizing one or more of the distributed storage and task (DST) processing unit 16 of FIG. 1, the DST execution unit 36 of FIG. 1, a DS unit, a storage server, a distributed computing server, a user device, a DS processing unit, and a DST unit 354 of the DST unit set 352.

The system functions to efficiently rebuild data by obtaining at least a decode threshold number of encoded data slices from the DS unit set 352 when undesirable time delays occur associated with the obtaining of the at least the decode threshold number of encoded data slices. The computing device 490 issues at least a decode threshold number of read slice requests 492 to the DS unit set 352 and receives read slice responses 1-5 from one or more of the DS units 354 of the DS unit set 352 at varying time frames relative to the issuing of the read slice requests 492. The computing device 490 temporarily stores received slices from the read slice responses 1-5.

The computing device 490 determines whether a decode threshold number of received slices are available within a receiving time frame from the issuing of the read slice requests 492. The receiving time frame may be an average target time window where it is expected to receive the at least the decode threshold number of slices. When the decode threshold number of received slices are available, the computing device 490 decodes the decode threshold number of received slices to reproduce the slice to be rebuilt. When the decode threshold number of received slices are not available, for each received slice, the computing device 490 generates a partially encoded slice for the slice to be rebuilt based on the received slice and then deletes each received slice (e.g., to save memory). Next, the computing device 490 combines two or more partially encoded slices to produce a partially encoded slice to be rebuilt. For example, the computing device 490 performs an exclusive OR function on the partial encoded slices to produce the partially encoded slice to be rebuilt. The computing device 490 temporarily stores the partially encoded slice to be rebuilt and deletes the partially encoded slices (e.g., to save memory). As more slices are received, through the final received slice of the decode threshold number of receives slices, the computing device 490 generates another partially encoded slice, combines the partially encoded slice with the partially encoded slice to be rebuilt to generate an updated partially encoded slice to be rebuilt.

Figure 45B:
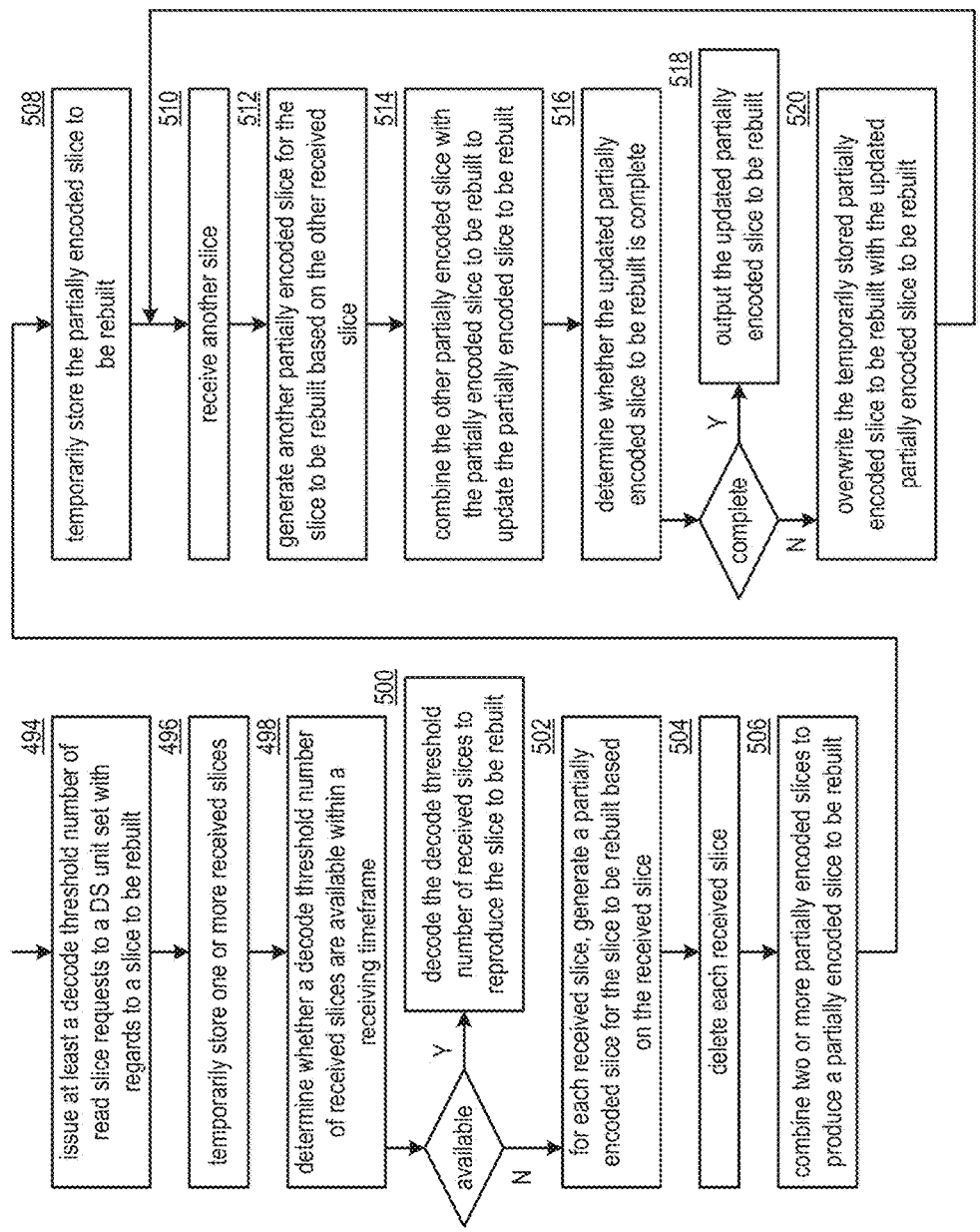
FIG. 45B is a flowchart illustrating another example of rebuilding data in accordance with the present invention.

FIG. 45B is a flowchart illustrating another example of rebuilding data. The method begins at step 494 where a processing module (e.g., of a computing device) issues at least a decode threshold number of read slice requests to a dispersed storage (DS) unit set with regards to a slice to be rebuilt. The issuing includes generating slice names based on a slice name of the slice to be rebuilt, generating read slice requests that includes the slice names, and outputting the read slice requests to the DS unit set. The method continues at step 496 where the processing module temporarily stores one or more received slices.

The method continues at step 498 where the processing module determines whether a decode threshold number of receives slices are available within a receiving time frame. The method branches to step 502 when the decode threshold number of receives slices are not available. The method continues to step 500 when the decode threshold number of received slices are available. The method continues at step 500 where the processing module decodes the decode threshold number of receives slices to reproduce the slice to be rebuilt when the decode threshold number of received slices are available.

The method continues at step 502 where, for each received slice, the processing module generates a partially encoded slice for the slice to be rebuilt based on the received slice. The generating of the partially encoded slice includes a result of a partial encoded data slice generation function including obtaining an encoding matrix used to generate the slice to be rebuilt, reducing the encoding matrix to produce a square matrix that exclusively includes rows associated with a selected decode threshold number of DS units of the set of DS units, inverting the square matrix to produce an inverted matrix, matrix multiplying the inverted matrix by the received slice associated to produce a vector, and matrix multiplying the vector by a row associated with the slice to be rebuilt of the encoding matrix to produce the partially encoded slice.

The method continues at step 504 where the processing module deletes each received slice (e.g., to free up temporary memory). The method continues at step 506 where the processing module combines (e.g., exclusive OR (XOR)) two or more partial encoded slices to produce a partial encoded slice to be rebuilt. The method continues at step 508 where the processing module temporarily stores the partially encoded slice to be rebuilt. The storing may further include deletion of the two or more partially encoded slices.

The method continues at step 510 where the processing module receives another slice. The method continues at step 512 where the processing module generates another partially encoded slice for the slice to be rebuilt based on the other received slice. The method continues at step 514 where the processing module combines (e.g., XOR) the other partially encoded slice with the partially encoded slice to be rebuilt to update the partially encoded slice to be rebuilt. The method continues at step 516 where the processing module determines whether the updated partially encoded slice to be rebuilt is complete (e.g., complete when a decode threshold number of slices have been received and processed to contribute to the partially encoded slice to be rebuilt). The method branches to step 520 when the updated partially encoded slice to be rebuilt is not complete. The method continues to step 518 when the updated partially encoded slice to be rebuilt is complete. The method continues at step 518 where the processing module outputs the updated partially encoded slice to be rebuilt to a requesting entity as the sliced be rebuilt when the updated partially encoded slice to be rebuilt is complete. The method continues at step 520 where the processing module overwrites the temporarily stored partially encoded slice to be rebuilt with the updated partially encoded slice to be rebuilt when the updated partially encoded slice to be rebuilt is not complete. The method loops back to step 510 to receive and process another slice.

Figure 46A:
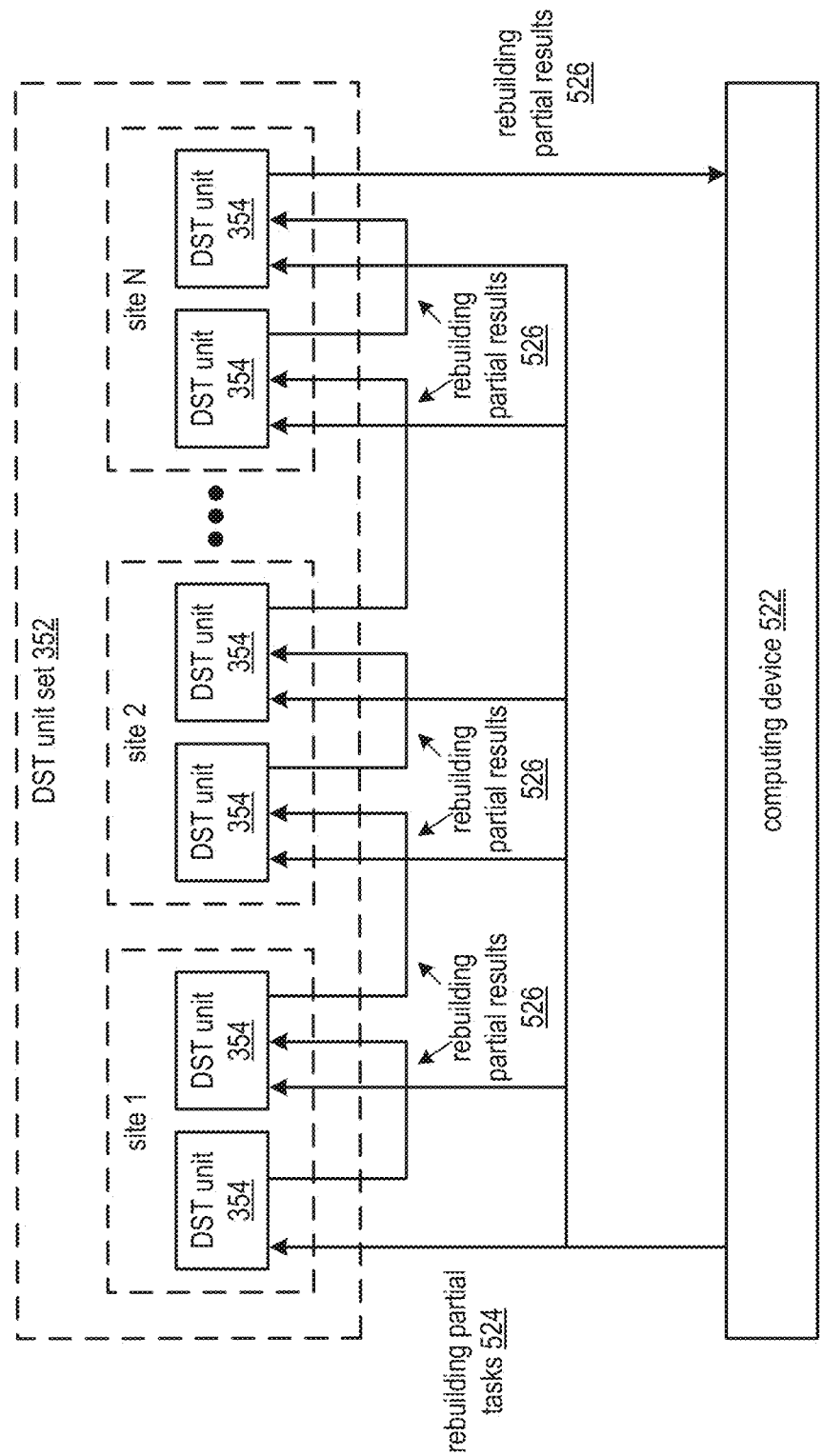
FIG. 46A is a schematic block diagram of another embodiment of a distributed computing system in accordance with the present invention.

FIG. 46A is a schematic block diagram of another embodiment of a distributed computing system that includes a computing device 522 and the distributed storage and task (DST) unit set 352 of FIG. 42A. The DST unit set 352 includes the DST units 354 of FIG. 42B. The DST unit set 352 is implemented at sites 1-N. Each site includes one or more DST units 354. The DST unit set 352 is utilized for storage of sets of encoded data slices. A data segment is encoded with a dispersed storage error coding function in accordance with dispersal parameters to produce a set of encoded data slices of the sets of encoded data slices. The dispersal parameters includes a one or more of a decode threshold, a read threshold, a write threshold, and a width. The DST unit set 352 includes a width number of DST units 354. As such, a width of 2N results when each of the sites 1-N includes two DST units 354. For example, pillars one and two are implemented utilizing the two DST units 354 implemented at site 1, pillars three and four are implemented at site 2, etc. The computing device 522 may be implemented utilizing one or more of the DST processing unit 16 of FIG. 1, the DST execution unit 36 of FIG. 1, a storage server, a distributed computing server, a user device, a DS processing unit, a DST unit 354, and a DS unit of a DS unit set.

The system functions to rebuild at least one slice to be rebuilt utilizing a distributed computing rebuilding process. The computing device 522 identifies one or more tasks of the rebuilding process for assignment to the set of DST units 354 where the set of DST units 354 are associated with the slice to be rebuilt. The identifying may include one or more of accessing a task list, identifying the slice to be rebuilt, receiving an instruction, a lookup, and receiving an error message. Next, the computing device 522 identifies a dispersed storage network (DSN) configuration that includes configuration information of the DST unit set 352. The configuration information includes one or more of rack assignments, site assignments, wiring layouts, network performance information, distance between racks, distance between sites, a security requirement, and a performance requirement.

The computing device 522 partitions each of the one or more tasks into one or more rebuilding partial tasks 524 in accordance with the DSN system information. For example, the computing device 522 partitions tasks associated with generating a partially encoded slices to a decode threshold number of DST units associated with storing other slices associated with a common data segment that includes the slice to be rebuilt where at least some of the decode threshold number of DST units 354 are implemented at a common site with a DST unit three and 54 associated with the slice to be rebuilt. As another example, the computing device 522 partitions tasks associated with generating the partial encoded slices to a maximum number of DST units per site.

The computing device 522 assigns each of the one or more rebuilding partial tasks 524 to at least the decode threshold number of DST units 354 of the set of DST units 354. The assigning includes issuing the rebuilding partial tasks 524 to the assigned decode threshold number of DST units 354. The rebuilding partial tasks 524 includes one or more of instructions to generate a partially encoded slice, a slice name to be rebuilt, and an encoding matrix, a decoding matrix, a pillar identifiers associated with the decode threshold number of DST units, a star architecture rebuilding identifier, a ring architecture rebuilding identifier, an instruction to combine the partially encoded slice with a received partially encoded slice to be rebuilt, and an identifier of another DST unit to forward the updated partial encoded slice to be rebuilt.

When a ring rebuilding architecture is utilized, a DST unit 354 of the decode threshold number of DST units 354 receives a partially encoded slice to be rebuilt from another DST unit 354, generates a partially encoded slice for the slice to be rebuilt based on an associated slice (e.g., stored in the DST unit), combines the partially encoded slice with the received partially encoded slice to be rebuilt to produce an updated partially encoded slice to be rebuilt, and outputs the updated partially encoded slice to be rebuilt as rebuilding partial results 526 to get another DST unit 354 in accordance with a partial task instruction of the rebuilding partial tasks 524. The rebuilding partial results 526 includes one or more of a partially encoded slice to be rebuilt, the updated partially encoded slice to be rebuilt, a number of slices utilized so far indicator, a number of slices to be utilized (e.g., decode threshold number), an additional partial task, and an indication that the slice to be rebuilt has been stored.

The computing device 522 receives one or more rebuilding partial results 526. For example, the computing device 522 receives a rebuilding partial result 526 that indicates that the slice to be rebuilt has been stored by a last DST unit 354 of a ring of DST units when the ring rebuilding approach has been utilized. The computing device 522 facilitates completion of the one or more tasks of the rebuilding process based on the one or more rebuilding partial results 526. For example, the computing device 522 stores the slice to be rebuilt when the slice to be rebuilt has not been stored.

Figure 46B:
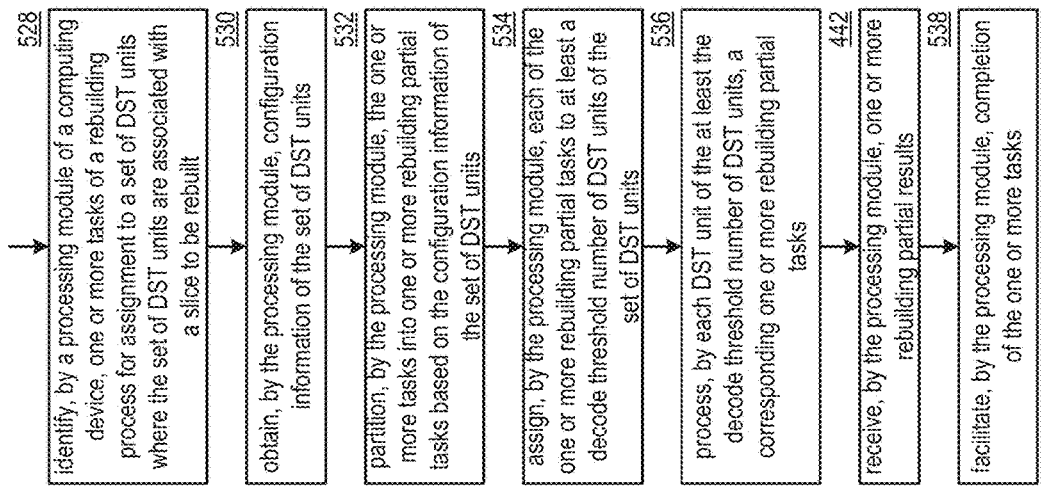
FIG. 46B is a flowchart illustrating another example of rebuilding data in accordance with the present invention.

FIG. 46B is a flowchart illustrating another example of rebuilding data, which include similar steps to FIG. 42B. The method begins at step 528 where a processing module (e.g., of a computing device) identifies one or more tasks of a rebuilding process for assignment to a set of distributed storage and task (DST) units where the set of DST units are associated with a slice to be rebuilt. The identifying includes one or more of retrieving a list, basing the identification on a number of DST units of the set of DST units, and receiving tasks. The method continues at step 530 where the processing module obtains configuration information of the set of DST units. The obtaining includes at least one of initiating a query, retrieving a list, and receiving the configuration information.

The method continues at step 532 where the processing module partitions the one or more tasks into one or more rebuilding partial tasks based on the configuration information of the set of DST units. The partitioning includes dividing the one or more tasks to facilitate execution of the rebuilding process to achieve a rebuilding goal including one or more of a performance goal, a security goal, and inefficiency goal. For example, the processing module partitions the one or more tasks sets that the partial slices are combined first at a rack level and then at a site level followed by combining at a system level in a ring fashion when a ring rebuilding approach is utilized.

The method continues at step 534 where the processing module assigns each of the one or more rebuilding tasks to at least a decode threshold number of DST units of the set of DST units. The assigning includes issuing the one or more rebuilding partial tasks to the corresponding DST units of the set of DST units. The method continues at step 536 where each DST unit of the at least the decode threshold number of DST units processes a corresponding one or more rebuilding partial tasks. For example, when the ring rebuilding approach is utilized, the DST unit receives a partially encoded slice to be rebuilt, generates a partially encoded slice for the slice to be rebuilt based on a locally retrieved slice, combines the partially encoded slice with the received partial encoded slice to be rebuilt to produce an updated partially encoded slice to be rebuilt, and outputs the updated partially encoded slice to be rebuilt to another DST unit in accordance with a partial task instruction of the one or more rebuilding partial tasks. The other DST unit performs a similar function and outputs yet another updated partially encoded slice to be rebuilt to yet another DST unit. The method continues with step 442 of FIG. 42B where the processing module receives one or more rebuilding partial results. The method continues at step 538 where the processing module facilitates completion of the one or more tasks (e.g., stores the rebuilt slice).

Figure 47A:
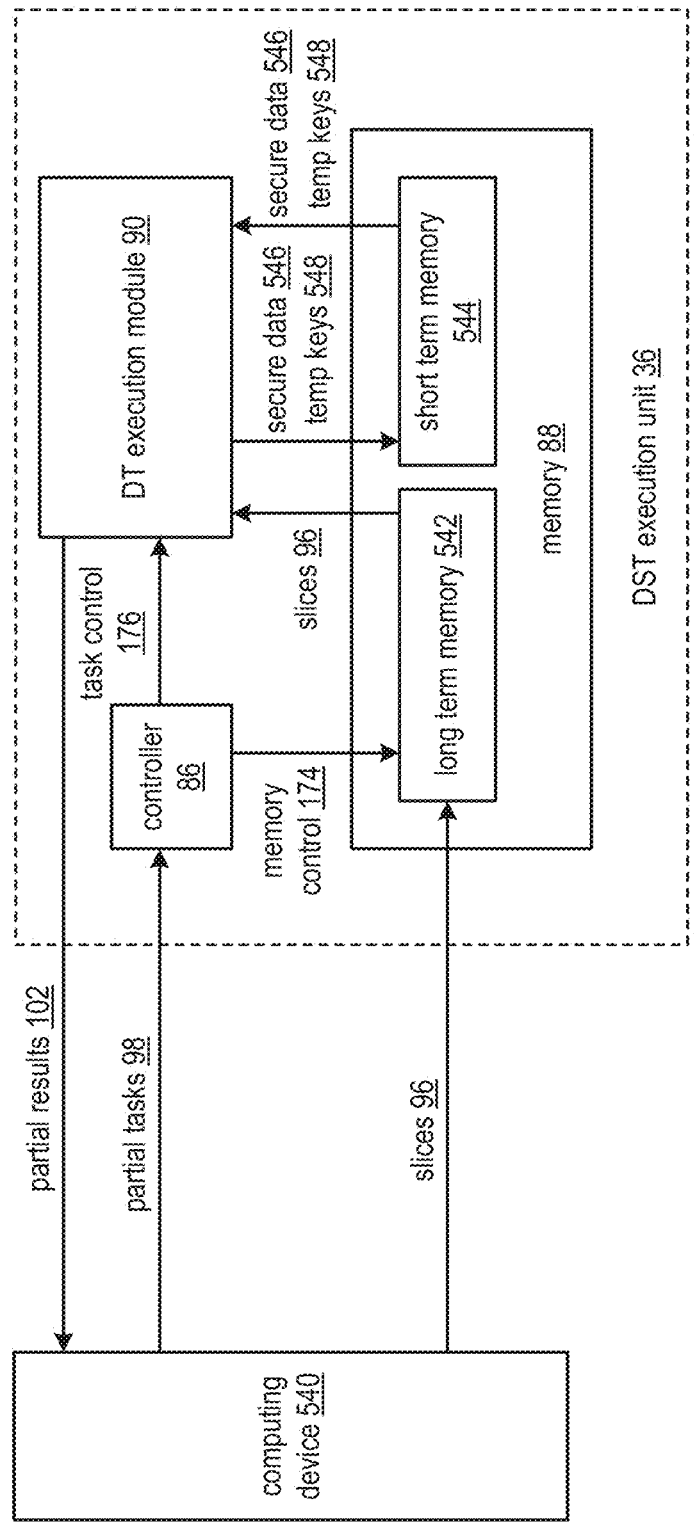
FIG. 47A is a schematic block diagram of another embodiment of a distributed computing system in accordance with the present invention.

FIG. 47A is a schematic block diagram of another embodiment of a distributed computing system that includes a computing device 540 and the distributed storage and task (DST) execution unit 36 of FIG. 1. The computing device 540 may be implemented utilizing one or more of the DST processing unit 16 of FIG. 1, the DST execution unit 36, a storage server, a distributed computing server, a user device, a DS processing unit, and a DS unit of a DS unit set. The DST execution unit 36 includes the controller 86, the distributed task (DT) execution module 90, and the memory 88 of FIG. 3. The memory 88 includes a long-term memory 542 and a short-term memory 544. The long-term memory 542 may be implemented with a long-term memory technology to facilitate certain storage goals (e.g., low-cost, highly reliable) associated with storing data for a long period of time. For example, the long-term memory technology may be implemented utilizing a magnetic disk drive to facilitate a desired level of higher data retrieval reliability. The short-term memory 544 may be implemented with a short-term memory technology to facilitate other storage goals (e.g., fast access) associated with storing data for a short period of time. For example, the short-term memory technology may be implemented utilizing solid-state memory technology to facilitate low access latency.

The system functions to enable the DST execution unit 36 to securely process a partial task 98. The DST execution unit 36 receives slices 96 and partial tasks 98 from the computing device 540 and controls, via memory control 174, the memory 88 to store the slices 96 in the long-term memory 542. The controller 86 controls, via task control 176, the DT execution module 90 to execute the partial task 98 on a slice 96 to produce temporary data. The DT execution module 90 obtains a temporary encryption key 548. The obtaining includes at least one of retrieving, generating a random key, generating a pseudorandom key, and generating the temporary encryption key 548 utilizing a baseline key. The DT execution module 90 stores the temporary encryption key 548 in the short-term memory 544. The DT execution module encrypts the temporary data using the temporary encryption key 548 to produce secure data 546. The DT execution module 90 stores the secure data 546 in the short-term memory 544.

When processing another partial task 98, the DT execution module 90 retrieves the secure data 546 and the temporary encryption key 548 from the short-term memory 544. The DT execution module 90 decrypts the secure data 546 using the temporary encryption key 548 to reproduce the temporary data. The DT execution module 90 executes the other partial task 98 on the temporary data to produce partial results 102 and outputs the partial results 102 to the computing device 540. When all partial tasks 98 associated with the secure data 546 have been processed, the DT execution module 90 deletes the temporary encryption key 548 from the short-term memory 544.

Figure 47B:
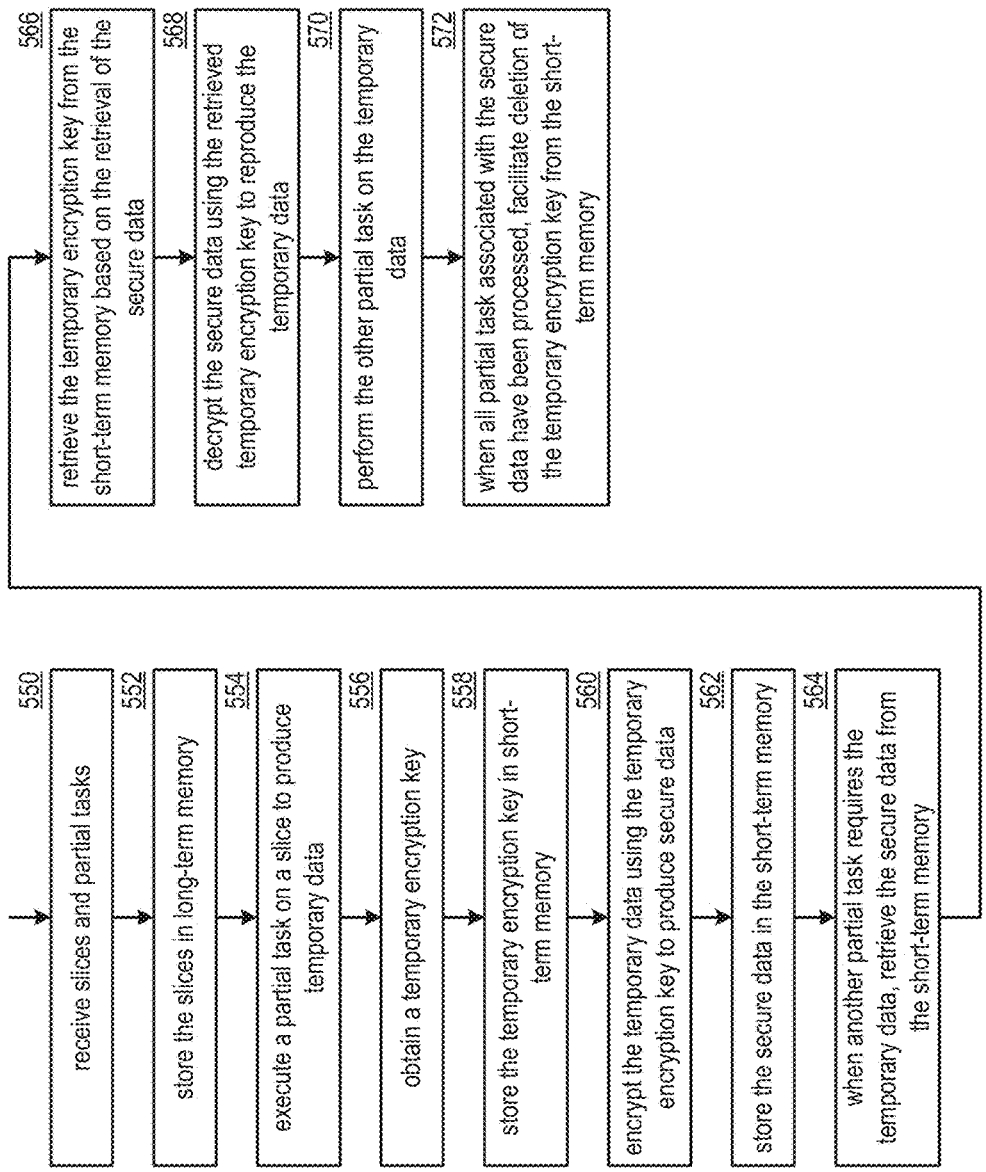
FIG. 47B is a flowchart illustrating an example of securely processing a partial task in accordance with the present invention.

FIG. 47B is a flowchart illustrating an example of securely processing a partial task. The method begins at step 550 where a processing module (e.g., of a distributed storage and task (DST) execution unit) receives slices and partial tasks. The method continues at step 552 where the processing module stores the slices in long-term memory. The method continues at step 554 where the processing module executes a partial task on a slice to produce temporary data. The method continues at step 556 where the processing module obtains a temporary encryption key. The method continues at step 558 where the processing module stores the temporary encryption key in short-term memory. The method continues at step 560 where the processing module encrypts the temporary data using the temporary encryption key to produce secure data. The method continues at step 562 where the processing module stores the secure data in the short-term memory.

When another partial task requires the temporary data, the method continues at step 564 where the processing module retrieves the secure data from the short-term memory. Alternatively, the processing module retrieves the secure data from the short-term memory when the partial task for the requires the temporary data. The method continues at step 566 where the processing module retrieves the temporary encryption key from the short-term memory based on the retrieval of the secure data. The method continues at step 568 where the processing module decrypts the secure data using the retrieved temporary encryption key to reproduce the temporary data. The method continues at step 570 where the processing module performs the other partial task on the temporary data. When all partial tasks associated with the secure data have been processed, the method continues at step 572 where the processing module facilitates deletion of the temporary encryption key from the short-term memory. The deleting may include one or more of overwriting the temporary encryption key with a random pattern, writing the temporary encryption key with a fixed pattern, and deleting the secure data from the short-term memory.

Figure 48A:
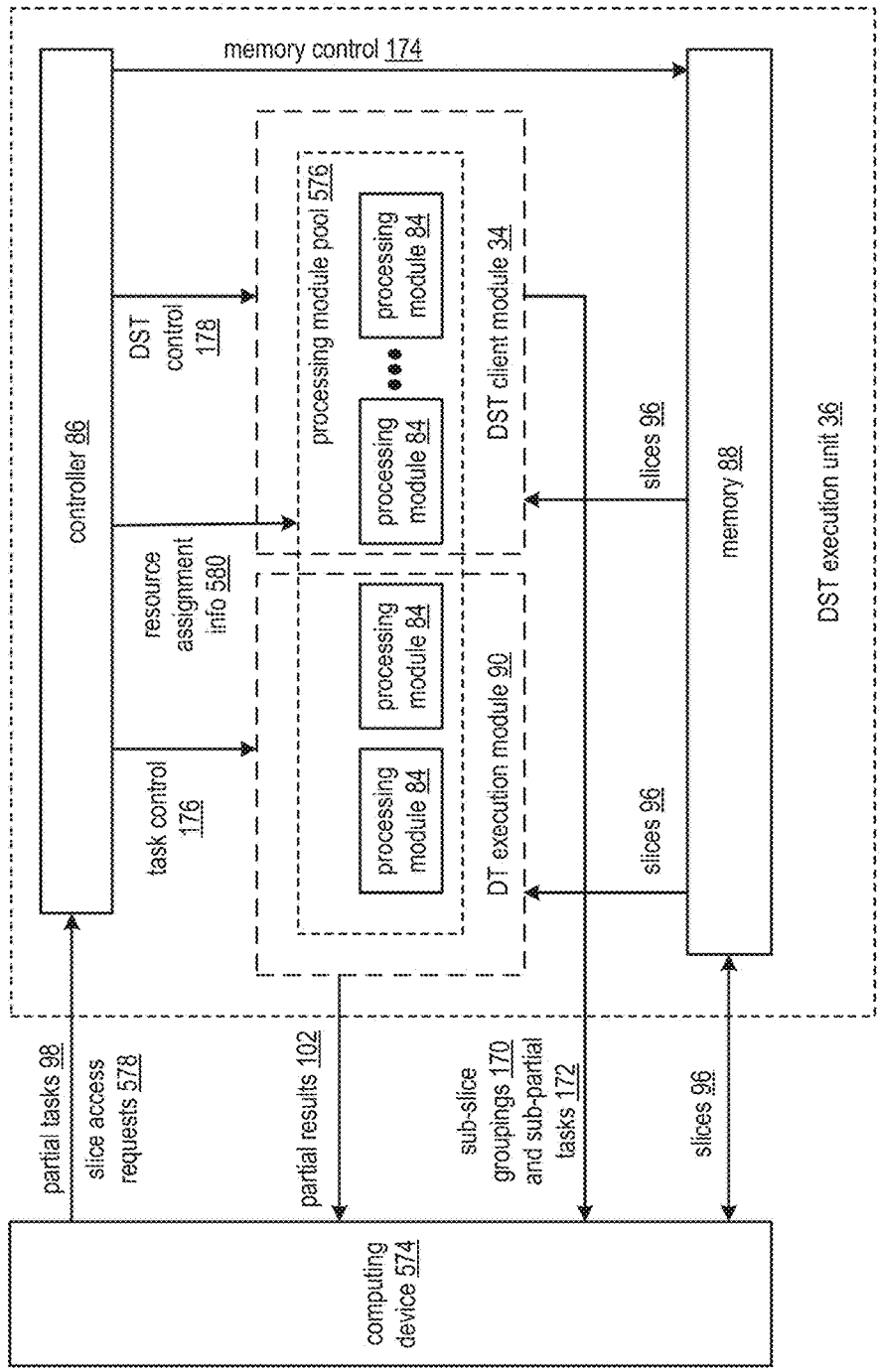
FIG. 48A is a schematic block diagram of another embodiment of a distributed computing system in accordance with the present invention.

FIG. 48A is a schematic block diagram of another embodiment of a distributed computing system that includes a computing device 574 and the distributed storage and task (DST) execution unit 36 of FIG. 1. The computing device 574 may be implemented utilizing one or more of the DST processing unit 16 of FIG. 1, the DST execution unit 36, a DS unit, a storage server, a distributed computing server, a user device, a DS processing unit, and a DS unit of a DS unit set. The DST execution unit 36 includes a controller 86, a distributed task (DT) execution module 90, a DST client module 34, and a memory 88. The DT execution module 90 and DST client module 34 utilize one or more processing modules 84 of a processing module pool 576. Such a processing module 84 of the processing module pool may include one or more of a different instance of an operating system kernel on or more cores of the (e.g., twin Linux), a new virtual machine for each partial task that is executed (e.g., the virtual machine can expose a process to different amounts of memory, different numbers of central processing units, and different virtual memory devices), and a process running under control of a restricted class loader which prevents jobs from invoking methods that can access the raw system (opening files, network connections, etc.).

The system functions to update processing resource assignments with regards to the DT execution module 90 and the DST client module 34 utilizing the one or more processing modules 84 of the processing module pool 576. The DST execution unit 36 receives partial tasks 98, slices 96, and slice access requests 578 from the computing device 574. The controller 86 controls the memory 88 via memory control 174 to facilitate storage of the slices 96 in the memory 88. The controller 86 controls the DT execution module 90 via task control 176 such that the DT execution module 90 performs a partial task 98 on a slice 96 to produce partial results 102 for sending to the computing device 574. The controller 86 controls the DST client module 34 via DST control 178 to provide facilitation of the DST client module 34 to dispersed storage error encode slices 96 to provide sub-slice groupings 170 and sub-partial task 172.

The controller 86 issues resource assignment information 580 to the processing module pool 576 and/or the DT execution module 90 and the DST client module 34 to facilitate the DT execution module 90 and the DST client module 34 utilizing the one or more processing modules 84 of the processing module pool 576. The issuing the resource assignment information 580 is performed in accordance with a resource assignment process.

The resource assignment process includes the controller 86 determining a dispersed storage performance level and determining a distributed computing performance level. Such determining includes initiating a query, receiving a message, tracking historical performance information, and initiating a test. The controller 86 identifies available processing module resources of the processing module pool 576. The identifying may be based on one or more of a query, accessing and assignment list, identifying task completion status, and receiving a message. The controller 86 determines a processing module pool loading level based on an aggregate of processing module loading levels associated with the plurality of processing modules 84. The controller 86 retrieves processing module pool assignment information where the processing module pool assignment information associates processing modules with module assignments (e.g., to one or more of the DT execution module 90 and the DST client module 34).

The controller 86 determines whether to update the processing module pool assignment information based on one or more of the processing module pool loading level, the available processing module resources, the distributed computing performance level, and the distributed storage performance level. When updating the processing module pool assignment information, the controller 86 determines updated processing module pool assignment information in accordance with a dispersed storage performance level goal and a distributed computing performance level goal. For example, the controller 86 determines to shift processing module resources from the DT execution module 92 the DST client module 34 when the dispersed storage performance level compares unfavorably to a dispersed storage performance threshold level. As another example, the controller 86 determines to shift processing module resources from the DST client module 34 to the DT execution module 92 when the distributed computing performance level compares unfavorably to a distributed computing performance threshold level and the dispersed storage performance level compares favorably to the dispersed storage performance threshold level.

Figure 48B:
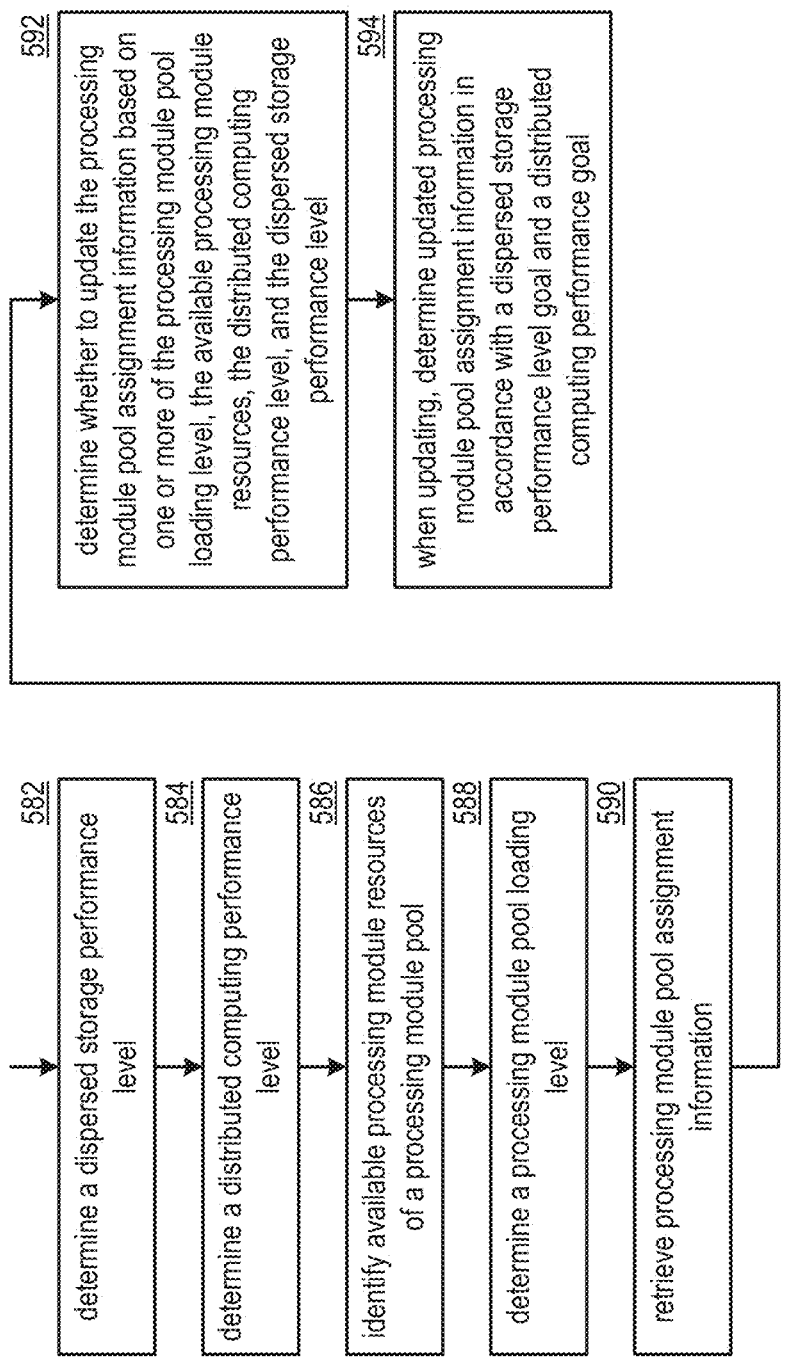
FIG. 48B is a flowchart illustrating an example of updating processing resource assignments in accordance with the present invention.

FIG. 48B is a flowchart illustrating an example of updating processing resource assignments. The method begins at step 582 where a processing module (e.g., of a distributed storage and task (DST) execution unit) determines a dispersed storage performance level. The determining includes one or more of initiating a query, performing a test, performing a measurement, receiving an error message, and retrieving information. The method continues at step 584 where the processing module determines a distributed computing performance level. The determining includes one or more of initiating a query, performing a test, performing a measurement, receiving an error message, and retrieving information. The method continues at step 586 where the processing module identifies available processing module resources of the processing module pool. The identifying includes at least one of initiating a query, retrieving configuration information, and receiving information. The method continues at step 588 where the processing module determines a processing module pool loading level. The determining includes at least one of initiating a query, performing a test, initiating a measurement, and retrieving information. The method continues at step 590 where the processing module retrieves processing module pool assignment information. For example, the processing module retrieves the processing module pool assignment information from a local memory of the DST execution unit.

The method continues at step 592 where the processing module determines whether to update the processing module pool assignment information based on one or more of the processing module pool loading level, the available processing module resources, the distributed computing performance level, and the dispersed storage performance level. For example, the processing module determines to update when a loading level is too high for the available resources. As another example, the processing module determines to update when the distributed computing performance is much greater than the dispersed storage performance. As yet another example, the processing module determines to update when the dispersed storage performance is much greater than the distributed computing performance.

When updating, the method continues at step 594 where the processing module determines updated processing module pool assignment information in accordance with a dispersed storage performance level goal and a distributed computing performance goal. The determining includes estimating a number of resources to shift from one processing type to another. For example, the processing module shifts resources from the distributed computing to the dispersed storage when the dispersed storage performance level is less than the distributed computing performance level.

Figure 49A:
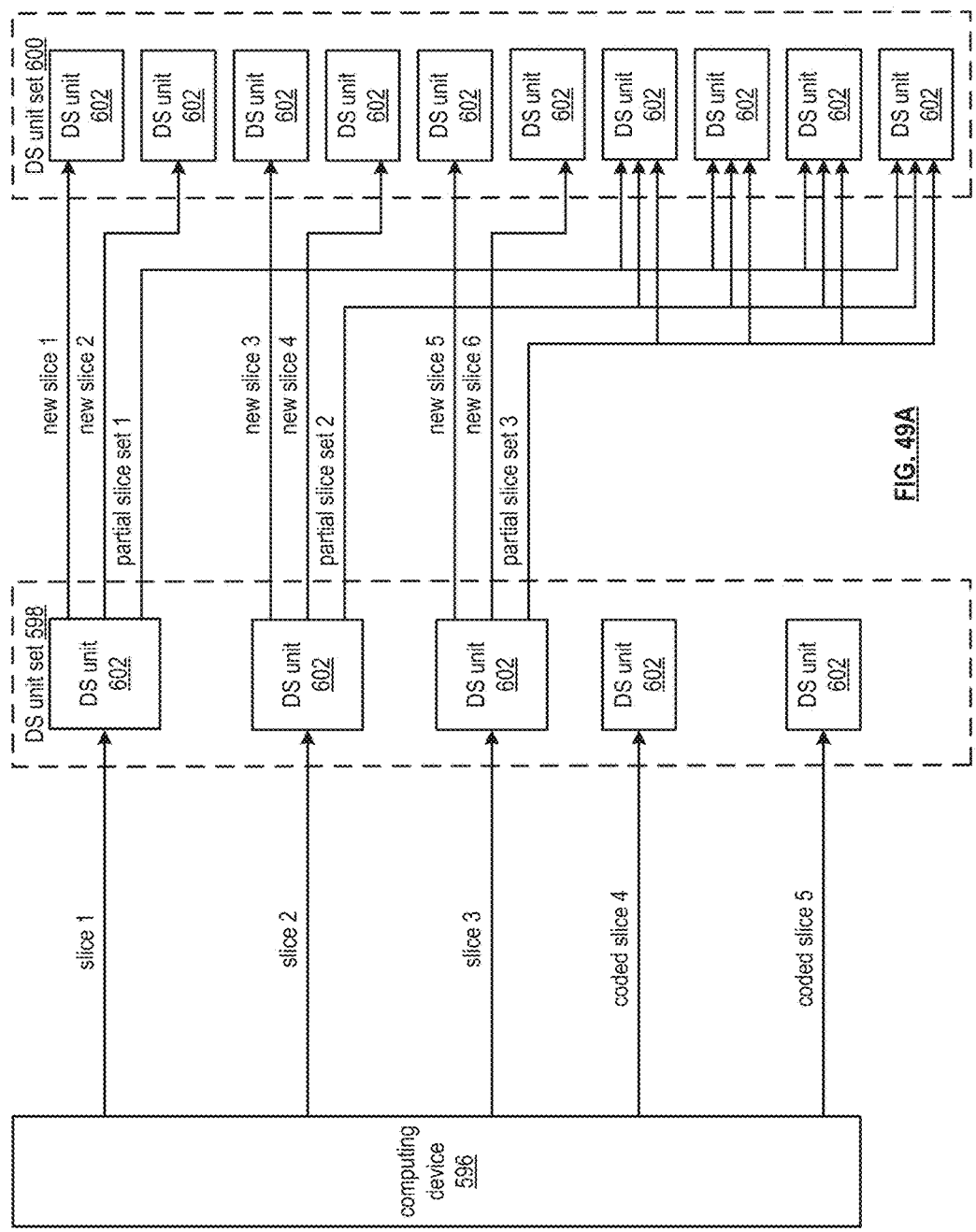
FIG. 49A is a schematic block diagram of another embodiment of a distributed computing system in accordance with the present invention.

FIG. 49A is a schematic block diagram of another embodiment of a distributed computing system that includes a computing device 596 and at least two dispersed storage (DS) unit sets 598 and 600. Each DS unit set includes a set of DS units 602. Each DS unit 602 may be implemented by one or more of the distributed storage and task (DST) execution unit 36 of FIG. 1, a storage server, a distributed computing server, a memory module, a memory device, a user device, the DST processing unit 16 of FIG. 1, and a DS processing unit. The computing device 596 may be implemented utilizing one or more of the DST processing unit 16, the DST execution unit 36, a DS unit, a storage server, a distributed computing server, a user device, a DS processing unit, and a DS unit 602 of the at least two DS unit sets 598 and 600.

Each DS unit set includes a number of DS units 602 in accordance with a pillar width number of a corresponding dispersed storage error coding function set. For example, a first DS unit set 598 includes five DS units 600 to when a corresponding first pillar width of the first DS unit set 598 is five. As another example, a second DS unit set 600 includes ten DS units 602 when a corresponding second pillar width of the second DS unit set 600 is ten. Alternatively, DS unit sets 598 and 600 may share a common set of DS units 602.

The system functions to re-store data stored in the first DS unit set 598, using first dispersed storage error coding parameters, into the second DS unit set 600 utilizing second dispersed storage error coding parameters. A data segment of data is encoded using a dispersed storage error coding function and the first dispersed storage error coding function parameters to produce a set of encoded data slices that are stored in the first DS unit set 598. For example, slices 1-3 are generated then stored in a first three DS units 602 of the first DS unit set 598 and coded slices 4 and 5 are generated then stored in a fourth and fifth DS unit 602 of the first DST unit set 598 when the dispersed storage error coding function parameters includes a systematic encoding matrix to produce a decode threshold number of slices (e.g., slices 1-3) that are equivalent to the data segment and two coded slices 4-5.

A processing module (e.g., of at least one of the computing device and a DS unit 602 of the first and second DS unit sets) determines to expand the decode threshold of the first dispersed storage error coding function parameters by factor of two and the pillar width of the first dispersed storage error coding function parameters by a factor of two such that processing requirements are minimized to generate new slices. The processing module issues split commands to the first DS unit set 598 where the split commands include a second encoding matrix and the second dispersed storage error coding function parameters.

When receiving a split command, each DS unit 602 associated with storage of a slice (e.g., slices 1-3 rather than coded slices 4-5) of the first DS unit set 598 splits each slice into two slices and stores the two slices in two corresponding DS units 602 of the second DS unit set 600. In addition, each DS unit 602 associated with storage of the slices 1-3 generates and outputs, to each DS unit 602 storing a new coded slice of the second DS unit set 600, a combined partial slice. The generating includes combining two partial slices where each partial slice is generated for the DS unit 602 storing the new coded slice based on a corresponding slice and the second encoding matrix.

In an example of outputting, a first DS unit 602 of the first DS unit set 598 outputs a partial slice set 1 to include a combined partial slice for new slice 7 based on old slices 1 and 2 (e.g., combined partial slice (7, 1&2)), a combined partial slice for new slice 8 based on old slices 1 and 2, a combined partial slice for new slice 9 based on old slices 1 and 2, and a combined partial slice for new slice 10 based on old slices 1 and 2. Each DS unit 602 storing the new coded slice of the second DS unit set 600 combines (e.g., exclusive OR) received combined partial slices to produce and store a corresponding new coded slice. For example, a seventh DS unit 602 of the second DS unit set 600 performs an exclusive OR function on combined partial slice (7, 1&2), combined partial slice (7, 3&4), and combined partial slice (7, 5&6) to produce new slice 7. The method is discussed in greater detail with reference to FIG. 49B.

Figure 49B:
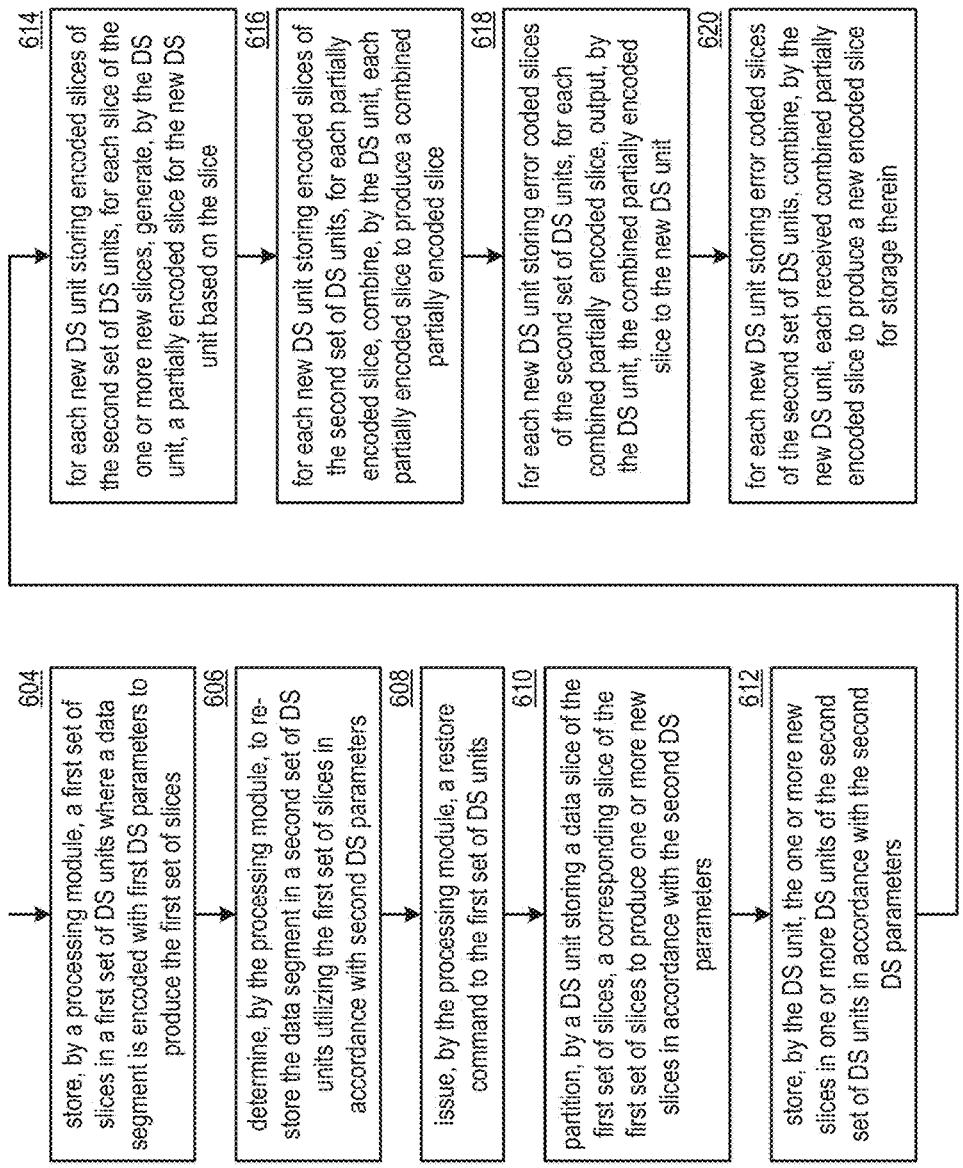
FIG. 49B is a flowchart illustrating an example of re-storing data utilizing different data storage parameters in accordance with the present invention.

FIG. 49B is a flowchart illustrating an example of re-storing data utilizing different data storage parameters. The method begins at step 604 where a processing module (e.g., of a computing device) stores a first set of slices in a first set of dispersed storage (DS) units where a data segment is encoded with first DS parameters to produce the first set of slices. The first DS parameters include a systematic first encoding matrix. The method continues at step 606 where the processing module determines to re-store the data segment in a second set of DS units utilizing the first set of slices in accordance with second DS parameters. The determining may be based on one or more of storage reliability, storage availability, storage performance, and storage cost.

The method continues at step 608 where the processing module issues a re-store command to the first set of DS units. The re-store command includes one or more of the second DS parameters including a systematic second encoding matrix and identity of the second set of DS units. The method continues at step 610 where a DS unit, storing a data slice of the first set of slices, partitions a corresponding slice of the first set of slices to produce one or more new slices in accordance with the second DS parameters. For example, the DS unit splits the corresponding slice when a second decode threshold is greater than a first decode threshold. As another example, the DS unit combines the corresponding slice with a slice from another DS unit when the second decode threshold is less than the first decode threshold.

The method continues at step 612 where the DS unit, storing the data slice of the first set of slices, stores the one or more new slices in one or more DS units of the second set of DS units in accordance with the second DS parameters. For example, the DS unit stores a slice 1 to a first DS unit of the second set of DS units and stores a slice 2 to a second DS unit of the second set of DS units when the partitioning includes splitting the corresponding slice.

For each new DS unit storing encoded slices of the second set of DS units, for each slice of the one or more new slices, the method continues at step 614 where the DS unit, storing the data slice of the first set of slices, generates a partially encoded slice for the new DS unit based on the slice. For example, the DS unit generates a partial slice (7, 1) and partial slice (7,2). For each new DS unit storing encoded slices of the second set of DS units, for each partially encoded slice, the method continues at step 616 where the DS unit storing the data slice of the first set of slices combines each partially encoded slice to produce a combined partially encoded slice. For example, the DS unit performs an exclusive OR function on partial slice (7, 1) and partial slice (7,2) to produce a combined partially encoded slice (7, 1&2).

For each new DS unit storing error coded slices of the second set of DS units, for each combined partially encoded slice, the method continues at step 618 where the DS unit, storing the data slice of the first set of slices, outputs the combined partial encoded slice to the new DS unit. For each new DS unit storing error coded slices of the second set of DS units the method continues at step 620 where the new DS unit combines each received combined partial encoded slice to produce a new encoded slice for storage therein. For example, new DS unit 7 performs an exclusive OR function on partially encoded slice (7, 1&2), partially encoded slice (7, 3&4), and partially encoded slice (7, 5&6) to produce slice 7. Next the DS unit stores the new coded slice.

Figure 50A:
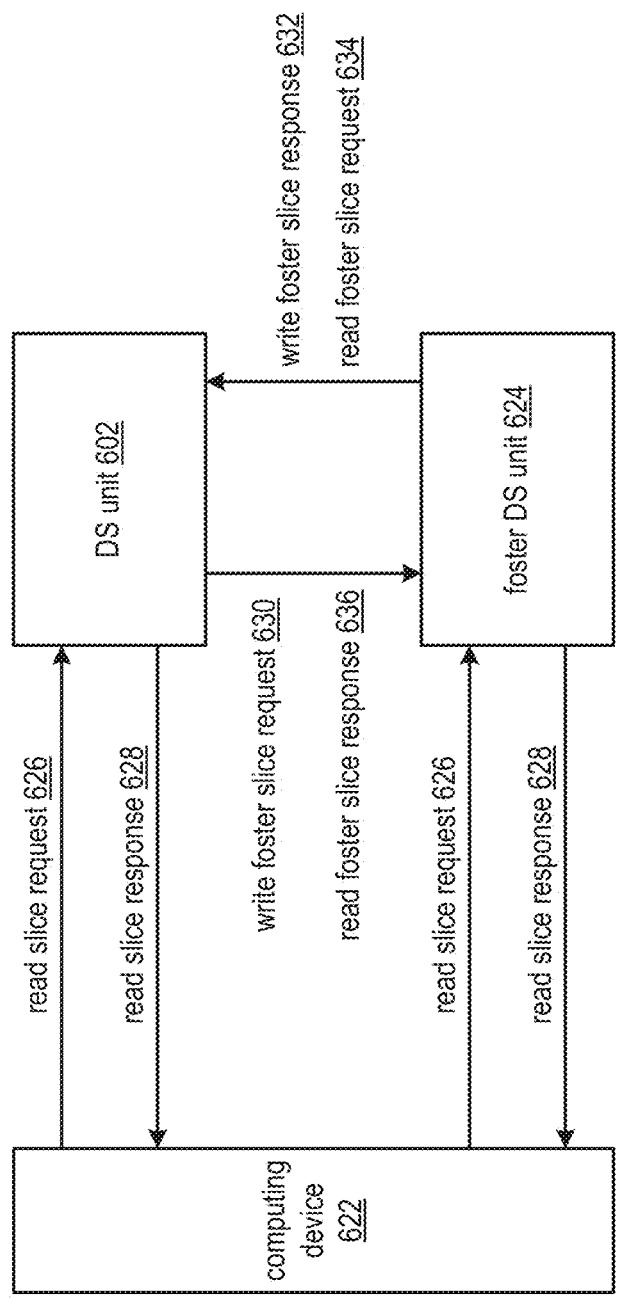
FIG. 50A is a schematic block diagram of another embodiment of a distributed computing system in accordance with the present invention.

FIG. 50A is a schematic block diagram of another embodiment of a distributed computing system that includes a computing device 622, the dispersed storage (DS) unit 602 of FIG. 49A, and a foster DS unit 624. The foster DS unit 624 may be implemented with the DS unit 602. The computing device 622 may be implemented utilizing one or more of the DST processing unit 16 of FIG. 1, the DST execution unit 36 of FIG. 1, the DS unit 602, a storage server, a distributed computing server, a user device, a DS processing unit, and the foster DS unit 624.

The system functions to provide an access to slices stored in one or more of the DS unit 602 and the foster DS unit 624. The computing device 622 issues a read slice request 626 to one or more of the DS unit 602 and the foster DS unit 624 to retrieve a slice. The read slice request 626 includes a slice name of the slice to be retrieved. The DS unit 602 or the foster DS unit 624 generates a read slice response 628 and outputs the read slice response 628 to the computing device 622. The read slice response 628 include one or more of the slice name, the slice, an alternate storage location identifier, and a server busy indicator. The computing device 622 receives the read slice response 628. When the read slice response 628 includes the alternate storage location identifier, the computing device 622 issues another read slice request 626 to an alternate storage location based on the alternate storage location identifier.

The DS unit 602 determines whether to provide a temporary foster slice for the slice stored in the DS unit 602. The determination may be based on one or more of a DS unit performance level and a performance level threshold. For example, the DS unit 602 determines to provide the temporary foster slice when the DS unit performance level compares unfavorably to the performance level threshold. For instance, the comparison is unfavorable when the DS unit 602 is overloaded (e.g., not enough resources to meet resource demand). When providing the temporary foster slice, the DS unit 602 issues a write foster slice request 630 to the foster DS unit 624. The write foster slice request 630 includes one or more of the temporary foster slice, the slice name, a storage time, and a performance threshold level. The temporary foster slice is substantially the same as the slice. When receiving the write foster slice request 630, the foster DS unit 624 stores the temporary foster slice for a time frame in accordance with the storage time of the write foster slice request 630. The foster DS unit 624 issues a write foster slice response 632 to the DS unit 602, where the write foster slice response 632 includes the slice name and a confirmation that the temporary foster slice has been stored in the foster DS unit 624. The foster DS unit 624 deletes the temporary foster slice when the time frame has expired.

The DS unit 602 updates system-level storage location information to associate the temporary foster slice with the foster DS unit 624 (e.g., to replace a DS unit identifier with a identifier of the foster DS unit). When receiving the read slice request 626 for the slice, the DS unit 602 determines whether the temporary foster slice is active at the foster DS unit 624 (e.g., active when the time frame has not expired). When active, the DS unit 602 issues another read slice response 628 that includes the server busy indicator and the alternate storage location of the foster DS unit (e.g., but not the slice).

When receiving the read slice request 626 for the slice that is not stored in the foster DS unit 624, the foster DS unit 624 issues a read foster slice request 634 to the DS unit 602. The read foster slice request 634 includes one or more of the slice name of the requested slice. When receiving the read foster slice request 634 from the foster DS unit 624, the DS unit 602 issues a read foster slice response 636 to the foster DS unit 624. The read foster slice response 636 includes one or more of the slice (e.g., the temporary foster slice now), the slice name, the storage time frame, and the performance threshold. The foster DS unit 624 receives the read foster slice response 636 from the DS unit and issues the read slice response 628 to the computing device 622, where the read slice response 628 includes the temporary foster slice as the slice. The foster DS unit 624 stores the temporary foster slice for the storage time frame associated with the read foster slice response 636.

Figure 50B:
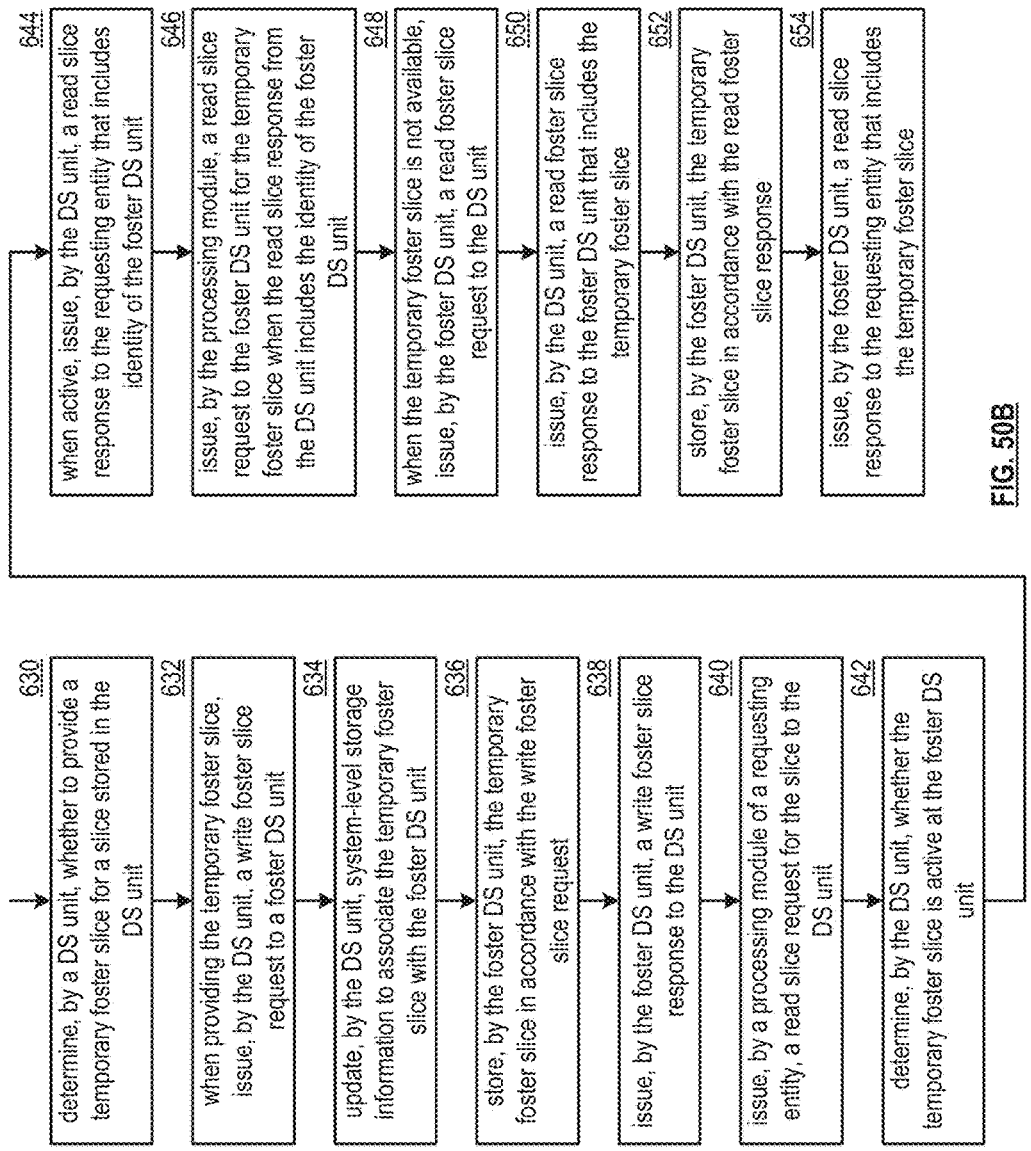
FIG. 50B is a flowchart illustrating an example of providing data access in accordance with the present invention.

FIG. 50B is a flowchart illustrating an example of providing data access. The method begins at step 630 where a dispersed storage (DS) unit determines whether to provide a temporary foster slice for a slice stored in the DS unit. The determining may be based on one or more of a DS unit performance level and a performance level threshold. When providing the temporary foster slice, the method continues at step 632 where the DS unit issues a write foster slice request to a foster DS unit. The issuing includes one or more of identifying the foster DS unit (e.g., from a list, from the request, initiating a query), generating the write foster slice request, and outputting the request to the identified foster DS unit. The method continues at step 634 where the DS unit updates system-level storage information to associate the temporary foster slice with the foster DS unit. The updating includes at least one of updating a table, issuing an update information request, and modifying a dispersed storage queue entry.

The method continues at step 636 where the foster DS unit stores the temporary foster slice in accordance with the write foster slice request. For example, the foster DS unit deletes the temporary foster slice at the end of a storage time frame of the request and updates the system-level storage information to disassociate the temperate foster slice with the foster DS unit. The method continues at step 638 where the foster DS unit issues a write foster slice response to the DS unit to acknowledge successful execution of the write foster slice request.

The method continues at step 640 where a processing module of a requesting entity (e.g., a computing device) issues a read slice request for the slice to the DS unit. The issuing includes one or more of looking up a identity of the DS unit from the system-level storage information based on a slice name of the slice, generating the request, and outputting the request to the DS unit. The method continues at step 642 where the DS unit determines whether the temporary foster slice is active at the foster DS unit. The determining may be based on one or more of initiating a query, accessing a table that indicates whether slices are active in the foster DS unit, and determining whether a storage time frame has expired.

When active, the method continues at step 644 where the DS unit issues a read slice response to the requesting entity that includes identity of the foster DS unit. Alternatively, when not active, the DS unit issues a read slice response that includes the temporary foster slice. The method continues at step 646 where the processing module of the requesting entity issues a read slice request to the foster DS unit for the temporary foster slice when the read slice response from the DS unit includes the identity of the foster DS unit. The issuing includes generating the request and outputting the request to the foster DS unit.

When the temporary foster slice is not available, the method continues at step 648 where the foster DS unit issues a read foster slice request to the DS unit. Alternatively, when available, the foster DS unit issues a read slice response that includes the temporary foster slice. The method continues at step 650 where the DS unit issues a read foster slice response to the foster DS unit that includes the temporary foster slice. The method continues at step 652 where the foster DS unit stores the temporary foster slice in accordance with the read foster slice response (e.g., for the storage time frame). The method continues at step 654 where the foster DS unit issues a read slice response to the requesting entity that includes the temporary foster slice.

Figure 51A:
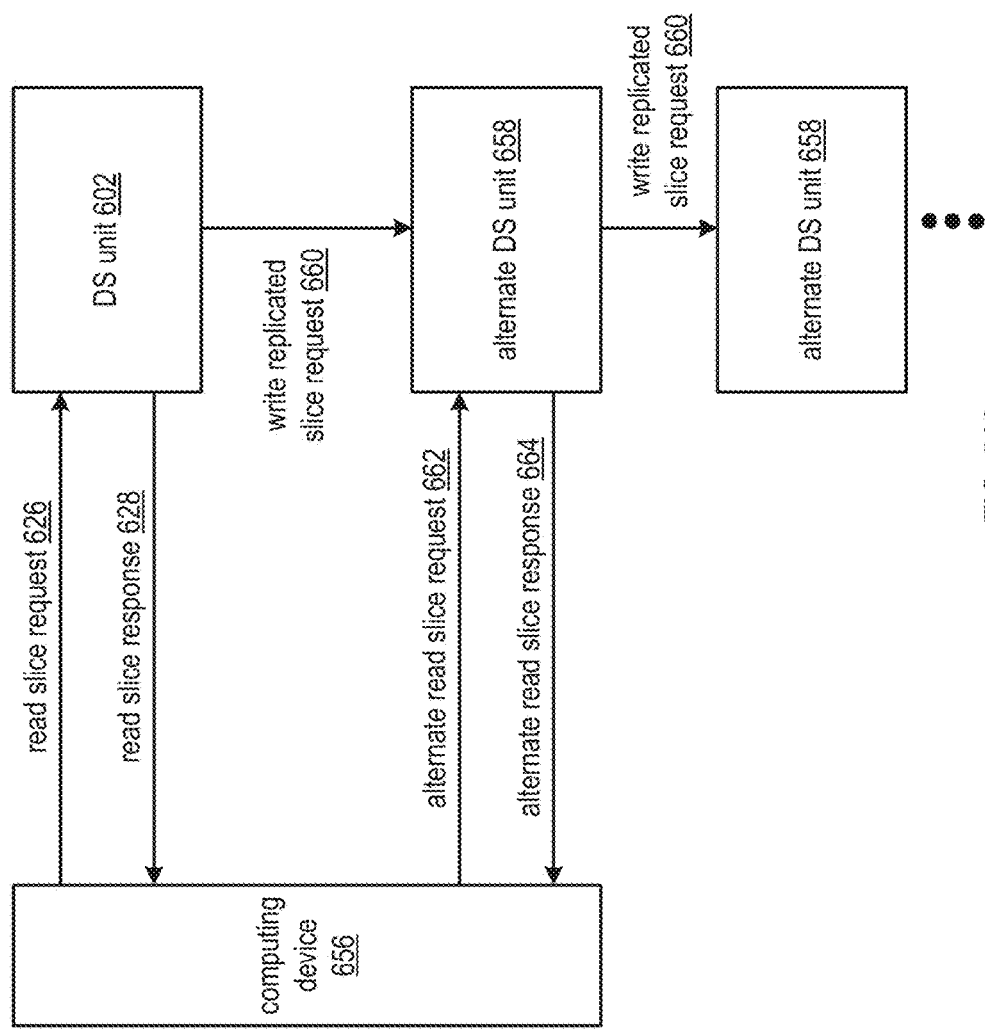
FIG. 51A is a schematic block diagram of another embodiment of a distributed computing system in accordance with the present invention.

FIG. 51A is a schematic block diagram of another embodiment of a distributed computing system that includes a computing device 656, the dispersed storage (DS) unit 602 of FIG. 49A, and one or more an alternate DS units 658. Each alternate DS unit 658 may be implemented with the DS unit 602. The computing device 656 may be implemented utilizing one or more of the DST processing unit 16 of FIG. 1, the DST execution unit 36 of FIG. 1, the DS unit 602, the alternate DS unit 658, a storage server, a distributed computing server, a user device, and a DS processing unit.

The system functions to provide access to slices stored in the DS unit 602 and replicated slices of the slices, where the replicated slices are stored in one or more of the alternate DS units 658. The computing device 656 obtains a data identifier for data to be retrieved (e.g., receives the data identifier, performs a lookup). The computing device 656 accesses at least one of a directory and a dispersed hierarchical index using the data identifier to identify one or more dispersed storage network (DSN) addresses associated with storage of one or more slices of the data. Such a DSN address may include one or more of a slice name, an alternate slice name, a source name, and an alternate source name. For example, a slice name and an alternate slice name are aliased to a common slice listed in the directory.

The computing device 656 selects a set of slice names based on the one or more DSN addresses. The computing device 656 issues at least a read threshold number of read slice requests 626 using the selected set of slice names to a set of DS units that includes at least one of the DS unit 602 and the alternate DS unit 658. The read slice request 626 includes a slice name of a desired slice for retrieval. The at least one of the DS unit 602 and the alternate DS unit 658 issues a read slice response 628 to the computing device 656 where the read slice response 628 includes one or more of the slice name and the desired slice. When receiving a threshold number of slices (e.g., at least a decode threshold number of slices for each data segment of a plurality of data segments of the data), the computing device 656 decodes the received slices to reproduce the data. When not receiving the threshold number of slices, the computing device 656 issues alternate read slice requests 662 using other slice names. For example, when the computing device 656 is missing a slice from the DS unit 602, the computing device 656 issues the alternate read slice request 662 to the alternate DS unit 658 to retrieve the slice. The alternate read slice request 662 includes an alternate slice name for the slice. The alternate DS unit 658 issues an alternate read slice response 664 that includes the slice when the alternate DS unit 658 stores a replicated slice of the slice.

The DS unit 602 determines whether to provide one or more replicated slices for a slice stored in the DS unit 602 (e.g., based on DS unit performance). For example, the DS unit 602 determines to provide the replicated slice for the slice when the DS unit 602 is overloaded. When providing the one or more replicated slices, for each slice, the DS unit 602 generates an alternate slice name and issues a write replicated slice request 660 to the alternate DS unit 658 where the write replicated slice request 660 includes the alternate slice name, the replicated slice, a storage time frame, and a performance threshold. The replicated slice is substantially the same as the slice. For each slice, the DS unit 602 updates the at least one of the directory and the dispersed hierarchical index to associate the alternate slice name with the data ID (e.g., multiple aliased slice names for the data and/or for each data segment of the data).

The alternate DS unit receives the alternate read slice request 662 for the replicated slice and issues the alternate read slice response 664 to the computing device 656, where the alternate read slice response 664 includes the replicated slice when the replicated slice is available to the alternate DS unit 658. Alternatively, or in addition to, in a similar fashion, the alternate DS unit 658 may determine whether to further replicate a given replicated slice and send a further replicated slice to another alternate DS unit 658.

Figure 51B:
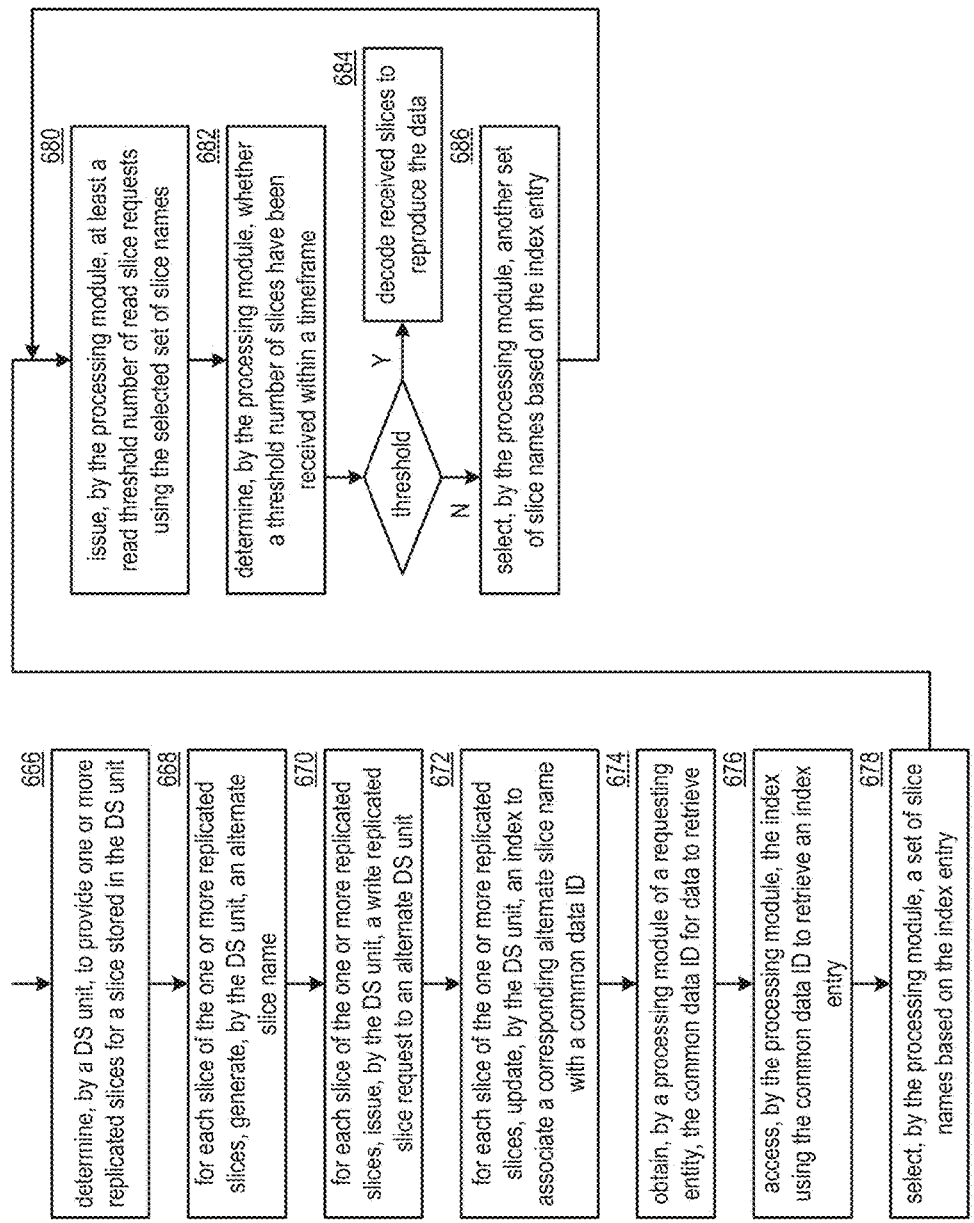
FIG. 51B is a flowchart illustrating another example of providing data access in accordance with the present invention.

FIG. 51B is a flowchart illustrating another example of providing data access. The method begins at step 666 where a dispersed storage (DS) unit determines to provide one or more replicated slices for a slice stored in the DS unit (e.g., based on one or more of a DS unit performance level and a performance threshold level). For each slice of the one or more replicated slices, the method continues at step 668 where the DS unit generates an alternate slice name. The generating may be based on one or more of a vault ID, a slice name of the slice, a data identifier associated with the slice, and an offset scheme. For each slice of the one or more replicated slices, the method continues at step 670 where the DS unit issues a write replicated slice request to an alternate DS unit. For example, the DS unit generates the request to include a corresponding alternate slice name and the replicated slice and outputs the request to the alternate DS unit for storage therein.

For each of the one or more replicated slices, the method continues at step 672 where the DS unit updates a dispersed hierarchical index to associate a corresponding alternate slice name with a common data identifier. For example, the DS unit updates an index entry of the index associated with the data identifier to include the corresponding alternate slice name and/or an alternate source name. The method continues at step 674 where a processing module of a requesting entity (e.g., a computing device) obtains the common data identifier for data to retrieve (e.g., receive, look up). The method continues at step 676 where the processing module of the requesting entity accesses the index utilizing the common data identifier to retrieve the index entry. The accessing includes performing a lookup starting with a root node of the index based on the data identifier or an attribute of the data and searching the index to identify the index entry for retrieval. The method continues at step 678 where the processing module of the requesting entity selects a set of slice names based on the index entry. The selecting may be based on one or more of a priority indicator, a performance indicator, and a random selection.

The method continues at step 680 where the processing module of the requesting entity issues at least a read threshold number of read slice requests using the selected set of slice names. The issuing includes generating the requests using the selected set of slice names and outputting the requests to the alternate DS unit and/or another alternate DS unit. The method continues at step 682 where the processing module of the requesting entity determines whether a threshold number of slices have been received within a timeframe. The method branches to step 686 when the threshold number of slices have not been received within the timeframe. The method continues to step 684 when the threshold number of slices have been received within the timeframe. The method continues at step 684 where the processing module of the requesting entity decodes receives slices to reproduce the data when the threshold number of slices have been received within the timeframe. The method continues at step 686 where the processing module of the requesting entity further selects another set of slice names based on the index entry when the threshold number of slices have not been received within the timeframe. Further selecting further includes excluding a previous slice name associated with failed responses. The method loops back to step 680 where the processing module of the requesting entity issues the at least the read threshold number of read slice requests to gain the threshold number of slices.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc., described with reference to one or more of the embodiments discussed herein. Further, from figure to figure, the embodiments may incorporate the same or similarly named functions, steps, modules, etc., that may use the same or different reference numbers and, as such, the functions, steps, modules, etc., may be the same or similar functions, steps, modules, etc., or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:
1. A method comprises:
   establishing, by a device of an affiliated group of devices within a dispersed storage network (DSN), a desired change to shared group information, wherein the shared group information includes data regarding inter-device operation for at least some of the devices of the affiliated group of devices, wherein each device of the affiliated group of devices is assigned device operations;
   requesting, by the device, a current version of the shared group information from at least a subset of the devices in the affiliated group of devices, wherein each device in the at least a subset of devices stores an encoded portion of the shared group information and wherein a threshold number of encoded portions is needed to recover the current version of the shared group information;
   upon successful recovery of the current version of the shared group information, interpreting, by the device, the current version of the shared group information to determine whether the desired change to the shared group information is permissible per inter-device acceptable operational procedures;
   when the desired change to the shared group information is permissible per the inter-device acceptable operational procedures, sending, by the device to the at least the subset of devices, a request to update the shared group information to include the desired change; and upon receipt of successfully updating the shared group information from the at least the subset of devices, performing, by the device, an operation corresponding to the desired change.

2. The method of claim 1, wherein the requesting the current version of the shared group information comprises:
requesting at least the decode threshold number of encoded data slices from the at least the subset of devices, wherein the shared group information is dispersed storage error encoded to produce a set of encoded data slices, wherein the decoded threshold number of encoded data slices is a subset of the set of encoded data slices, and wherein the shared group information is recoverable from the decode threshold number of encoded data slices.

3. The method of claim 2 further comprises:
determining that a recovered shared group information from the at least the decode threshold number of encoded data slices is the current version of the shared group information based on corresponding revision numbers associated with the encoded data slices of the at least the decode threshold number of encoded data slices.

4. The method of claim 1, wherein the interpreting the current version of the shared group information comprises one or more of:
determining whether the operation corresponding to the desired change is a permitted operation per the inter-device acceptable operational procedures;
determining whether performance of the operation corresponding to the desired change will cause a violation of one or more group operational rules of the inter-device acceptable operational procedures; and
determining whether the device has an appropriate authorization level to perform the operation corresponding to the desired change per the inter-device acceptable operational procedures.

5. The method of claim 1, wherein the shared group information comprises one or more of:
intra-device configuration information;
inter-device configuration information;
power saving modes;
group level administration functions;
device level administration functions; and
operational functions.

6. The method of claim 1 further comprises:
establishing, by the device, a desire to power-down one or more memory devices, wherein each of the devices in the affiliated group of devices includes a collection of memory devices such that, collectively, the affiliated group of devices includes a plurality of collections of memory devices, wherein the plurality of collections of memory devices are virtually arranged into a multitude of memory sets that span the affiliated group of devices, and wherein the shared group information includes data regarding powering down memory devices within a memory set of the multitude of memory sets.

7. The method of claim 6 further comprises:
interpreting the current version of the shared group information to determine:
for a given memory set, a permitted number of devices of the affiliated group of devices that is permitted to power down one or more memory devices in the given memory set; and
a current number of devices that have powered down one or more memory devices with each of the multitude of memory sets; and when at least one memory set of the multitude of memory sets has the current number less than the permitted number, sending a request to power down one or more memory devices with one of the at least one memory set.

8. The method of claim 1, wherein the sending the request to update the shared group information comprises:
generating a set of checked write requests; and
sending the set of checked write requests to the at least the subset of devices.

9. The method of claim 1 further comprises:
requesting, by the device, the current version of the shared group information from the at least a subset of the devices in response to a self-verification compliance function;
upon successful recovery of the current version of the shared group information, interpreting, by the device, the current version of the shared group information to determine whether the device is compliant with the assigned device operations; and
when the device is not compliant with the assigned device operations, updating performance of operations to establish compliance with the assigned device operations.

10. A dispersed storage (DS) module of a computing device of an affiliated group of computing devices within a dispersed storage network (DSN), the DS module comprises:
a first module, when operable within the computing device, causes the computing device to:
establish a desired change to shared group information, wherein the shared group information includes data regarding inter-device operation for at least some of the computing devices of the affiliated group of computing devices, wherein each computing device of the affiliated group of computing devices is assigned computing device operations;
a second module, when operable within the computing device, causes the computing device to:
request a current version of the shared group information from at least a subset of the computing devices in the affiliated group of computing devices, wherein each computing device in the at least a subset of computing devices stores an encoded portion of the shared group information and wherein a threshold number of encoded portions is needed to recover the current version of the shared group information;
a third module, when operable within the computing device, causes the computing device to:
upon successful recovery of the current version of the shared group information, interpret the current version of the shared group information to determine whether the desired change to the shared group information is permissible per inter-device acceptable operational procedures;
a fourth module, when operable within the computing device, causes the computing device to:
when the desired change to the shared group information is permissible per the inter-device acceptable operational procedures, send a request to update the shared group information to include the desired change to the at least the subset of computing devices; and
a fifth module, when operable within the computing device, causes the computing device to:

upon receipt of successfully updating the shared group information from the at least the subset of computing devices, perform an operation corresponding to the desired change.

11. The DS module of claim 10, wherein the second module functions to cause the computing device to request the current version of the shared group information by:
requesting at least the decode threshold number of encoded data slices from the at least the subset of computing devices, wherein the shared group information is dispersed storage error encoded to produce a set of encoded data slices, wherein the decoded threshold number of encoded data slices is a subset of the set of encoded data slices, and wherein the shared group information is recoverable from the decode threshold number of encoded data slices.

12. The DS module of claim 11 further comprises:
the third module further functions to cause the computing device to:
determine that a recovered shared group information from the at least the decode threshold number of encoded data slices is the current version of the shared group information based on corresponding revision numbers associated with the encoded data slices of the at least the decode threshold number of encoded data slices.

13. The DS module of claim 10, wherein the third module functions to cause the computing device to interpret the current version of the shared group information by one or more of:
determining whether the operation corresponding to the desired change is a permitted operation per the inter-device acceptable operational procedures;
determining whether performance of the operation corresponding to the desired change will cause a violation of one or more group operational rules of the inter-device acceptable operational procedures; and
determining whether the computing device has an appropriate authorization level to perform the operation corresponding to the desired change per the inter-device acceptable operational procedures.

14. The DS module of claim 10, wherein the shared group information comprises one or more of:
intra-device configuration information;
inter-device configuration information;
power saving modes;
group level administration functions;
device level administration functions; and
operational functions.

15. The DS module of claim 10 further comprises:
the first module further functions to cause the computing device to:
establish a desire to power-down one or more memory devices, wherein each of the computing devices in the affiliated group of computing devices includes a collection of memory devices such that, collectively, the affiliated group of computing devices includes a plurality of collections of memory devices, wherein the plurality of collections of memory devices are virtually arranged into a multitude of memory sets that span the affiliated group of computing devices, and wherein the shared group information includes data regarding powering down memory devices within a memory set of the multitude of memory sets.

16. The DS module of claim 15 further comprises:
the third module further functions to cause the computing device to:
interpret the current version of the shared group information to determine:
for a given memory set, a permitted number of computing devices of the affiliated group of computing devices that is permitted to power down one or more memory devices in the given memory set; and
a current number of computing devices that have powered down one or more memory devices with each of the multitude of memory sets; and
the fifth module further functions to cause the computing device to:
when at least one memory set of the multitude of memory sets has the current number less than the permitted number, send a request to power down one or more memory devices with one of the at least one memory set.

17. The DS module of claim 10, wherein the fourth module functions to cause the computing device to send the request to update the shared group information by:
generating a set of checked write requests; and
sending the set of checked write requests to the at least the subset of computing devices.

18. The DS module of claim 10 further comprises:
the second module further functions to cause the computing device to:
request the current version of the shared group information from the at least a subset of the computing devices in response to a self-verification compliance function;
the third module further functions to cause the computing device to:
upon successful recovery of the current version of the shared group information, interpret the current version of the shared group information to determine whether the computing device is compliant with the assigned computing device operations; and
the fifth module further functions to cause the computing device to:
when the computing device is not compliant with the assigned computing device operations, update performance of operations to establish compliance with the assigned computing device operations.

* * * * *